(12) United States Patent
Graham et al.

(10) Patent No.: US 12,088,340 B2
(45) Date of Patent: Sep. 10, 2024

(54) SYSTEMS AND METHODS FOR COLLECTING, MANAGING, AND LEVERAGING CROWDSOURCED DATA

(71) Applicant: CrowdComfort, Inc., Boston, MA (US)

(72) Inventors: B. Eric Graham, Wenham, MA (US); Galen C. Nelson, Boston, MA (US); Chris Fuentes, Plaistow, NH (US); Kevin Loos, Cambridge, MA (US); Abdullah Daoud, Lynnfield, MA (US); Jeff McAulay, Cambridge, MA (US)

(73) Assignee: CrowdComfort, Inc., Boston, MA (US)

( * ) Notice: Subject to any disclaimer, the term of this patent is extended or adjusted under 35 U.S.C. 154(b) by 0 days.

(21) Appl. No.: 17/856,562

(22) Filed: Jul. 1, 2022

(65) Prior Publication Data

US 2022/0407598 A1   Dec. 22, 2022

Related U.S. Application Data

(63) Continuation of application No. 16/815,807, filed on Mar. 11, 2020, now Pat. No. 11,394,462, which is a continuation-in-part of application No. 16/745,971, filed on Jan. 17, 2020, now Pat. No. 10,958,341, and a continuation-in-part of application No. 16/579,172, filed on Sep. 23, 2019, now Pat. No. 11,085,660, and (Continued)

(51) Int. Cl.
*H04W 4/029* (2018.01)
*H04B 10/116* (2013.01)
*H04L 67/52* (2022.01)
*H04W 4/33* (2018.01)
*H04W 4/02* (2018.01)

(52) U.S. Cl.
CPC ............ *H04B 10/116* (2013.01); *H04L 67/52* (2022.05); *H04W 4/029* (2018.02); *H04W 4/33* (2018.02); *H04W 4/026* (2013.01)

(58) Field of Classification Search
CPC ....... H04B 10/116; H04L 12/18; H04L 67/12; H04L 67/52; H04W 4/026; H04W 4/029; H04W 4/21; H04W 4/33
See application file for complete search history.

(56) References Cited

U.S. PATENT DOCUMENTS 5,565,855 A   10/1996   Knibbe
7,567,844 B2   7/2009   Thomas et al.
(Continued)

OTHER PUBLICATIONS

C.C. Sullivan, Facility Management Mobile Applications, Jan. 23, 2012, Industrial News, https://www.buildings.com/industry-news/article/10189843/facility-management-mobile-applications, pp. 1-8. (Year: 2013).*

(Continued)

*Primary Examiner* — Kidest Bahta
(74) *Attorney, Agent, or Firm* — Nutter McClennen & Fish LLP

(57) ABSTRACT

Systems and methods for providing an intuitive and semi-automated means of collecting and managing crowdsourced data via a crowdsourcing platform, and further leveraging the crowdsourced data to provide various features and services in the field of workplace and building automation and management.

20 Claims, 43 Drawing Sheets

Related U.S. Application Data a continuation-in-part of application No. 16/538,084, filed on Aug. 12, 2019, now Pat. No. 11,323,853, which is a continuation of application No. 16/120,422, filed on Sep. 3, 2018, now Pat. No. 10,382,911, said application No. 16/579,172 is a continuation of application No. 15/611,295, filed on Jun. 1, 2017, now Pat. No. 10,422,542, which is a continuation of application No. 15/472,913, filed on Mar. 29, 2017, now Pat. No. 10,215,435, said application No. 16/120,422 is a continuation of application No. 15/429,624, filed on Feb. 10, 2017, now Pat. No. 10,070,280, said application No. 16/745,971 is a continuation of application No. 15/353,336, filed on Nov. 16, 2016, now Pat. No. 10,541,751, said application No. 16/815,807 is a continuation-in-part of application No. 15/204,978, filed on Jul. 7, 2016, now Pat. No. 10,841,741, and a continuation-in-part of application No. 15/204,970, filed on Jul. 7, 2016, now Pat. No. 10,796,085, which is a continuation-in-part of application No. 14/328,492, filed on Jul. 10, 2014, now Pat. No. 9,625,922, said application No. 15/472,913 is a continuation of application No. 14/328,492, filed on Jul. 10, 2014, now Pat. No. 9,625,922.

(60) Provisional application No. 62/294,343, filed on Feb. 12, 2016, provisional application No. 62/256,884, filed on Nov. 18, 2015, provisional application No. 62/189,448, filed on Jul. 7, 2015, provisional application No. 62/189,446, filed on Jul. 7, 2015, provisional application No. 62/189,451, filed on Jul. 7, 2015, provisional application No. 61/903,123, filed on Nov. 12, 2013, provisional application No. 61/844,494, filed on Jul. 10, 2013.

(56) References Cited

U.S. PATENT DOCUMENTS

| | | |
|---|---|---|
| 8,091,795 B1 | 1/2012 | McLellan et al. |
| 8,108,144 B2 | 1/2012 | Forstall et al. |
| 8,175,802 B2 | 5/2012 | Forstall et al. |
| 8,260,320 B2 | 9/2012 | Herz |
| 8,275,352 B2 | 9/2012 | Forstall et al. |
| 8,275,399 B2 | 9/2012 | Karmarkar et al. |
| 8,290,513 B2 | 10/2012 | Forstall et al. |
| 8,311,526 B2 | 11/2012 | Forstall et al. |
| 8,320,939 B1 | 11/2012 | Vincent |
| 8,332,402 B2 | 12/2012 | Forstall et al. |
| 8,350,758 B1 | 1/2013 | Parvizi et al. |
| 8,355,862 B2 | 1/2013 | Matas et al. |
| 8,369,867 B2 | 2/2013 | Van Os et al. |
| 8,548,494 B2 | 10/2013 | Agarwal et al. |
| 8,630,714 B1 | 1/2014 | Webb |
| 8,644,843 B2 | 2/2014 | Canon et al. |
| 8,712,690 B1 | 4/2014 | White et al. |
| 8,717,193 B2 | 5/2014 | Velusamy |
| 8,757,507 B2 | 6/2014 | Fadell et al. |
| 8,843,304 B1 | 9/2014 | Dupont et al. |
| 8,929,849 B1 | 1/2015 | Dudziak |
| 9,031,579 B2 | 5/2015 | Schwent et al. |
| 9,042,876 B2 | 5/2015 | Buck et al. |
| 9,066,199 B2 | 6/2015 | Forstall et al. |
| 9,224,206 B1 | 12/2015 | Lookingbill et al. |
| 9,247,520 B2 | 1/2016 | Malik |
| 9,301,100 B1 | 3/2016 | Jampani et al. |
| 9,354,778 B2 | 5/2016 | Cornaby et al. |
| 9,392,570 B1 | 7/2016 | Zhang |
| 9,407,728 B2 | 8/2016 | Marshall et al. |
| 9,494,589 B2 | 11/2016 | Addington et al. |
| 9,519,065 B2 | 12/2016 | Henry et al. |
| 9,558,399 B1 | 1/2017 | Jeka et al. |
| 9,565,521 B1 | 2/2017 | Srinivasan et al. |
| 9,589,269 B2 | 3/2017 | Henderson et al. |
| 9,625,922 B2 | 4/2017 | Graham et al. |
| 9,661,120 B1 | 5/2017 | Skeffington |
| 9,681,468 B2 | 6/2017 | Lee et al. |
| 9,733,091 B2 | 8/2017 | Kordari et al. |
| 9,799,034 B1 | 10/2017 | Varma et al. |
| 9,846,222 B2 | 12/2017 | Ryan et al. |
| 10,070,280 B2 | 9/2018 | Daoud et al. |
| 10,103,810 B2 | 10/2018 | Kido et al. |
| 10,122,451 B2 | 11/2018 | Ankarali et al. |
| 10,149,114 B2 | 12/2018 | Daoud et al. |
| 10,171,646 B2 | 1/2019 | Daoud |
| 10,185,921 B1 | 1/2019 | Heller et al. |
| 10,215,435 B2 | 2/2019 | Graham et al. |
| 10,248,403 B2 | 4/2019 | Gross et al. |
| 10,379,551 B2 | 8/2019 | Daoud et al. |
| 10,382,911 B2 | 8/2019 | Daoud et al. |
| 10,383,198 B2 | 8/2019 | Verbrugh et al. |
| 10,422,542 B2 | 9/2019 | Graham et al. |
| 10,541,751 B2 | 1/2020 | Daoud et al. |
| 10,715,653 B2 | 7/2020 | Daoud |
| 10,796,085 B2 | 10/2020 | Daoud et al. |
| 10,802,515 B2 | 10/2020 | Mirza et al. |
| 10,841,741 B2 | 11/2020 | Daoud et al. |
| 10,958,341 B2 | 3/2021 | Daoud et al. |
| 10,963,928 B2 | 3/2021 | Sundaresan |
| 11,085,660 B2 | 8/2021 | Graham et al. |
| 11,181,936 B2 | 11/2021 | Daoud et al. |
| 11,215,967 B2 | 1/2022 | Kempf et al. |
| 11,379,658 B2 | 7/2022 | Daoud et al. |
| 2002/0152289 A1 | 10/2002 | Dube |
| 2003/0172087 A1* | 9/2003 | Godwin ............ G07C 9/38 |
| 2003/0233432 A1 | 12/2003 | Davis et al. |
| 2004/0114731 A1 | 6/2004 | Gillett et al. |
| 2005/0186969 A1 | 8/2005 | Lohtia |
| 2006/0014837 A1 | 1/2006 | Deregnaucourt et al. |
| 2006/0142880 A1 | 6/2006 | Deen et al. |
| 2006/0146837 A1 | 7/2006 | Atsuki et al. |
| 2006/0235690 A1 | 10/2006 | Tomasic et al. |
| 2007/0043477 A1 | 2/2007 | Ehlers et al. |
| 2007/0219645 A1 | 9/2007 | Thomas et al. |
| 2008/0052159 A1 | 2/2008 | Balakrishnan et al. |
| 2009/0119142 A1 | 5/2009 | Yenni et al. |
| 2009/0138965 A1 | 5/2009 | Ferlitsch |
| 2009/0157309 A1 | 6/2009 | Won et al. |
| 2009/0307255 A1 | 12/2009 | Park |
| 2010/0075628 A1 | 3/2010 | Ye |
| 2010/0286937 A1 | 11/2010 | Hedley et al. |
| 2010/0289643 A1 | 11/2010 | Trundle et al. |
| 2011/0218839 A1 | 9/2011 | Shamaiengar |
| 2011/0313660 A1 | 12/2011 | Won et al. |
| 2011/0319060 A1 | 12/2011 | Gentemann |
| 2012/0013475 A1 | 1/2012 | Farley et al. |
| 2012/0026530 A1 | 2/2012 | Tsongas et al. |
| 2012/0046860 A1 | 2/2012 | Curtis et al. |
| 2012/0089325 A1 | 4/2012 | Won et al. |
| 2012/0101953 A1* | 4/2012 | James ............ G06Q 50/04 705/317 |
| 2012/0154169 A1 | 6/2012 | Hoekstra |
| 2012/0179296 A1 | 7/2012 | Han et al. |
| 2012/0181330 A1 | 7/2012 | Kim |
| 2012/0233538 A1 | 9/2012 | Negoro |
| 2012/0259583 A1 | 10/2012 | Noboa et al. |
| 2012/0310602 A1 | 12/2012 | Jacobi et al. |
| 2013/0032634 A1 | 2/2013 | McKirdy |
| 2013/0052946 A1 | 2/2013 | Chatterjee et al. |
| 2013/0059598 A1* | 3/2013 | Miyagi ............ H04W 4/023 455/456.1 |
| 2013/0084891 A1 | 4/2013 | Khorashadi et al. |
| 2013/0094538 A1 | 4/2013 | Wang |
| 2013/0109413 A1 | 5/2013 | Das et al. |
| 2013/0132438 A1 | 5/2013 | Park et al. |
| 2013/0144546 A1 | 6/2013 | Brackney et al. |
| 2013/0159119 A1 | 6/2013 | Henderson et al. |
| 2013/0169681 A1 | 7/2013 | Rasane et al. |
| 2013/0191436 A1* | 7/2013 | Chintalapati ...... G06F 9/5072 709/224 |
| 2013/0244686 A1 | 9/2013 | Saha et al. |

(56) References Cited

U.S. PATENT DOCUMENTS

| | | |
|---|---|---|
| 2013/0257658 A1* | 10/2013 | Hall .................... G01S 1/68 342/451 |
| 2013/0263160 A1 | 10/2013 | Sandholm et al. |
| 2013/0290707 A1 | 10/2013 | Sinclair et al. |
| 2013/0297198 A1* | 11/2013 | Vande Velde .......... G01C 21/28 701/409 |
| 2013/0304758 A1 | 11/2013 | Gruber et al. |
| 2013/0304894 A1 | 11/2013 | Kim |
| 2014/0098247 A1 | 4/2014 | Rao et al. |
| 2014/0236759 A1 | 8/2014 | Mirabile |
| 2014/0278060 A1 | 9/2014 | Kordari et al. |
| 2014/0280316 A1 | 9/2014 | Ganick et al. |
| 2014/0281490 A1 | 9/2014 | Prakash et al. |
| 2014/0286644 A1 | 9/2014 | Oshima et al. |
| 2014/0290138 A1 | 10/2014 | Oshima et al. |
| 2014/0347492 A1 | 11/2014 | Fales |
| 2014/0358291 A1 | 12/2014 | Wells |
| 2015/0009348 A1 | 1/2015 | Vartanian et al. |
| 2015/0032264 A1 | 1/2015 | Emmons et al. |
| 2015/0052462 A1 | 2/2015 | Kulkarni |
| 2015/0067351 A1 | 3/2015 | Wang et al. |
| 2015/0081107 A1 | 3/2015 | Graham et al. |
| 2015/0161440 A1 | 6/2015 | Chao et al. |
| 2015/0163345 A1 | 6/2015 | Cornaby et al. |
| 2015/0168174 A1 | 6/2015 | Abramson et al. |
| 2015/0204676 A1 | 7/2015 | Zhang et al. |
| 2015/0248917 A1 | 9/2015 | Chang et al. |
| 2015/0316383 A1 | 11/2015 | Donikian |
| 2015/0379111 A1* | 12/2015 | Hwang .................... H04L 67/10 707/737 |
| 2016/0025498 A1 | 1/2016 | Le Grand |
| 2016/0026837 A1 | 1/2016 | Good et al. |
| 2016/0044467 A1 | 2/2016 | Clausen |
| 2016/0066151 A1 | 3/2016 | Palanki et al. |
| 2016/0071319 A1 | 3/2016 | Fallon et al. |
| 2016/0084658 A1 | 3/2016 | Chao et al. |
| 2016/0164993 A1 | 6/2016 | Aizenberg et al. |
| 2016/0174032 A1 | 6/2016 | Xin et al. |
| 2016/0191155 A1 | 6/2016 | Oshima et al. |
| 2016/0210647 A1 | 7/2016 | Chang et al. |
| 2016/0210790 A1 | 7/2016 | Rasane et al. |
| 2016/0266889 A1 | 9/2016 | Gross et al. |
| 2016/0323690 A1 | 11/2016 | Daoud et al. |
| 2016/0352421 A1 | 12/2016 | Oshima et al. |
| 2016/0360367 A1 | 12/2016 | Shankaranarayanan et al. |
| 2017/0010936 A1 | 1/2017 | Daoud et al. |
| 2017/0013416 A1 | 1/2017 | Daoud et al. |
| 2017/0026804 A1 | 1/2017 | Tsai et al. |
| 2017/0074659 A1 | 3/2017 | Giurgiu et al. |
| 2017/0099102 A1 | 4/2017 | Oshima et al. |
| 2017/0123440 A1 | 5/2017 | Mangsuli et al. |
| 2017/0141848 A1 | 5/2017 | Daoud et al. |
| 2017/0177723 A1 | 6/2017 | Price et al. |
| 2017/0230118 A1 | 8/2017 | Shatz et al. |
| 2017/0238153 A1 | 8/2017 | Daoud et al. |
| 2017/0245104 A1 | 8/2017 | Klimek et al. |
| 2017/0269617 A1 | 9/2017 | Daoud et al. |
| 2017/0318149 A1 | 11/2017 | Daoud |
| 2017/0371024 A1 | 12/2017 | Ivanov et al. |
| 2019/0020981 A1 | 1/2019 | Daoud et al. |
| 2019/0306303 A1 | 10/2019 | Daoud |
| 2020/0159263 A1 | 5/2020 | Daoud et al. |
| 2020/0162860 A1 | 5/2020 | Daoud et al. |
| 2020/0213006 A1 | 7/2020 | Graham et al. |
| 2020/0224902 A1 | 7/2020 | Graham et al. |
| 2021/0056260 A1 | 2/2021 | Daoud et al. |
| 2021/0067916 A1 | 3/2021 | Daoud et al. |
| 2021/0297154 A1 | 9/2021 | Daoud et al. |
| 2021/0400195 A1 | 12/2021 | Adato et al. |
| 2022/0004683 A1 | 1/2022 | Crabtree et al. |

OTHER PUBLICATIONS

Pathak, P., et al—"Visible Light Communication, Networking, and Sensing: A Survey, Potential and Challenges", retrieved from the internet at «https://asset-pdf.scinapse.io/prod/2100303002/2100303002.pdf» on Nov. 19, 2021, 31 pages.

Non-Final Office Action for U.S. Appl. No. 17/856,490 dated Oct. 26, 2022 (12 pages).

* cited by examiner

|  | Totals | Pole results | | |
| --- | --- | --- | --- | --- |
|  |  | Increase | Decrease | No Change |
| people who work in the zone | 38 | | | |
| people responding to the temperature adjustment initiation | 30 | 20 | 5 | 5 |
| Weighting | | 0.67 | 0.17 | 0.17 |
| Increase/-decrease weighting | 0.50 | 0.58 | 0.08 | |
| Max Change in degrees F | 5.00 | | | |
| Recommended Change | 2.50 | | | |
| Recommended Change (Rounded) | 2.50 | Recommended increase in temperature | | |

Fig. 4D

- View your reports here
- Select '+' to add report

- Scan QR code or manually look up

- Scan QR code or manually look up
- Geo-location identifies what building you are in

- Choose thermal or maintenance report
- Geo-located maintenance reporting was added to increase the value of the reporting functionality for facilities management staff and increase occupancy usage rates of the application.

- Rate your comfort
- We built a 5 point slide bar including freezing, cold, just right, hot, and very hot on the far right.

- Option to include text and/or take an image to add to the report.

- See report activity around you
- Option to 'agree' or comment on reports

- See reports that received the most 'agrees' in your area

Once a deficiency or maintenance issue is reported, managers can address these issues on the fly.

*Add a comment*  *Change report status*  *Assign report*

- In notification center, select 'assigned to me'
- View and manage reports that have been assigned to you

- Identify what asset you are inspecting
- App populates appropriate checklist
- Once complete, data is aggregated, analyzed, and stored on the cloud

Real-Time Feedback Intake and Response Management

SYSTEMS AND METHODS FOR COLLECTING, MANAGING, AND LEVERAGING CROWDSOURCED DATA

CROSS-REFERENCE TO RELATED APPLICATIONS

This application is a continuation of U.S. patent application Ser. No. 16/815,807, filed Mar. 11, 2020 (U.S. Pat. No. 11,394,462 issuing Jul. 19, 2022).

U.S. patent application Ser. No. 16/815,807 is a continuation-in-part of U.S. patent application Ser. No. 16/579,172, filed Sep. 23, 2019 (now issued as U.S. Pat. No. 11,085,660), which is a continuation of U.S. patent application Ser. No. 15/611,295, filed Jun. 1, 2017 (now issued as U.S. Pat. No. 10,422,542), which is a continuation of U.S. patent application Ser. No. 15/472,913, filed Mar. 29, 2017 (now issued as U.S. Pat. No. 10,215,435), which is a continuation of U.S. patent application Ser. No. 14/328,492, filed Jul. 10, 2014 (now issued as U.S. Pat. No. 9,625,922), which claims the benefit of, and priority to, U.S. Provisional Application Nos. 61/903,123, filed Nov. 12, 2013, and 61/844,494, filed Jul. 10, 2013.

U.S. patent application Ser. No. 16/815,807 is a continuation-in-part of U.S. patent application Ser. No. 15/204,970, filed Jul. 7, 2016 (now issued as U.S. Pat. No. 10,796,085), which claims the benefit of, and priority to, U.S. Provisional Application Nos. 62/189,446, filed Jul. 7, 2015, 62/189,448, filed Jul. 7, 2015, and 62/189,451, filed Jul. 7, 2015 and also is a continuation-in-part of U.S. patent application Ser. No. 14/328,492, filed Jul. 10, 2014 (now issued as U.S. Pat. No. 9,625,922).

U.S. patent application Ser. No. 16/815,807 is a continuation-in-part of U.S. patent application Ser. No. 16/745,971, filed Jan. 17, 2020 (now issued as U.S. Pat. No. 10,958,341), which is a continuation of U.S. patent application Ser. No. 15/353,336, filed Nov. 16, 2016 (now issued as U.S. Pat. No. 10,541,751), which claims the benefit of, and priority to, U.S. Provisional Application No. 62/256,884, filed Nov. 18, 2015.

U.S. patent application Ser. No. 16/815,807 is a continuation-in-part of U.S. patent application Ser. No. 15/204,978, filed Jul. 7, 2016 (now issued as U.S. Pat. No. 10,841,741) which claims the benefit of, and priority to, U.S. Provisional Application Nos. 62/189,446, filed Jul. 7, 2015, 62/189,448, filed Jul. 7, 2015, and 62/189,451, filed Jul. 7, 2015.

U.S. patent application Ser. No. 16/815,807 is a continuation-in-part of U.S. patent application Ser. No. 16/538,084, filed Aug. 12, 2019 (now issued U.S. Pat. No. 11,323,853), which is a continuation of U.S. patent application Ser. No. 16/120,422, filed Sep. 3, 2018 (now issued as U.S. Pat. No. 10,382,911), which is a continuation of U.S. patent application Ser. No. 15/429,624, filed Feb. 10, 2017 (now issued as U.S. Pat. No. 10,070,280), which claims the benefit of, and priority to, U.S. Provisional Application No. 62/294,343, filed Feb. 12, 2016.

The contents of each of the above-referenced applications are hereby incorporated by reference herein in their entireties.

FIELD OF THE INVENTION

The present disclosure relates generally to management services. In particular, the present disclosure relates to a system providing an intuitive and semi-automated means of collecting and managing crowdsourced data via a crowdsourcing platform, and further leveraging the crowdsourced data to provide various features and services in the field of workplace and building automation and management.

BACKGROUND

With ongoing advances in technology, the management and control over a residential or commercial building's facilities, including the maintenance over such facilities, has greatly improved. For example, in recent years, building automation has increased in popularity due, in part, to the increasing number of systems and devices configured to communicate with one another over a common or shared network. Building automation is the automatic centralized control of a building's heating, ventilation and air conditioning (HVAC), lighting, and other systems through a building management or automation system. The objectives of building automation are to improve occupant comfort, improve the efficiency of building system operations, reduce energy consumption and operating costs, and further improve the life cycle of utilities.

The core functionality of a building management or automation system includes, but is not limited to, maintaining environment/climate (i.e., heating and cooling) for given areas of the building within a specified range, providing light to rooms based on a schedule (e.g., time of day, occupancy schedule, etc.), monitoring of performance and device failures in various building systems, and providing malfunction alarms and/or maintenance issues to building maintenance staff. While current building management/automation systems provide some degree of automated monitoring and controlling of a building's facilities and systems, such systems may still suffer from certain drawbacks, namely a lack of ability to sufficiently account for, among other things, occupant-driven data (e.g., input received from one or more occupants in a given space of the building, including occupant feedback and/or comfort information, as well as occupant-reported maintenance information) and subsequent on-the-fly updating of building automation based on occupant-driven data.

SUMMARY

The present invention is directed to a system for providing an intuitive and semi-automated means of collecting and managing crowdsourced data via a crowdsourcing platform, and further leveraging the crowdsourced data to provide various features and services in the field of workplace and building automation and management.

In particular, the system of the present invention includes a cloud-based service, such as a crowdsourcing platform, configured to capture and analyze feedback from one or more persons within a given space and provide numerous features and services based, at least in part, on the analysis. For example, in some embodiments, the crowdsourcing platform is configured to collect crowdsourced data or information from one or more users/occupants within a space via a software application (e.g., smartphone or mobile application). In turn, the platform is able to thereby collect multiple-user feedback with regard to any specific aspect of a given space, which may include, for example, environmental parameters (e.g., user feedback related to a user's comfort within a space, such as whether they are hot or cold), as well as maintenance issues within the given space.

In some embodiments, the system is able to track and tie specific locations to the crowdsourced data based on reference points (e.g., QR codes posted in specific locations within the building) for a user to scan and then input their feedback data, at which point the system can correlate the user feedback with the specific location.

In some embodiments, however, the system is configured to provide geolocation services to track a user's location via a passive means, as opposed to requiring the user to actively input their location (e.g., via a QR scan or the like). In particular, in some embodiments, the system is configured to provide a geolocation service based on the crowdsourcing, or polling, of a user's smartphone or mobile device so as to determine location and movement of users within a specific environment. In the embodiments described herein, the environment is an indoor environment, such as an office space. However, it should be noted that the systems and methods of the present invention may be used in outdoor environments. Further, it should be noted that the terms "geolocation" and "positioning" may be used interchangeably herein, particularly when referring to "indoor geolocation" or "indoor positioning".

In particular, the system is configured to communicate with a user's smartphone or mobile device to collect data related to user movement (e.g., GPS measurements, inertial measurement unit (IMU) measurements, etc.) and further collect signals from the smartphone or mobile device (e.g., received signal strength (RSS) measurements, RF measurements, etc.). Additionally, or alternatively, in some embodiments, the geolocation services may be based on a lighting system using visible light communication (VLC) within a given space. In particular, the system may further include a visible light communication (VLC) enabled lighting system configured to communicate and exchange data with the crowdsourcing platform, wherein such data includes VLC data captured by VLC-enabled lighting system, and, in turn, is used to determine location and movement of users within a specific environment. Yet still, in some embodiments, the system of the present invention is configured to leverage a Short Message Service (SMS) communication system for generating and transmitting command text messages to a user's smartphone or mobile device. The command text messages essentially elicit or otherwise train/educate the user's smartphone or mobile device to automatically transmit requested data back to the crowdsourcing platform while the user is within a given environment and/or utilizing the service to report comfort and/or maintenance issues. The requested data may include, for example, the location or position of the user at the time of the reporting of any issue.

The system of the present invention is further configured to automatically map a floor plan or layout of a location based on collected crowdsourced data collected as part of the geolocation service. In particular, the system may include mapping/rendering software configured to identify patterns of user movement based on the user location/movement data (e.g., GPS measurements, IMU measurements, RSS measurements, RF measurements, VLC data, and movement/location data transmitted in response to command text messages) and render a floor plan or layout within the building in which the users are located and moving. The system is further configured to continually update a floor plan or layout based on polling of multiple users within the building so as to further refine and improve accuracy of the generated floor plan.

It should be noted that, in some embodiments, the system may further utilize additional data to augment the modeling of an environment, which, in turn, may further improve the geolocation services provided by the system. For example, the additional data may be collected by utilizing a handheld or integrated light detection and ranging (LIDAR) device for scanning and mapping indoor environments and the system is configured to associate scan data with known features/landmarks based, at least in part, on prior and/or subsequent user location determinations, predetermined features such as two-dimensional (2-D) floor plans, specific locations of objects (QR code locations, locations of fixed objects identifiable with image-based analysis or computer vision, and the like). Additionally, or alternatively, the system may utilize other data collection mechanisms, including additional user polling to collect images of a given space (e.g., images captured via a user's smartphone or mobile device) and correlating such images with a 2-D floor plan or layout to further refine the floor plan or layout of a given space.

Upon receiving the crowdsourced data (i.e., user feedback regarding environmental parameters, maintenance issues, and the like along with location data), the system is configured to produce an actionable response, which may include, for example, automatic control of the building's climate system (e.g., HVAC) and/or generation and transmittal of maintenance issues requiring attention, allowing building owners or facility managers to respond to occupant concerns in a much more rapid and cost effective manner. In particular, user comfort can be better managed (i.e., control the output from HVAC systems for given spaces based on the given demand) and maintenance issues can be addressed with a higher degree of precision.

Most notably, by providing improved modeling of the environment and improving the accuracy with which users are located and user requests are tied to specific locations within the environment, the system greatly improves the manner in which maintenance requests are handled, and further provides additional features beneficial to users. For example, the system is configured to provide real-time, or near real-time, tracking of technical, janitorial, and other building service team members. The system is configured to analyze a user request and, in turn, identify and route the appropriate team member to address maintenance and/or workplace requests, or any other issue requiring attention. The system is configured to base such a determination by analyzing the request data and correlating such data with the team member data, which may include, among other things, determining a proximity of the team member relative to the location of the issue requiring attention, the technical capabilities of the technician and whether the technician is qualified or equipped to address the issue. The system is further configured to providing routing guidance to the team member, including providing the optimal path to the given location requiring attention (i.e., determine the quickest route to reach to intended destination). The system may further be configured to provide at least building management with an interactive interface in which team members (i.e., building maintenance technicians) are tracked and monitored, including providing team member locations within the building, given requests that a given team member is currently addressing, as well as future requests that the team member has been tasked with addressing. Other details may further be provided, including estimated time of completion for a given task and estimate time of responding to the next task in the queue of requests.

In addition to improving the manner in which maintenance requests are handled, the accurate modeling of the environment also provides for other uses. For example, the system is configured to provide directions to users to any given location within the building to a great degree of accuracy, which such directions can be displayed via the user's smartphone or mobile device, or a wearable device (i.e., via virtual reality (VR) or augmented reality (AR) display. The system is further configured to provide proximity sensing for determining the proximity of users relative to one another or relative to certain landmarks or building features of interest. This may be particularly useful in emergency situations. For example, knowing where users are in an emergency situation, such as a fire, could lead to potentially saving lives, as the system is configured to communicate specific alerts to users in the event that they are within the vicinity of an emergency and the system may be aware of certain landmarks or objects that may be of importance in an emergency (e.g., fire extinguisher, nearest exit, medical devices such as defibrillators, etc.). Accordingly, a user in the vicinity of an emergency situation may be alerted and routed to the nearest emergency exit or directed to a fire extinguisher or defibrillator. Similarly, a user could generate and send an emergency-related request, in which the system is configured to auto-route such request data to the appropriate emergency response team to then address the emergency.

As part of providing an actionable response, the system is configured to first analyze the data so as to determine what actions, if any, may or should be taken (either automatically via a building management system or the like or suggested actions to be taken via a maintenance worker or building manager). In particular, the system is configured to analyze crowdsourced data utilizing various analysis techniques, including, but not limited to, contextual data analytics and predictive analytics, to thereby improve accuracy in terms of environment mapping and locating of users, understanding user requests and feedback, and further utilizing such data to provide an enriched set of features and services in the fields of workplace and building management.

In some embodiments, the system is configured to utilize contextual data analysis to improve the understanding of user requests and user location associated with such requests. Such analytics may include, for example, Natural Language Processing (NLP) analysis and/or computer vision techniques. For example, the use of contextual data analysis may improve geolocation services, specifically improving the accuracy with which a user is located. In particular, simply relying on GPS, IMU, RSS, and/or RF measurements to locate a user and/or tie a user request to a given location may be limiting, as such measurements may lack sufficient accuracy. Accordingly, the system is configured to analyze a user's request, which may include text, one or more images, and/or audio using NLP and/or computer vision techniques. If, for example, an image of a known object or object type (as determined by computer vision), or mention of that object (as determined by NLP) is submitted in the user report by way of text, image data, and/or audio data, the system can use such data analysis to better locate the user and, in turn, provide a much more accurate and efficient actionable response. The use of contextual data analytics can also more accurately classify the type of the report (e.g., the system can associate differently phrased requests as being similar and thereby provide summary reports, such as heat maps). Accordingly, such analysis can facilitate subsequent actions, such as prioritizing requests, identifying more accurate instructions for handling requests, and identifying trends in a timelier manner. The system is further configured to utilize contextual data (e.g., image or audio data) from the user to better understand a user's mood or disposition when submitting a request or attempting to find a location. Accordingly, the system is configured to make more informed decisions with respect to automated reactions (e.g., responsive communications, urgency of assigning and routing or re-routing a limited number of maintenance technicians, etc.).

As more refined crowdsourced data is collected, the system may be configured to further subject such data to predictive analytics. As generally understood, predictive analytics encompasses a variety of statistical techniques, including, for example, data mining, predictive modeling, and machine learning, that analyze current and historical data to make predictions about future or otherwise unknown events. In the present invention, the system may utilize a form of AI or machine learning to determine a status of a building system (e.g., component of HVAC system) and predict whether the system is going to fail and/or requires preventative maintenance, thereby assisting building managers in understanding and prioritizing systems and building features in terms of repair, maintenance, and replacement. Furthermore, by utilizing predictive analytics, the system is configured to determine patterns in the realm of human behavior and thereby proactively generate action items in anticipation of specific user requests. For example, the system is configured to subject historical crowdsourced data to predictive analytics so as to predict comfort-related issues for given locations and, in turn, proactively address such issues prior to users reporting the issues. For example, the system may predict that a given location is occupied at a certain time and day of the week and, based on historical crowdsourced data, that location consistently requires updating of the climate (i.e., either it is too hot or too cold). Accordingly, the system is configured to effectively learn and proactively control the climate of that given location for that given time and day of the week in anticipation of user requests to adjust the climate. Furthermore, in some embodiments, additional data, such as weather-related data acquired from a third-party source, may be used in combination with historical crowdsourced data to determine that a specific space or zone of a building requires additional heating or cooling during such events.

Yet still, in some embodiments, additional services provided via the system may be configured to leverage the predictive analytics, such as presenting advertisement addressing predicted events to targeted audiences. For example, a predicted weather event combined with crowdsources comfort data could be used to offer new HVAC or control systems to building managers or employers in advance of the events or after the events. In other words, the system may be used to as a data service provider in such a scenario, such that the system is configured to provide data or predictive analytics needed by an advertising service to provide the predictive, comfort related advertisements.

Furthermore, as previously described, the services offered by, and general use of, the system of the present invention may accessed via a software application, it should be noted that use of the of the services of the system of the present invention may be offered as a service, such as a part of a cloud-based service to supplement services offered by third parties. For example, the crowdsourced data may be available for use by third parties via direct API integration into existing third party services. Furthermore, a software development environment or kit may be offered for facilitating third party applications that access and use such data services. As an example, a third party calendar application may utilize the crowdsourced data to provide additional information to users of the calendar application, which may be particularly useful in the workplace in the context of meeting rooms or spaces (e.g., a room or space rating or specific an indication that a room or space is typically considered too cold or too hot, or has repeated issues with a device such as a projector or the like). Furthermore, the system may generally act as a data aggregator, in which the crowdsourced data is supplemented with other third party data (e.g., calendar or ticket data) to thereby offer additional services. For example, a calendar or booking request for a room received from a third-party application may be subjected to an analysis by the system using the crowdsourced data, which certain issues may be determined (e.g., the system may present a user with information concerning particular rooms or spaces that the user is attempting to book, such as an indication as to whether any open maintenance requests are associated with the given room or space).

Certain aspects of the present invention include a method, including the steps of: receiving, from a plurality of user devices, user feedback data related to one or more spaces of a building; processing the user feedback data using an algorithm applying one or more of Natural Language Processing (NLP), computer vision, and machine learning; and determining, based on the processing, one or more of a type of user feedback or a space of the one or more spaces associated with the feedback.

In some embodiments, the method further includes the step of associating the one or more types of feedback with the one or more spaces. In some embodiments, the method further includes the step of taking an action based on the type of feedback. The action may include categorizing the feedback and identifying one or more appropriate maintenance technicians based on skill set aligned with the feedback type. The user feedback data may include image data. Accordingly, in some embodiments, the step of processing may include applying image processing to identify one or more of a specific location and a user's mood or disposition.

In some embodiments, the method further includes the step of receiving, from the plurality of user devices, GPS data. The method may further include the step of identifying one or more spaces of the building associated with the user feedback using the GPS data. The method may further include the step of adjusting a determined location of the feedback based on the processed user feedback. The step of adjusting a determined location may include adjusting output of a climate control system.

Another aspect of the present invention includes a method, including the steps of: receiving, from a plurality of user devices, user feedback data related to one or more spaces of a building; aggregating the user feedback data and associating the feedback data with the one or more spaces of the building based on a model of an interior of the building; and providing a map based on the model to one or more user devices, the map comprising indications of the user feedback data associated with a representation of the one or more spaces of the building.

In some embodiments, the user feedback data may include at least one comfort data, maintenance request data, and positive feedback data. In some embodiments, the map may be provided to a manager's device. Yet still, in some embodiments, the map may be adjusted to reflect changes in the feedback data over time. In some embodiments, the model may be based on one or more of a LIDAR scan, a 2-D floor plan, and a 3-D building model.

Another aspect of the present invention includes a method, including the steps of: providing user feedback data related to one or more spaces of a building, wherein the user feedback data comprises one or more of comfort data, maintenance request data, or positive feedback data; and receiving a map based on a model, the map comprising indications of the user feedback data associated with a representation of the one or more spaces of the building.

In some embodiments, the map associates the user feedback data with the one or more spaces of the building using a model of an interior of the building. In some embodiments, the map may further be adjusted to reflect changes in the feedback data over time. In some embodiments, the model may be based on at least of a LIDAR scan, a 2-D floor plan, and a 3-D building model. In some embodiments, the method further includes the step of displaying the map on a screen of a device.

Another aspect of the present invention includes a method, including the steps of: receiving crowdsourced data associated with one or more of an indoor location and user confirmation of determined location for the user; and providing one or more of augmented reality (AR) and virtual reality (VR) routing guidance in a display interface of a user device.

In some embodiments, the routing guidance is directed to one or more of a device of a user making a maintenance request, a device of a user making a work request, and a device of a user making an emergency request. In other embodiments, the routing guidance is directed to one or more of a device of a maintenance technician and a device of an emergency responder. For example, the step of providing one or more of AR and VR routing guidance may include selecting a maintenance technician or emergency responder based, at least in part, on a location or a skill set matched to the determined location or a type of maintenance request associated with the crowdsourced data. In some embodiments, the method may further include the step of providing an update. The update may include expected time of arrival at a predetermined location. The update may be provided to one or more of a device of a user making a request, a device of a maintenance technician, a device of an emergency responder, and a device of an additional second user. In some embodiments, the additional second user may be awaiting the arrival of a user associated with the user device.

Another aspect of the present invention includes a method, including the steps of: receiving, from a plurality of user devices, user feedback data related to one or more spaces of a building; storing the user feedback data and associating the feedback data with the one or more spaces of the building; receiving, from an application, a request for space specific data based on the user feedback regarding the one or more building spaces; and providing space specific data to the application based on the user feedback data.

The space specific data may include, but is not limited to, one or more of a rating for one or more spaces of the building, a rating trend for one or more spaces of the building, a heat map organizing user ratings of one or more spaces of the building, an identified and unresolved maintenance or comfort issue associated with one or more spaces of the building, a prediction related to one or more spaces of the building, a route to one or more spaces of the building formed using an indoor model, an estimated travel time to one or more spaces of the building formed using an indoor model, and an advertisement selected using the user feedback data associated with the one or more spaces of the building.

In some embodiments, the user device includes one or more of a mobile device, a wearable device, and a holographic device. In some embodiments, the user feedback data may include one or more of comfort data, maintenance request data, and positive feedback data.

In some embodiments, the method further includes the steps of: tracking, over time, additional user feedback data; and predicting, based on the tracking, a space specific issue, comprising one or more of a maintenance failure and a comfort-related issue associated with a predicted event. The predicted event may include weather, for example.

Another aspect of the present invention includes a method, including the steps of: providing, to a server, a user feedback data relating to one or more spaces of a building, wherein the user feedback data comprises one or more of comfort data, a maintenance request, and positive feedback data; and receiving, from a server, space specific data based on the user feedback data.

The space specific data may include, but is not limited to, one or more of a rating for one or more spaces of the building, a rating trend for one or more spaces of the building, a heat map organizing user ratings of one or more spaces of the building, an identified and unresolved maintenance or comfort issue associated with one or more spaces of the building, a prediction related to one or more spaces of the building, a route to one or more spaces of the building formed using an indoor model, an estimated travel time to one or more spaces of the building formed using an indoor model, and an advertisement selected using the user feedback data associated with the one or more spaces of the building.

In some embodiments, the method further includes the step of displaying the space specific data on a screen.

Another aspect of the present invention includes a method, including the steps of: obtaining, from a device, 3-D scan data associated with an indoor environment; generating a model of the indoor environment using the 3-D scan data; receiving, from a user device, user location data; associating the user location data with the model; and providing, based on the user location data and the model, displayable data for generating a visual indication of the user's location in the indoor environment.

In some embodiments, the method further includes the steps of obtaining a user request related to one or more of comfort or maintenance and associating the user request with a location of indoor environment. In some embodiments, the method further includes the steps of aggregating multiple user requests into a report and providing the report as a heat map of the indoor environment. The heat map may generally indicate requests of a certain type as associated with locations with which the requests originated. In some embodiments, the user request may include an image. Accordingly, in some embodiments, the method may include the step of matching the image to a stored image. The method may further include the step of identifying a request type based on the matching. The method may further include the step of providing a response to the user based on the matching. Yet still, in some embodiments, the method may include the step of storing the image from the user request in association with an estimated indoor location.

Another aspect of the present invention includes a method, including the steps of: determining an emergency or alert situation; identifying one or more user devices associated with a location of the emergency or alert situation; and receiving, from one or more user devices, contextual data related to the emergency or alert situation.

In some embodiments, the method further includes the step of the receiving contextual data comprises activating one or more sensors of the one or more user devices. For example, the one or more sensors may include one or more of a microphone and camera.

In some embodiments, the method further includes the step of refining a location determination of the emergency or alert situation using the contextual data. The method may further include the step of classifying the emergency or alert situation into a type using the contextual data.

In some embodiments, the method further includes the steps of generating and routing one or more of report data and guidance data to a predetermined user device based on the contextual data. For example, the predetermined user device may include a user device of one or more of an emergency responder and a user proximate to the location of the emergency or alert situation.

BRIEF DESCRIPTION OF THE DRAWINGS

Features and advantages of the claimed subject matter will be apparent from the following detailed description of embodiments consistent therewith, which description should be considered with reference to the accompanying drawings.

FIG. 4D is a table populated with data and rules in accordance with embodiments of the present invention.

Figure 1A:
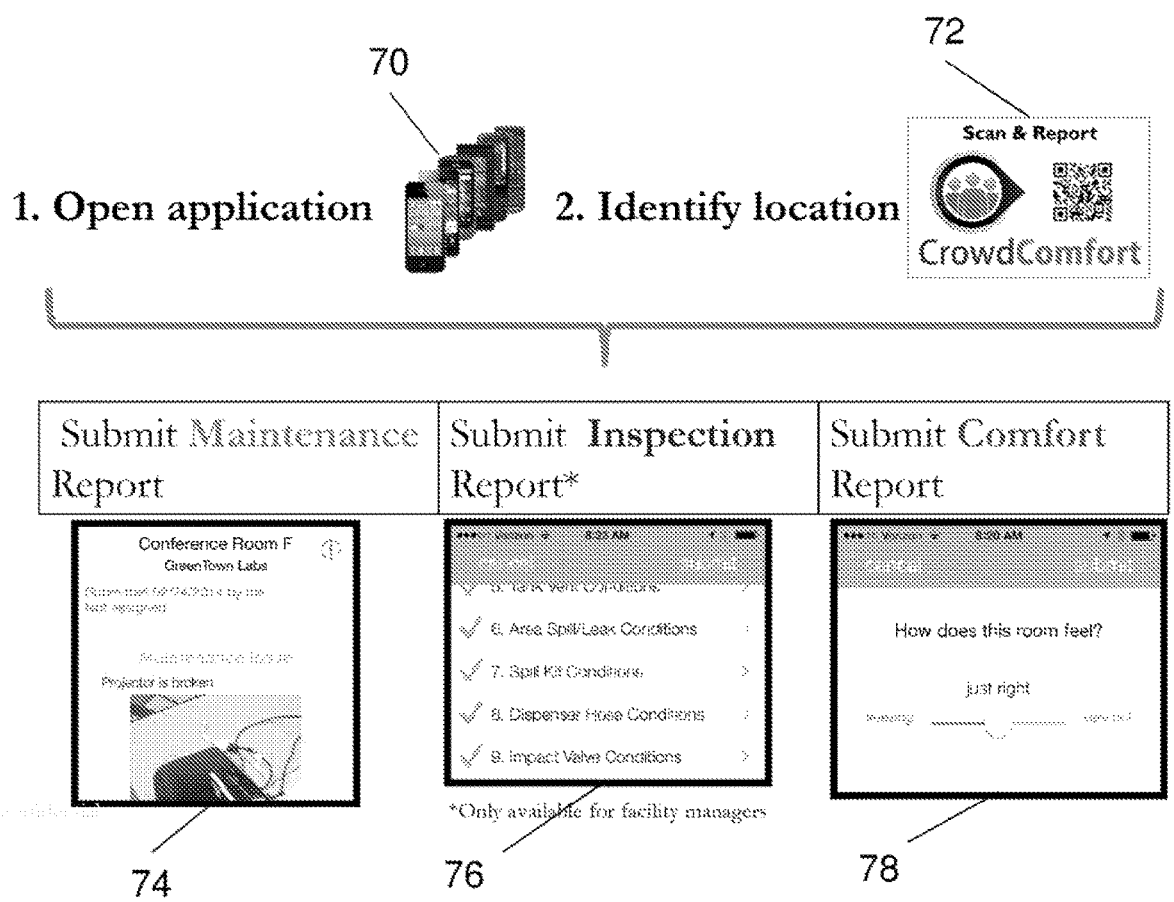
FIG. 1A is a schematic representation of aspects of an embodiment of the present invention.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention provides systems and methods for providing an intuitive and semi-automated means of collecting and managing crowdsourced data via a crowdsourcing platform, and further leveraging the crowdsourced data to provide various features and services in the field of workplace and building automation and management, among other fields.

In particular, the system of the present invention includes a cloud-based service, such as a crowdsourcing platform, configured to capture and analyze feedback from one or more persons within a given space and provide numerous features and services based, at least in part, on the analysis. For example, in some embodiments, the crowdsourcing platform is configured to collect crowdsourced data or information from one or more users/occupants within a space via a software application (e.g., smartphone or mobile application). In turn, the platform is able to thereby collect multiple-user feedback with regard to any specific aspect of a given space, which may include, for example, environmental parameters (e.g., user feedback related to a user's comfort within a space, such as whether they are hot or cold), as well as maintenance issues within the given space. The system further able to track and tie specific locations to the crowdsourced data, which can be accomplished via physical reference points (e.g., QR codes posted in specific locations within the building for a user to scan and then input their feedback data, at which point the system can correlate the user feedback with the specific location) and/or tracking of a user's location via a more passive means (e.g., crowdsourcing or polling of a user's smartphone or mobile device so as to determine location and movement of users within a specific environment based on sensor feedback or the like).

Upon receiving the crowdsourced data (i.e., user feedback regarding environmental parameters, maintenance issues, and the like along with location data), the system is configured to produce an actionable response, which may include, for example, automatic control of the building's climate system (e.g., HVAC) and/or generation and transmittal of maintenance issues requiring attention, allowing building owners or facility managers to respond to occupant concerns in a much more rapid and cost effective manner. In particular, user comfort can be better managed (i.e., control the output from HVAC systems for given spaces based on the given demand) and maintenance issues can be addressed with a higher degree of precision.

The following description describes an overall method and system for providing automated report generation, aggregation, and response, in a network-based transaction facility. In the following description, for purposes of explanation, numerous specific details are set forth in order to provide a thorough understanding of the present invention. It will be evident, however, to one skilled in the art that the present invention may be practiced without these specific details. It should be noted that the central management information system of the present disclosure utilizes data acquired and stored via methods and systems described in FIGS. 1A-19.

Figure 1B:
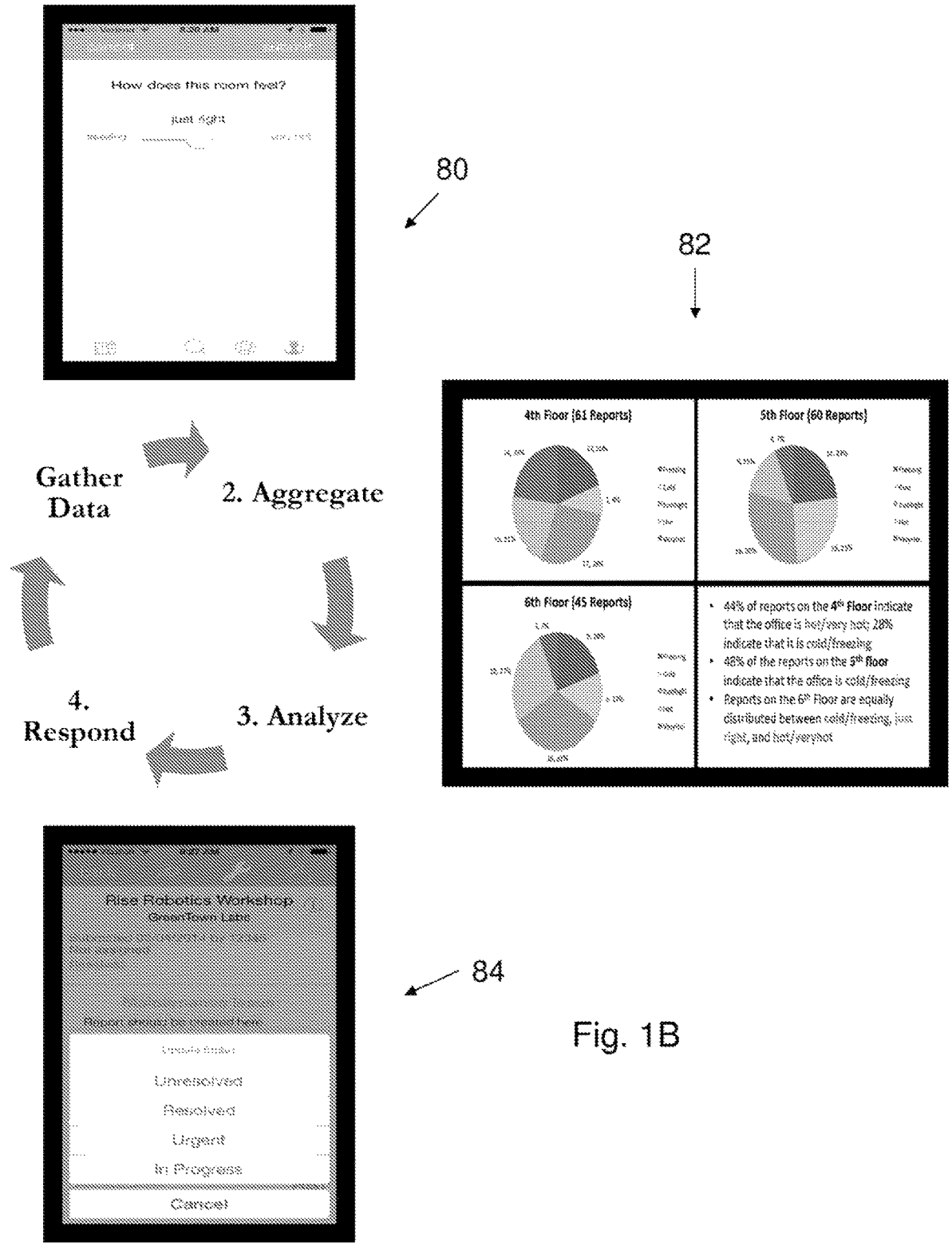
FIG. 1B is a schematic representation of aspects of an embodiment of the present invention.

Referring to FIG. 1A, embodiments of the present invention offer building owners, operators, and occupants a new and powerful way to share information about comfort, maintenance, and safety issues with an easy to use smart device application. These embodiments convert this crowd sourced feedback into time stamped, geo-located aggregated reports/maps, which are actionable through a custom portal allowing building owners or facility managers to respond more rapidly and cost effectively to occupant concerns. These embodiments democratize and amplify the voices of building occupants, while helping building owners to pinpoint energy and operational saving opportunities. Referring to FIG. 1A, users may open application 70, identify a location 72, e.g., by scanning a QR Code, and generate a maintenance report 74, an inspection report 76 and/or a comfort report 78. Referring now to FIG. 1B, once these reports are collected at 80, they are aggregated and analyzed (e.g., mapped) based on location at 82, and then automatically communicated to an appropriate recipient for response 84. In these embodiments, thermal comfort is facilitated by leveraging the power of employees to identify energy savings opportunities, improve comfort and worker productivity. Facilities management is facilitated by collecting, aggregating, and delivering real-time, geo-located reports on comfort and maintenance issues. Environmental compliance and inspection is facilitated by replacing the clipboard with real-time, site-specific environmental compliance reporting.

Various embodiments operate by initially having facility managers identify locations for data collection in and/or around particular properties. Markers are printed, delivered, and placed at the identified locations. Employees/Inspectors are notified, asked to download the application, and begin reporting. Facilities managers gain instant access to the secure portal where the data is aggregated and displayed. From the inventive platform, maintenance reports are converted into work orders that can be efficiently organized, addressed, and stored. As these reports are processed the employees who filed them are notified of progress through their phones. In particular embodiments, building systems are adjusted automatically in response to the aggregated, geo-located reports.

Potential benefits include: engaging employees and making them part of the solution; improving health, safety and security within an organization; collection of meaningful data that can be leveraged to support high-impact recommendations; use of predictive analytics to identify maintenance needs before they become problems; and/or optimization of workflow efficiency for building maintenance.

Reporting comfort and/or maintenance issues is simply the first step. By capturing and highlighting occupant discomfort, occupants can provide a compelling feedback loop to building owners—and the cloud—to address these problems and reduce energy consumption, while improving building occupants' comfort. Initial embodiments may simply provide crowd sourced feedback to building facility managers/owners informing them the extent to which building HVAC system design, set points, and overall operation is meeting occupant comfort expectations. Ultimately, crowd sourced reactions would directly influence or directly control HVAC operation (temperature and humidity levels) alongside required ventilation/air exchange rates (e.g. ASHRAE standards 62.1 and 90.1) to better match the comfort needs of a preponderance of building occupants by tying feedback directly to the building's energy management system. For example, if 90% of the occupants in a convention center feel too chilly, air conditioning set points may be raised slightly and energy consumption reduced.

Particular embodiments capture crowd sourced comfort level information periodically via a simple icon based interface. Occupants may receive a simple periodic query—perhaps via text message, via Twitter, or other platforms—asking them to characterize their comfort level (e.g. very cold, somewhat cold, comfortable, warm, very warm). Users may then respond using the system interface shown and described herein. Taken together, this data would inform building facility managers, and directly influence building HVAC set points. Looking beyond the building boundary, in various embodiments, this aggregated data may be shared on-line in a Google maps-type interface where users could mouse over buildings and see reports in the aggregate (e.g. how many, and when, users reported being uncomfortable). These reports would be updated over time based on user feedback. Such user feedback would motivate building owners to react, due to the potential positive or negative occupant ratings that could have a real effect on the property's value. At the same time, building owners could voluntarily report improvement they had made to their buildings at the same web based platform. These embodiments would thus actively support building owners who take proactive steps to provide the most comfortable and energy efficient buildings.

Application deployment/partnership options may include: Event registration sites; Employer databases/corporate sustainability leadership; Hotels; Public Transit/trains, etc. Additional applications may include power supply impacts—facility owners, utilities, and grid operators could use this platform to communicate important grid and air quality data to building occupants. For example, a preponderance of building occupants might be willing to tolerate a slightly higher indoor temperature during a hot summer day if they knew that by shedding that load, grid operators could avoid starting coal fired peaking power plants. In other words, these embodiments may complement and augment existing demand response programs.

Also, by use of relatively high resolution location data, e.g., by use of QR Codes, microGPS, etc., facility operators may begin to better understand HVAC design and operation problems at the distribution level, targeting solutions such as more localized controls, VAV (Variable Air Volume) box operation, or other conditions (e.g. excessive passive solar) addressing tenant comfort concerns and related energy use.

Building owners and users could capture more value from the app over time by pushing more and more sophisticated questions to app users, particularly repeat users, including questions like: "how would you rate the air quality in your building?" Occupants who participate in using these embodiments will be providing valuable data on the building systems, but will also be educating building managers about their preferences. This understanding will allow building owners and employers to place workers in environments with similar temperature preferences to potentially improve work satisfaction and productivity. Repeat users may build a profile and climate preference.

For the purposes of the present specification, the term "transaction" shall be taken to include any communications between two or more entities and shall be construed to include, but not be limited to, transferring data including reports and responses between computers, downloading software applications or "apps" including graphical user interface components, and commercial transactions including sale and purchase transactions, and the like.

As used herein, the terms "computer" and "end-user device" are meant to encompass a workstation, personal computer, personal digital assistant (PDA) or smart phone, wireless telephone, tablet, or any other suitable computing device including a processor, a computer readable medium upon which computer readable program code (including instructions and/or data) may be disposed, and a user interface. Terms such as "server", "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs.

Terms such as "component," "module", "control components/devices," "messenger component or service," and the like are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server (or control related devices) can be components. One or more components may reside within a process and/or thread of execution and a component may be localized on one computer and/or distributed between two or more computers or control devices.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The system and method embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Referring now to the figures, embodiments of the present invention will be more thoroughly described.

FIG. 1 is a block diagram illustrating an exemplary network-based transaction facility in the form of an Internet-based report generation and aggregation facility 10. The report facility 10 includes one or more of a number of types of front-end servers, namely page servers 12 that deliver web pages (e.g., markup language reports), picture servers 14 that dynamically deliver images to be displayed within Web pages, CGI (Common Gateway Interface) servers 18 that provide an intelligent interface to the back-end of facility 10, and search servers 20 that handle search requests to the facility 10. E-mail/communication servers 21 provide, inter alia, automated e-mail (and optionally, text and/or social media) communications to users of the facility 10. The back-end servers may include a database engine server 22, a search index server 24 and a payment (e.g., credit card and/or subscription) database server 26, each of which may maintain and facilitate access to a respective database. Facility 10 may also include an administrative application server 28 configured to provide various administrative functions.

The network-based report generation and aggregation facility 10 may be accessed by a client program 30, such as a browser (e.g., the Internet Explorer distributed by Microsoft) that executes on a client machine 32 such as a smart phone, and accesses the facility 10 via a network such as, for example, the Internet 34. Other examples of networks that a client may utilize to access the facility 10 include a wide area network (WAN), a local area network (LAN), a wireless network (e.g., a cellular network), or the Plain Old Telephone Service (POTS) network.

Figure 2:
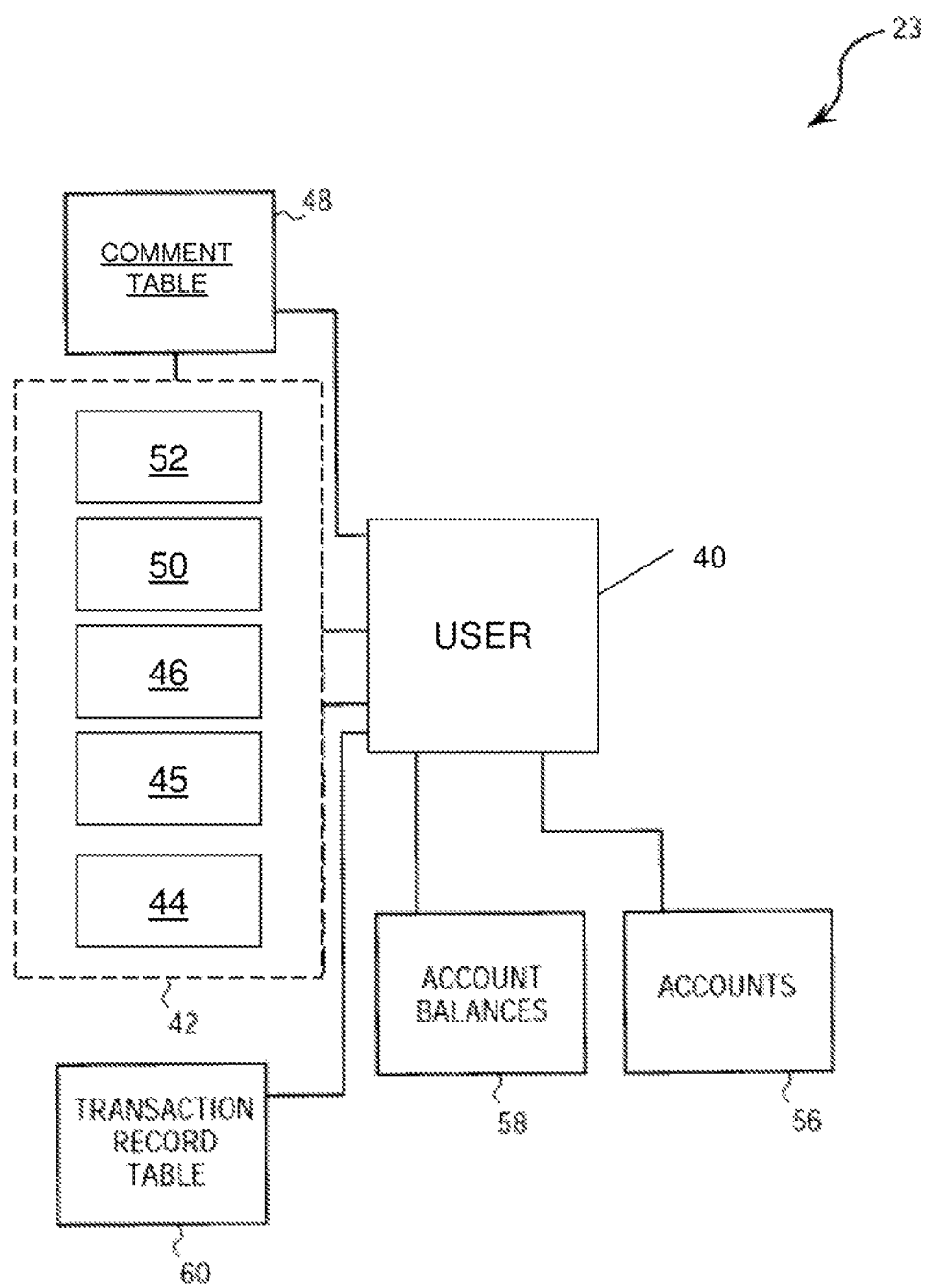
FIG. 2 is a block diagram of one embodiment of a database maintained by a database engine server.

FIG. 2 is a database diagram illustrating an exemplary database 23, maintained by and accessed via the database engine server 22, which at least partially implements and supports the report generation and aggregation facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

As shown, central to the database 23 is a user table 40, which contains a record for each user of the facility 10. The database 23 also includes tables 42 that may be linked to the user table 40. Specifically, the tables 42 may include property report (e.g., geo-located building report) table 44, and various property specific tables, such as a building locations table 45, inspection list table 46, comfort rules table 50, and a user-customizable table 52. A user record in the user table 40 may be linked to multiple reports that are being, or have been, generated via the facility 10 and for which records exist within the report tables 42. The database 23 may also include a comment table 48 populatable with comment records that may be linked to one or more report records within the report tables 42. A number of other tables may also be linked to the user table 40, such as an accounts table 56, an account balances table 58 and a transaction record table 60.

Figure 3:
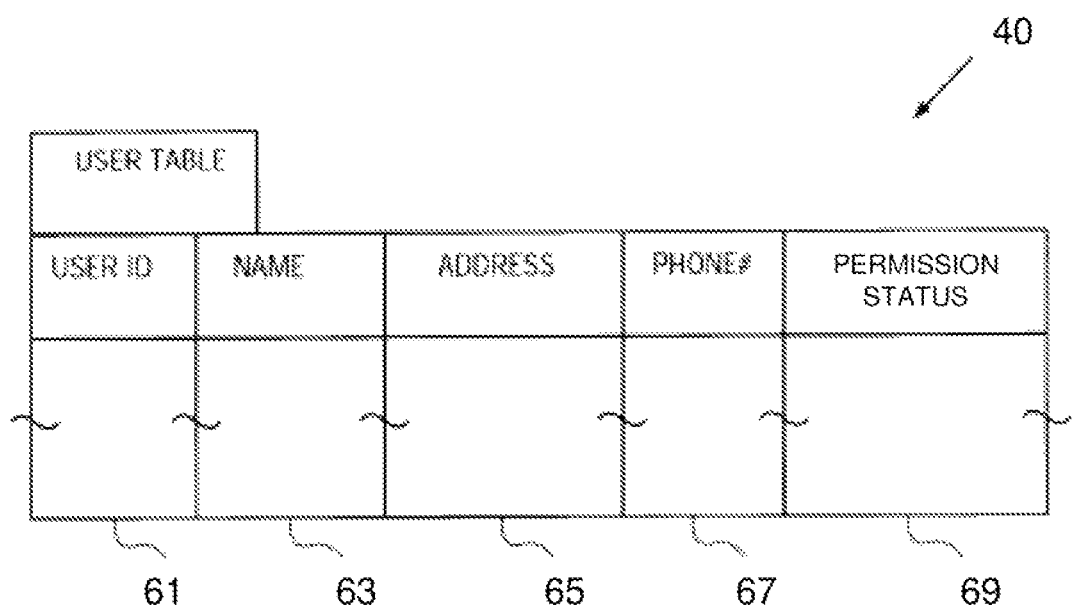
FIG. 3 is a diagrammatic representation of one embodiment of a user table within the database.

FIG. 3 is a diagrammatic representation of an exemplary embodiment of the user table 40 that is populated with records, or entries, for each user of the facility 10. As shown, table 40 includes a user identifier column 61 that stores a unique identifier for each user. A name column 63 may store a first name, a middle initial and a last name for each user. An address column 65 may store address information and/or other contact information for each user, e.g. an employer name, and/or street name and number, city, zip code, state, email address, etc. A phone number column 67 stores a phone (e.g., mobile) number for each user. A permission status column 69 may store, for each user, a value identifying the user's permission status, i.e., the user's ability to access particular features of the system, such as those typically provided to a manager or other user tasked with responding to particular reports, etc. It should be recognized that the amount of information stored may vary depending on the permission level assigned to the particular user. Table 40 may also store any additional information that may be desired for particular applications. For example, subscription information may be recorded (not shown), in which different values may be assigned to indicate whether a user has a currently valid subscription, has an expired subscription (which may provide only limited access to facility 10). It will be appreciated that any information other than that described above may populate the user table 40 without loss of generality.

Figure 4A:
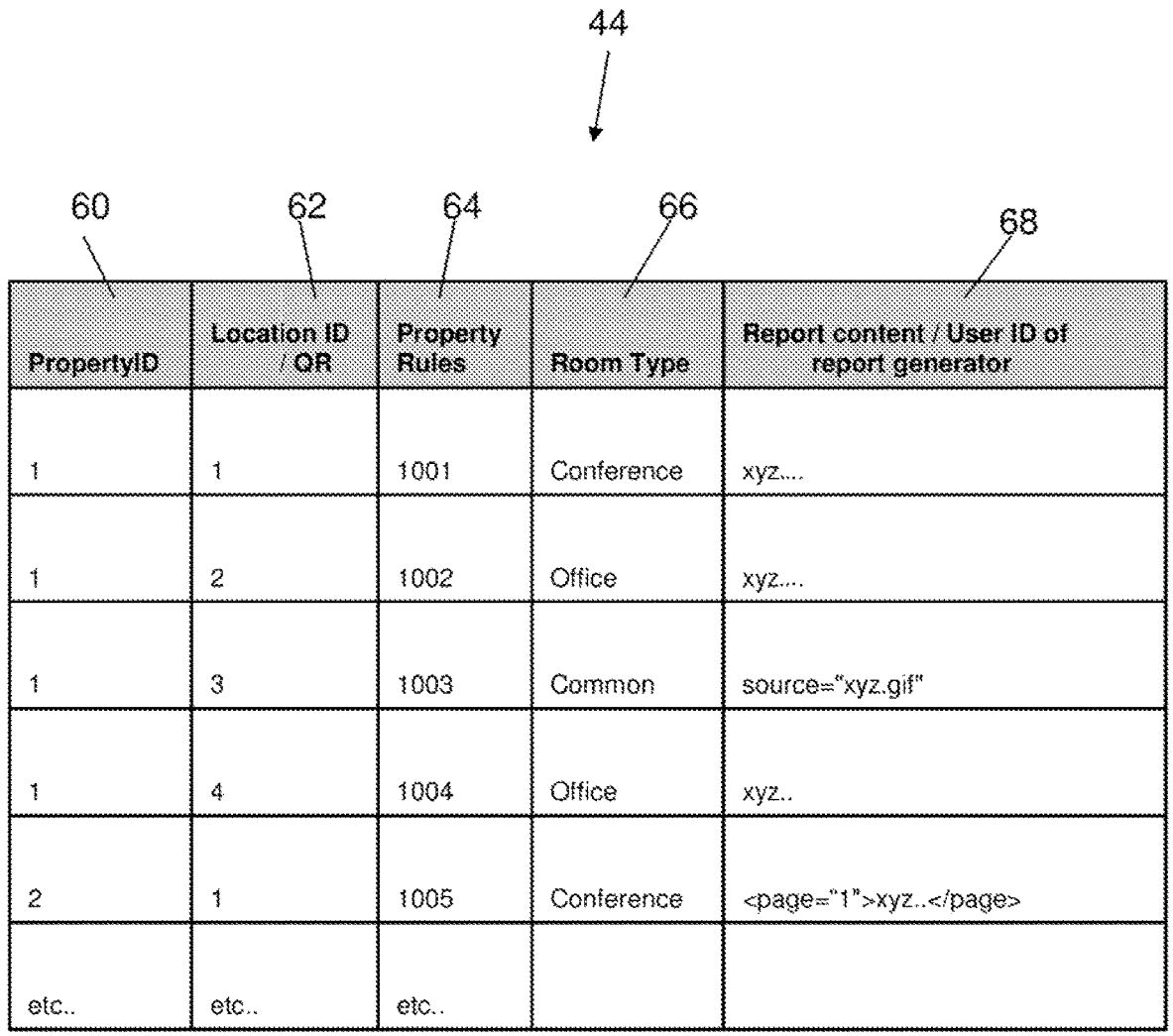
FIG. 4A is a diagrammatic representation of one embodiment of a property information table within the database.

FIG. 4A is a diagrammatic representation of an exemplary embodiment of a table 44 populated with property report records generated during use of the report generation facility 10. As shown, table 44 includes a property ID column 60 to identify particular properties, a location ID/QR column 62 to track particular locations, e.g., as designated with a QR Code or similar tag placed at the location, a property rules column 64 to provide a pointer or other reference to maintenance lists 45, inspection lists 46, comfort rules tables 50, and/or user-customizable table 52, associated with the particular property. A room type column 66 provides the type of space tagged by the QR Code, e.g., conference room, private office, etc. Report content column 68 is populated with the actual content of a report generated by the system, along with the User ID of the individual responsible for generating the report.

It will be appreciated that in particular embodiments, other descriptive information may also populate table 44, without departing from the scope of the present invention. For example, additional columns may be provided to capture information regarding the number of employees typically occupying a particular room type, and/or the number of rooms of a particular room type in the property or HVAC zone. Yet another column, for example, may identify the HVAC zone within which a particular location ID/QR Code is located.

Figure 4B:
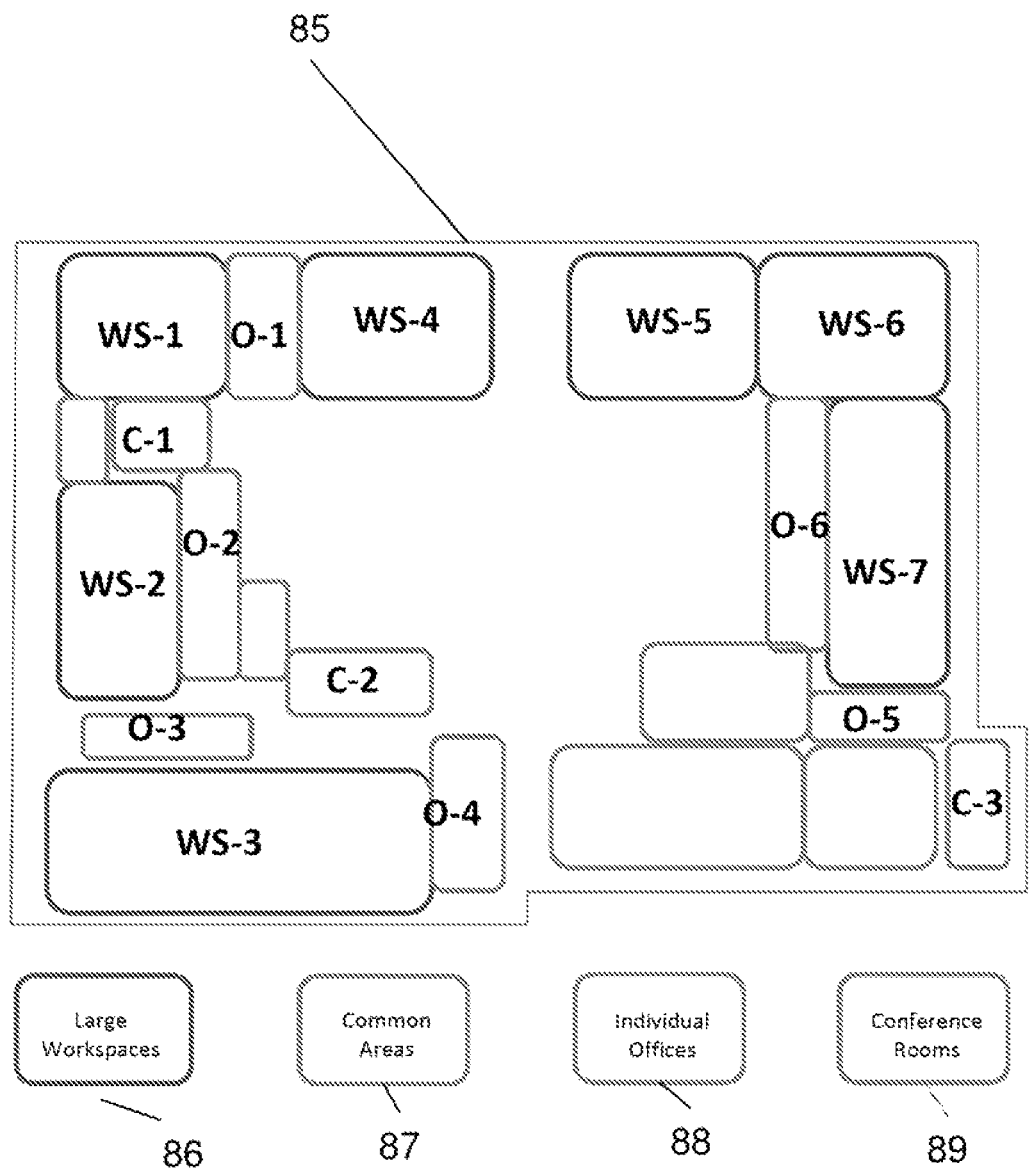
FIG. 4B is a schematic representation of a floor plan usable with embodiments of the present invention.
Figure 4C:
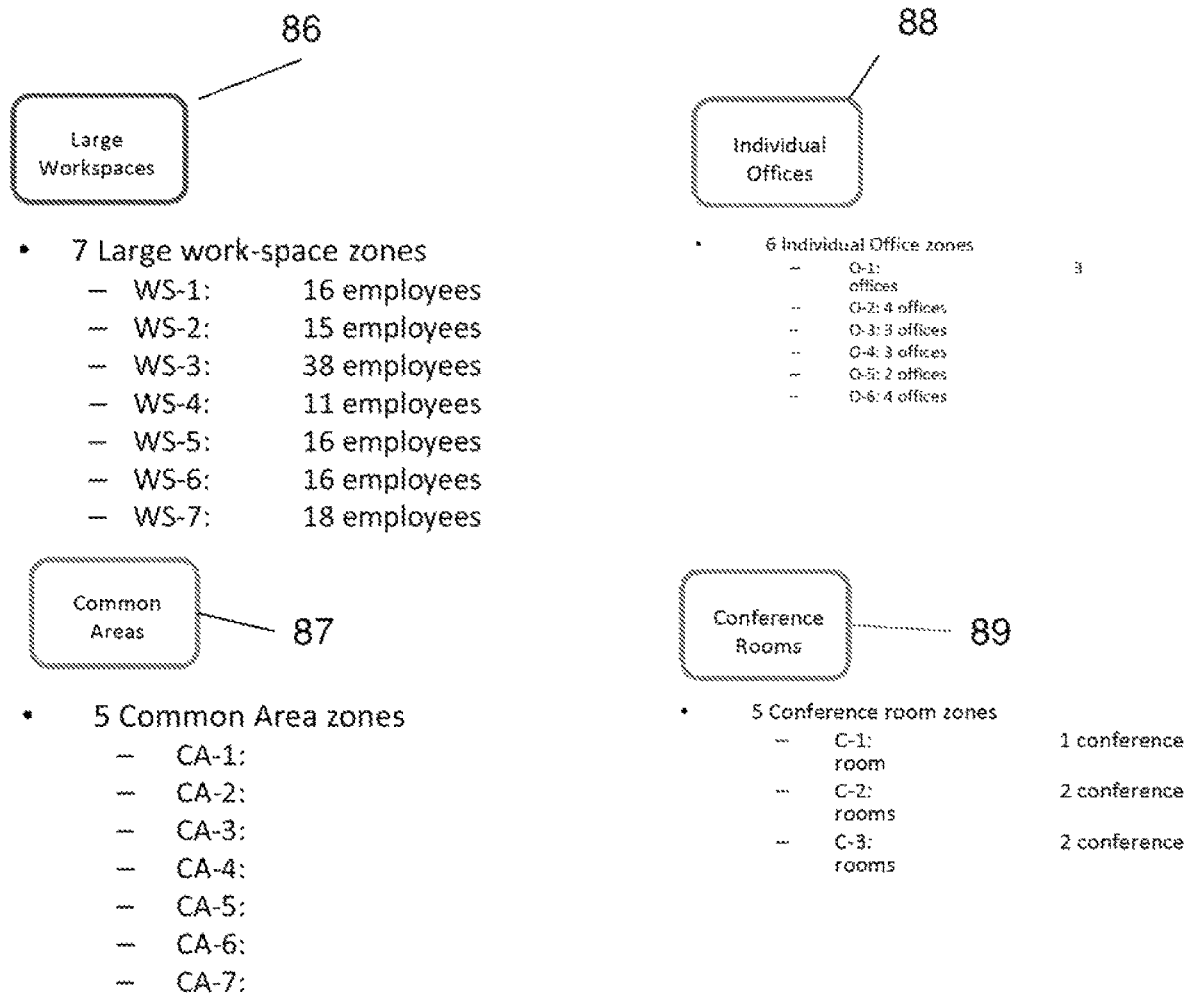
FIG. 4C is a table with summaries of information shown in the floor plan of FIG. 4B.

Turning now to FIGS. 4B and 4C, information used to populate table 44 may be obtained from a floor plan 85 (FIG. 4B) of a particular property, which as shown, has been segregated into various room types, such as large workspaces 86, common areas 87, individual offices 88, and conference rooms 89. In FIG. 4C, some of the room types have optionally been associated with additional information, such as typical occupancy levels (for Large Workspaces), and the number of rooms of a particular type, e.g., Individual Offices and Conference Rooms.

As mentioned hereinabove, embodiments of the present invention provide geo-located mobile application that allows employees and managers to report comfort levels and maintenance issues from anywhere, easily and instantaneously. This information is processed through a cloud-based report aggregation server(s) and shared with managers in real-time through a secure portal that provides comfort and maintenance information, optionally including preventive maintenance such as inspection lists, in aggregated reports. This data can be used to engage employees, improve workflow, drive operational savings, and optimize organizational performance.

These embodiments enable such report generation and aggregation in a real-time, web-based, client-server environment. While the present invention is discussed within the environment of the exemplary report aggregation facility 10, it will readily be appreciated that the present invention may be used in any number of environments including network and on-line based transaction facilities in business-to-business, business-to-consumer and consumer-to-consumer applications.

Figure 5:
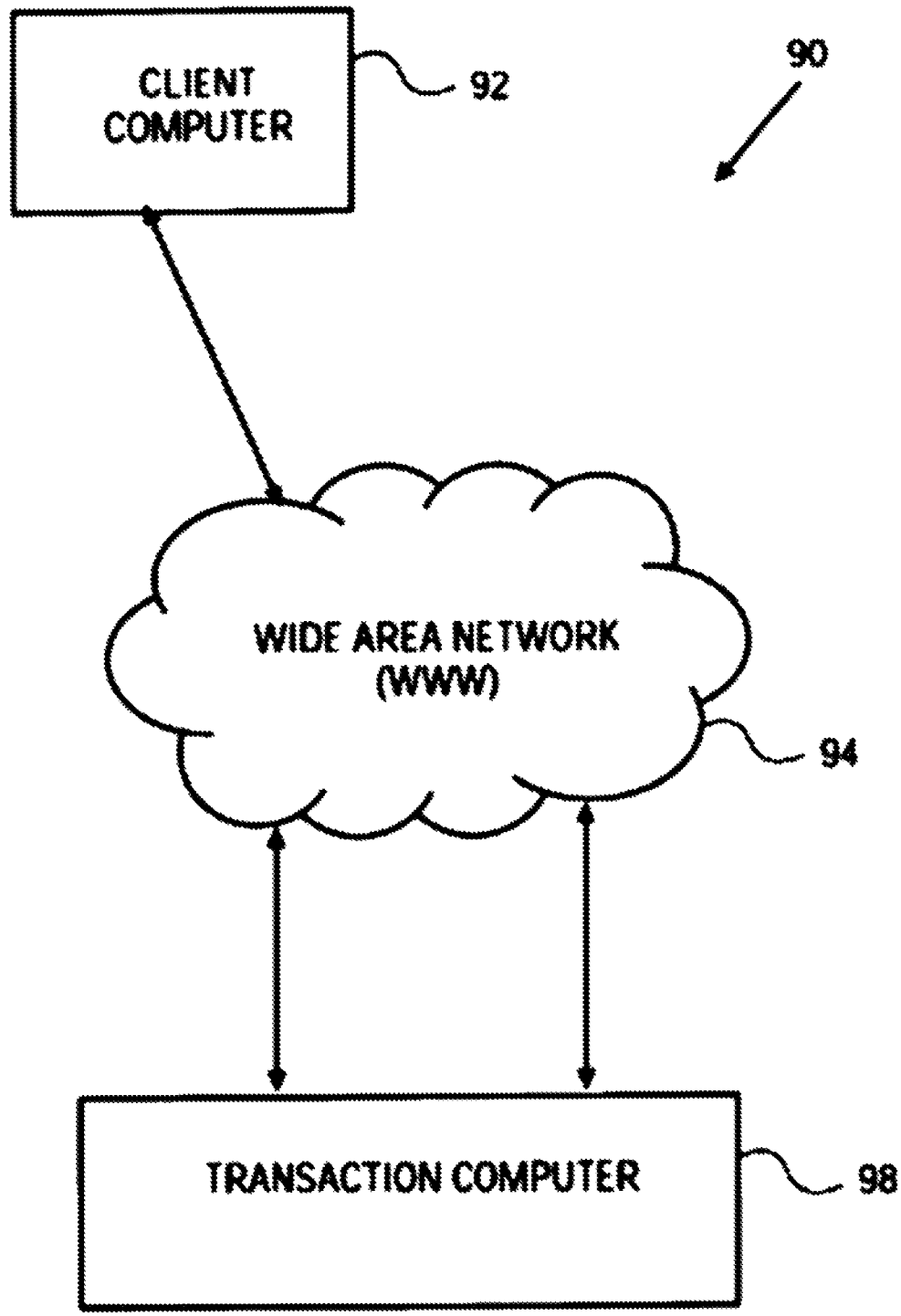
FIG. 5 is a simplified schematic diagram of one embodiment of a system within which aspects of the present invention may be embodied.

FIG. 5 is a simplified block diagram of a system 90 for generating reports in accordance with an exemplary embodiment of the present invention. In this embodiment, a client computer 92 is coupled to a transaction computer 98 via a communications network (e.g. a wide area network) 94. The client computer 92 represents a device that allows a user to interact with the report generation and aggregation facility 10 or any other transaction facility 98. In one embodiment, the client computer 92 presents to the user a report generation interface for generating reports and viewing content aggregated be the transaction computer 98.

Figure 1C:
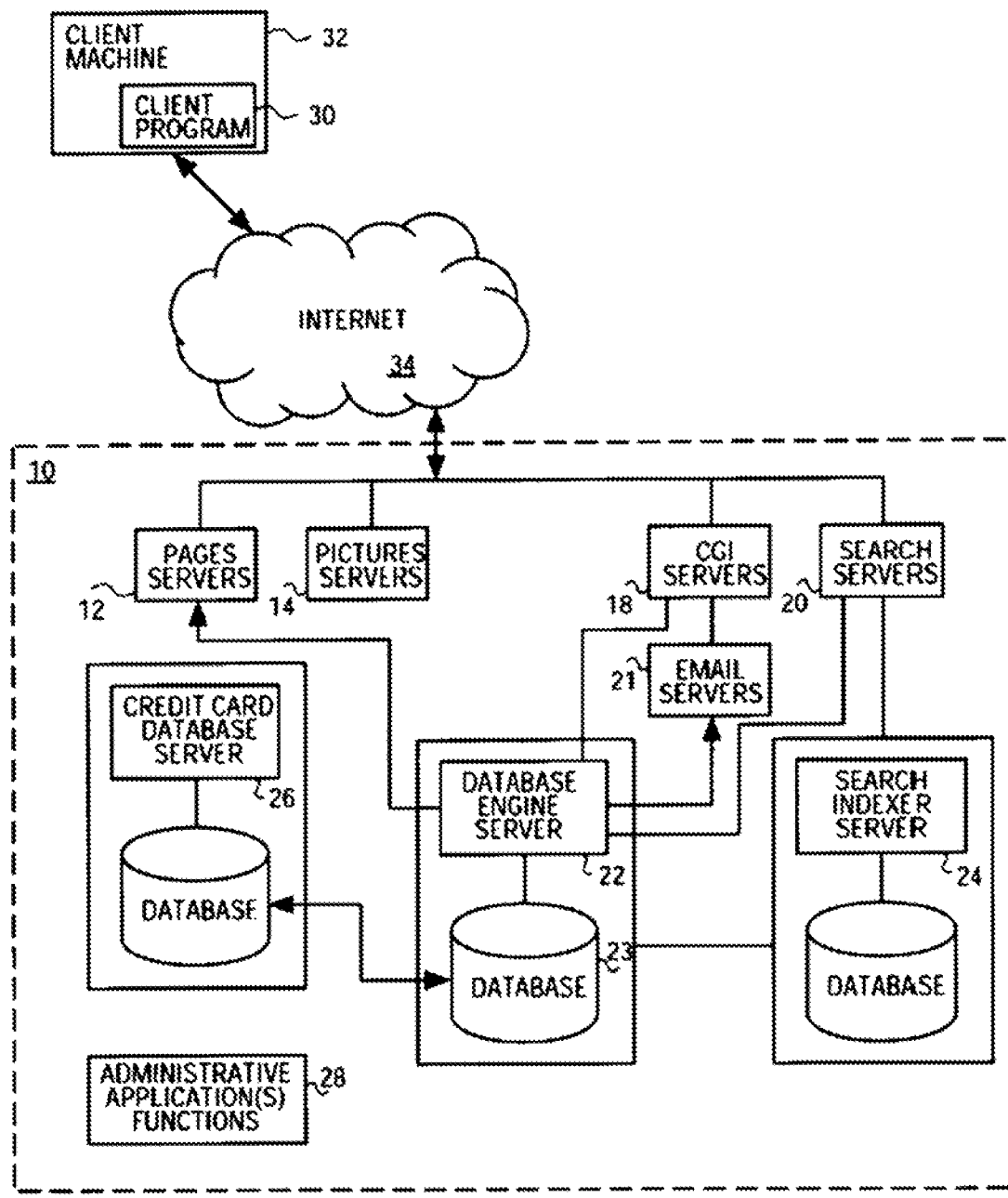
FIG. 1C is a block diagram of one embodiment of a network-based transaction facility according to an embodiment of the present invention.

The transaction computer 98, which supports a facility such as shown at 10 of FIG. 1C, handles transactions between various participants of the facility 10 including the user of the client computer 92. In one embodiment, the transaction computer 98 may initially receive the personal information of the participant from the client computer 92, and generate a subscription result which determines whether, and to what extent, the user is granted access to the facility 10. The transaction computer then facilitates the aggregation of reports in accordance with various user interfaces presented by the computer 98, via the client computer 92, to the user.

Figure 6:
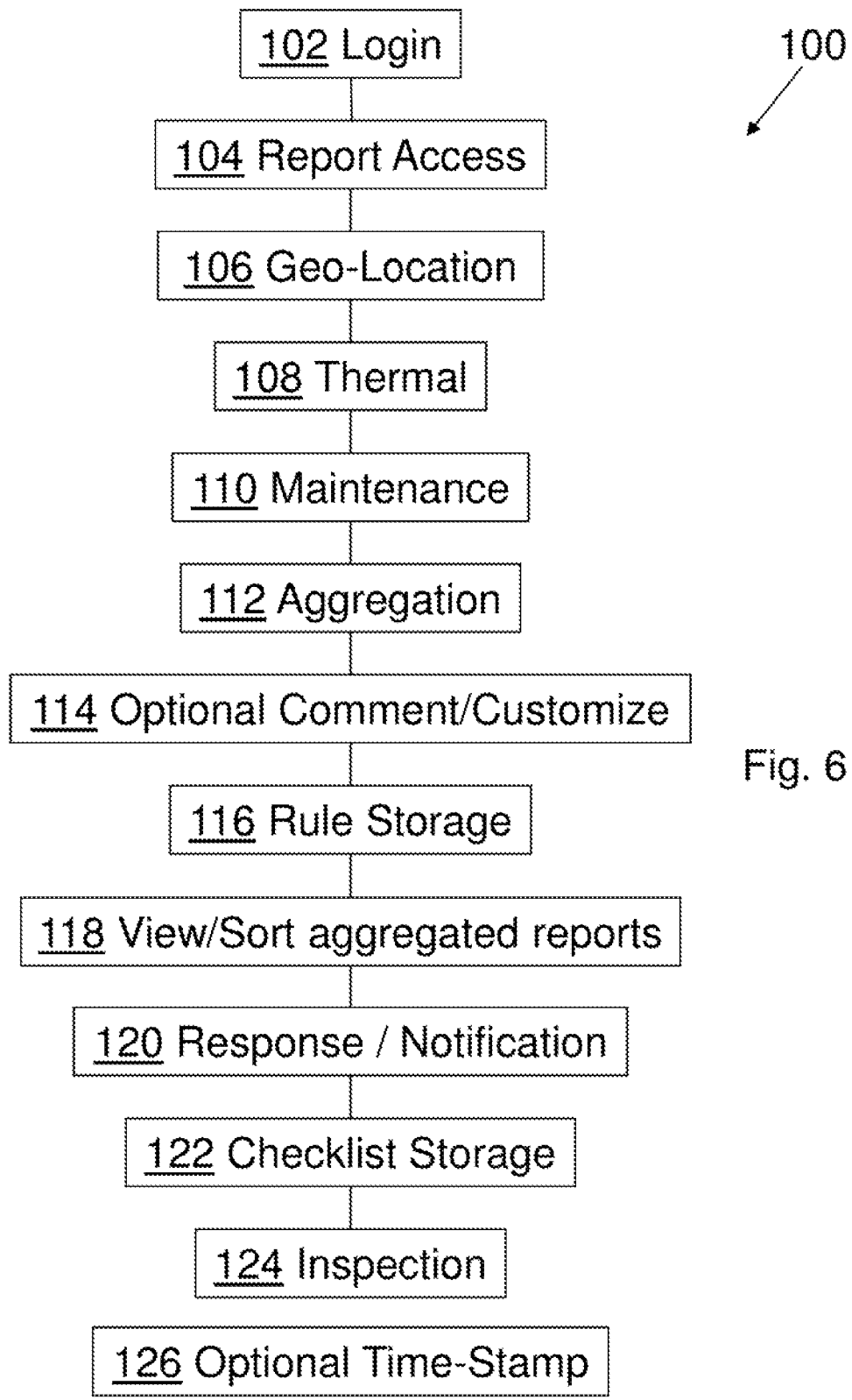
FIG. 6 is a block diagram of one embodiment of an interface sequence in accordance with embodiments of the present invention.

FIG. 6 shows a series 100 of interfaces/modules, such as may take the form of a series of objects (or methods), that may be implemented by the report aggregation facility 10, e.g., in combination with the various tables of database 23, for the purposes of generating and aggregating reports. The series 100 of interface modules shown in FIG. 6 will be described with reference to exemplary representations of the various interfaces as shown in FIGS. 8-18. It should be noted that the various modules may reside and operate on the facility 10 or alternatively, one or more of the modules, or components thereof, may be initially downloaded from the facility 10, e.g., as an application or "app", for installation on a user's smart phone, tablet or other user device 32. The skilled artisan will recognize that distribution of some components onto user devices may provide benefits such as reducing the amount of communication traffic between the user devices and the facility 10.

As shown, series 100 includes a login module 102, configured to generate a login interface through which a user of the facility 10 provides at least a user identifier and associated password. The login module may include a permissions module configured to provide selective access to the server by one or more users in accordance with permissions assigned to each user, e.g., based on whether the user is an employee of a building tenant or other building occupant, or whether the user is a manager or other responsible party having authority to address reports aggregated by the facility 10. Optionally, some users, such as the aforementioned manager, may also be requested to pay a subscription fee for access to the system.

Figure 8:
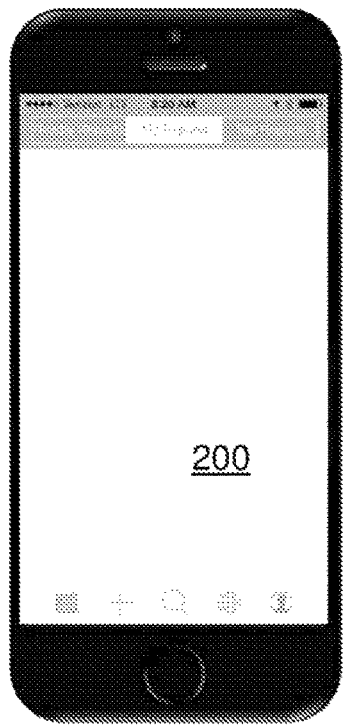
FIG. 8 is an exemplary representation of an interface included in the sequence of interfaces shown in FIG. 6.
Figure 9:
FIG. 9 is an exemplary representation of an interface included in the sequence of interfaces shown in FIG. 6.
Figure 10:
FIG. 10 is an exemplary representation of an interface included in the sequence of interfaces shown in FIG. 6.
Figure 11:
FIG. 11 is an exemplary representation of an interface included in the sequence of interfaces shown in FIG. 6.
Figure 12:
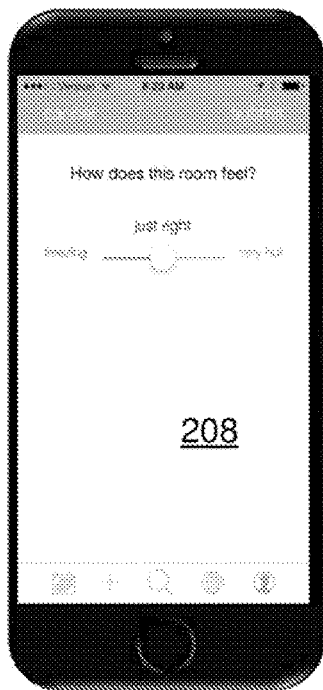
FIG. 12 is an exemplary representation of an interface included in the sequence of interfaces shown in FIG. 6.
Figure 13:
FIG. 13 is an exemplary representation of an interface included in the sequence of interfaces shown in FIG. 6.
Figure 14:
FIG. 14 is an exemplary representation of an interface included in the sequence of interfaces shown in FIG. 6.
Figure 15:
FIG. 15 is an exemplary representation of an interface included in the sequence of interfaces shown in FIG. 6.
Figure 16A:
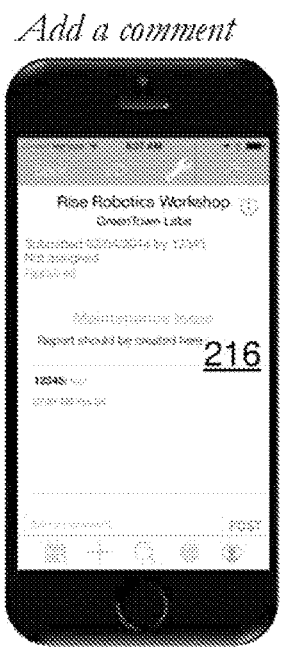
FIG. 16A is an exemplary representation of an interface included in the sequence of interfaces shown in FIG. 6.
Figure 16B:
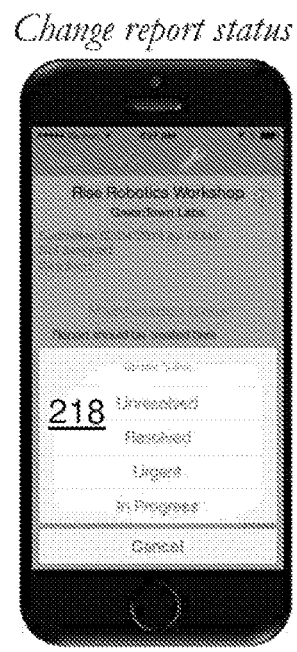
FIG. 16B is an exemplary representation of an interface included in the sequence of interfaces shown in FIG. 6.
Figure 16C:
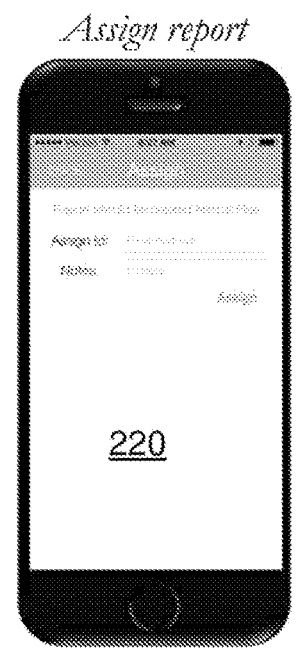
FIG. 16C is an exemplary representation of an interface included in the sequence of interfaces shown in FIG. 6.

A report access module 104 is configured to generate a report interface, such as shown at 200 in FIG. 8. Module 104 interacts with the various tables of database 23 (FIG. 1C) to enable a user to generate a new report by scanning a QR code at 202 (FIG. 9), using geo-location module 106, or by looking up a particular location, e.g., within a particular building at 204 (FIG. 10), which then permits the user to select the type of report at 206 (FIG. 11). Selecting "Rate Thermal Comfort" actuates thermal module 108, while selecting "Report a Maintenance Issue" actuates maintenance module 110, both of which permit the user to supply data, such as a thermal rating at 208 of FIG. 12 and/or a maintenance request at 210 of FIG. 13. An optional timestamp module 126 is configured to store a time stamp denoting the time of creation and/or storage at the server, of each building report.

Figure 17:
FIG. 17 is an exemplary representation of an interface included in the sequence of interfaces shown in FIG. 6.

The reports are uploaded from the user devices 32 to the facility 10 (FIG. 1C) where aggregation module 112 aggregates and stores them in database 23 (FIG. 2). An optional Comment/Customize module 114 permits a user to add custom text or images to the report, such as at 210 of FIG. 13, and/or to comment on others' reports, such as by selecting the 'agree' icon to support others' reports as shown at 212 of FIG. 14. Rule Storage module 116 enables rules to be uploaded for storage in tables 45, 46, 50 and/or 52 (FIG. 2), and/or accessed during responses as discussed hereinbelow. View/Sort module 118 actuates the interfaces 212 and 214 of FIGS. 14 and 15 to display aggregated reports from one or more users. Response/Notification module 120 actuates interfaces 216, 218 and 220 of FIGS. 16A-16C, which permit the user, which in this instance is a responsible party such as a manager having relatively high level permissions, to access the system to select specific reports to see detail and manage reports. Examples include adding a detailed comment (FIG. 16A), entering or changing status of a report, e.g., 'resolved' (FIG. 16B), which may include automatically notifying the user who originally submitted the report, and/or assigning the report to another user (colleague) for appropriate action (FIG. 16C), which may also include automatically notifying the assignee. It is noted that the notifications provided by module 120 may be accomplished automatically in any convenient manner, such as via email, text, etc., or via in-app notification, using email/communication server 21 (FIG. 1C). An example of an in-app notification is shown in FIG. 17, in which an 'assigned to me' interface 222 may display all reports that have been assigned to a particular user for resolution.

In addition to automatic notifications, response module 120 may also provide other automatic responses. For example, module 120 may automatically adjust building controls (e.g., HVAC controls) in accordance with the predetermined rules, e.g., comfort rule table 50, for the particular property, which may be accessed by rule storage module 116. One example of a rule table 50 is shown in FIG. 4D. In this example, system 10 has received and aggregated temperature reports from 30 out of 38 users located in a particular HVAC zone. As also shown, 20 of the users are requesting a temperature increase, while 5 are requesting a decrease, and 5 are requesting no temperature change. The rule table includes a weighting rule, which in this example, is pro rata, with 50 percent of the neutral 'no change' weightings being subtracted from each of the 'increase' and 'decrease' weights. An increase/decrease weighting rule subtracts the 'decrease' weighting from the 'increase' weighting, to yield a net weighting which if positive, corresponds to a percentage increase, and if negative corresponds to a percentage decrease of the 'Max Change' in temperature parameter. In the example shown, the aggregated reports produce a net weighting of +0.50 which dictates a positive adjustment of 50 percent of the 'Max Change' parameter of 5 degrees, to yield a recommended increase of 2.5 degrees. This recommended change may be effected automatically, by a transmission to the building HVAC system, or alternatively, may be sent to the interface 218 of FIG. 16B for action by a manager or other responsible party.

Figure 18:
FIG. 18 is an exemplary representation of an interface included in the sequence of interfaces shown in FIG. 6.

Response module 120 may also include an inspection module 122 configured to generate and populate a checklist display 224 such as shown in FIG. 18. The checklist interface enables a user to identify, e.g., with a checkmark, the particular asset being inspected. Aggregation module 124 serves to store and aggregate the various reports, including any comments/customization and responses, while also providing various reporting capabilities such as shown at 82 of FIG. 1B, and as will be discussed in greater detail hereinbelow.

Exemplary methods associated with system 100 of the present invention, will now be described as illustrated by the flow chart of FIGS. 7A and 7B.

Figure 7A:
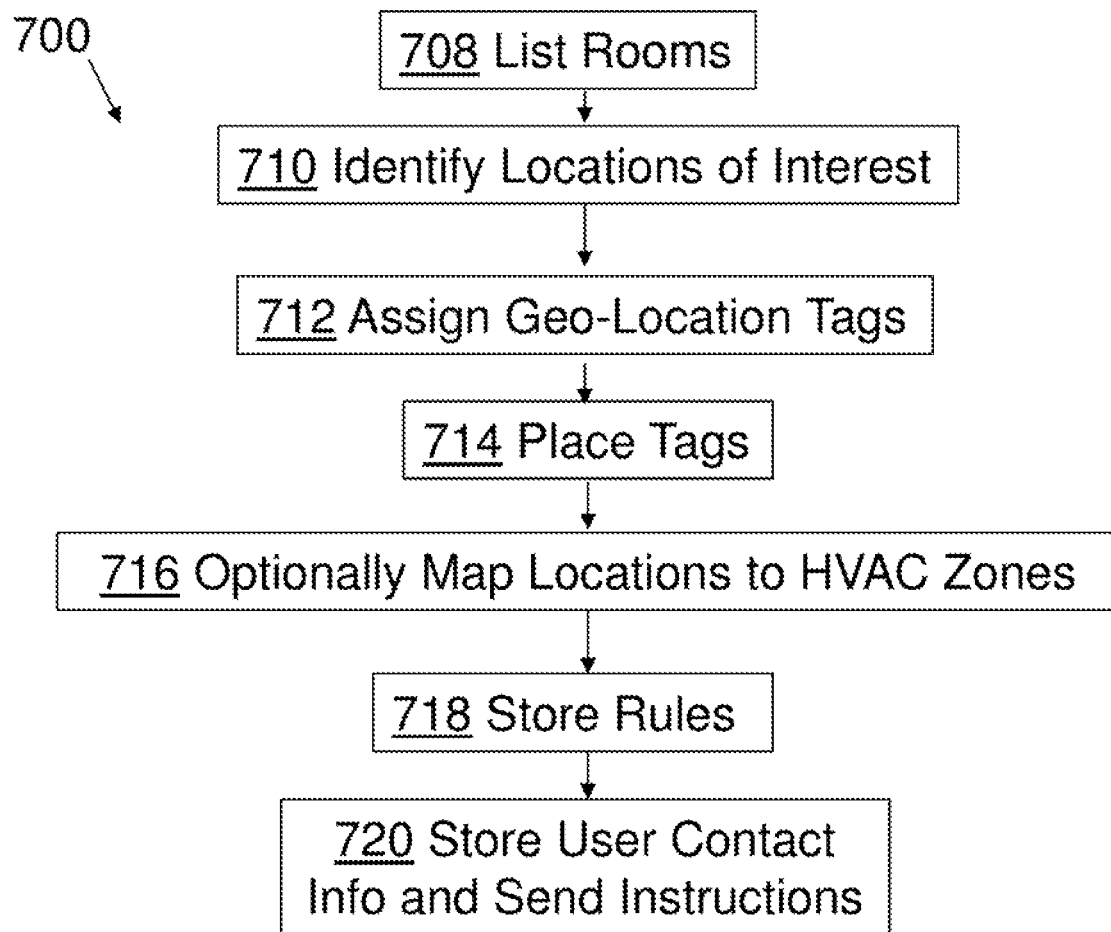
FIG. 7A is a flow chart of one embodiment for a method of the present invention.

Referring now to FIG. 7A, a method 700 for configuring the system for environmental comfort use at a particular property is shown and described. At 708, a list of rooms, including common areas, for the property is obtained, e.g., using floor plans such as shown in FIG. 4B, or created by touring the property and counting rooms, etc. At 710, a list of locations of interest within the rooms is generated. At 712, unique tags, such as individualized QR Codes, are generated for each location of interest. At 714, the tags are placed at the locations of interest, e.g., by printing the QR Codes onto markers which are physically placed at their corresponding locations. It should be noted that the locations of interest may be determined as granularly as desired. For example, a single room may have multiple tags, such as to capture comfort data at opposite ends of a large conference table. At 716, each location of interest is optionally mapped to an HVAC zone in the building. At 718, a set of rules (e.g., comfort, maintenance, inspection, etc.) rules is set for the particular property, e.g., to determine how often and how much the temperature can be changed by the system within an HVAC zone, etc. At 720, user contact information is captured and stored to table(s) 40, and notification, e.g., by email, text, social media, etc., is sent to employees or occupants of the property letting them know about the system and providing instruction on how to use it.

Figure 7B:
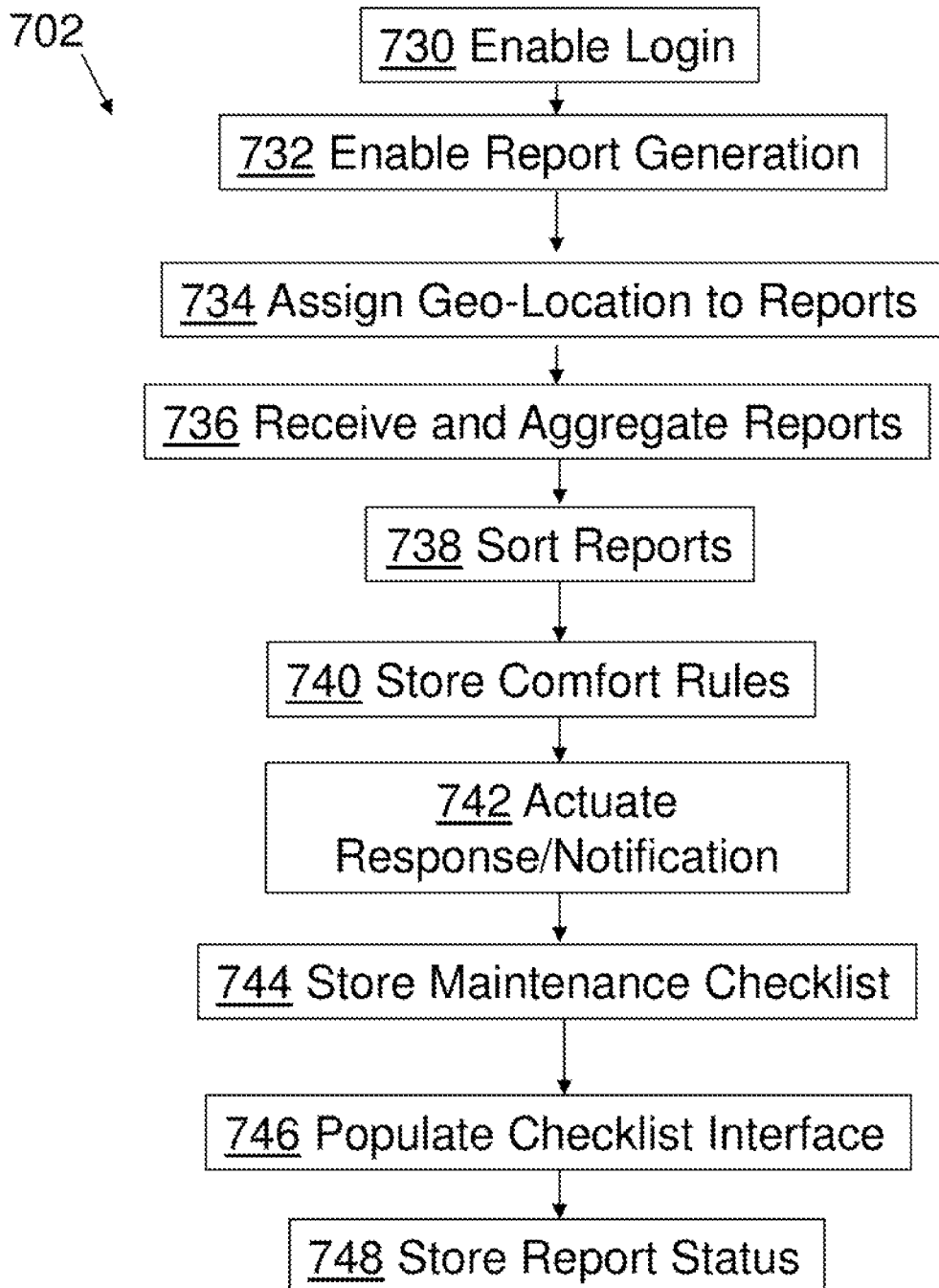
FIG. 7B is a flow chart of another embodiment for a method of the present invention.

Referring now to FIG. 7B, a method 702 for operating system 100 is shown and described. As shown, the method 702 commences with enabling the login module at 730 to provide user interface information to a user of the transaction facility at client 32 (FIG. 1). More specifically, the user interface information may provide a login interface via login module 102 (FIG. 6). Subsequent to the login by the user, at 732 the report access module is actuated to generate a report interface displayable on the client computers to enable the users to generate one or more building reports in the form of (i) thermal reports using a thermal report module, and/or (ii) maintenance reports using a maintenance report module. At 734, the geo-location module 106 is actuated to assign a location within the building to each building report. At 736, the aggregation module 112 is actuated to receive the building reports from the client computers, and to store and aggregate the building reports at the server. At 738, the View/Sort module 118 sorts the aggregated reports according to their assigned locations, and transmits the sorted reports to the one or more client computers for display. At 740, rule storage module 116 is actuated to store any comfort rules for the building that have not previously been loaded into database 23 (FIG. 1C). At 742, Response/Notification module 120 is actuated to (i) permit a manager at a client computer to access the server to select for response, and assign a response status, to particular reports, and/or (ii) automatically respond and assign a response status to particular reports in accordance with said set of comfort rules. At 744, checklist storage module 122 is actuated to store a list of preventative maintenance items for the building. At 746, inspection module 124 is actuated to generate and populate a checklist interface on the user device, the checklist interface configured to display the list of preventative maintenance tasks, each of the tasks being user-selectable to designate completion of each individual task. At 748, the aggregation module 112 is actuated to store the status of the reports.

Figure 7C:
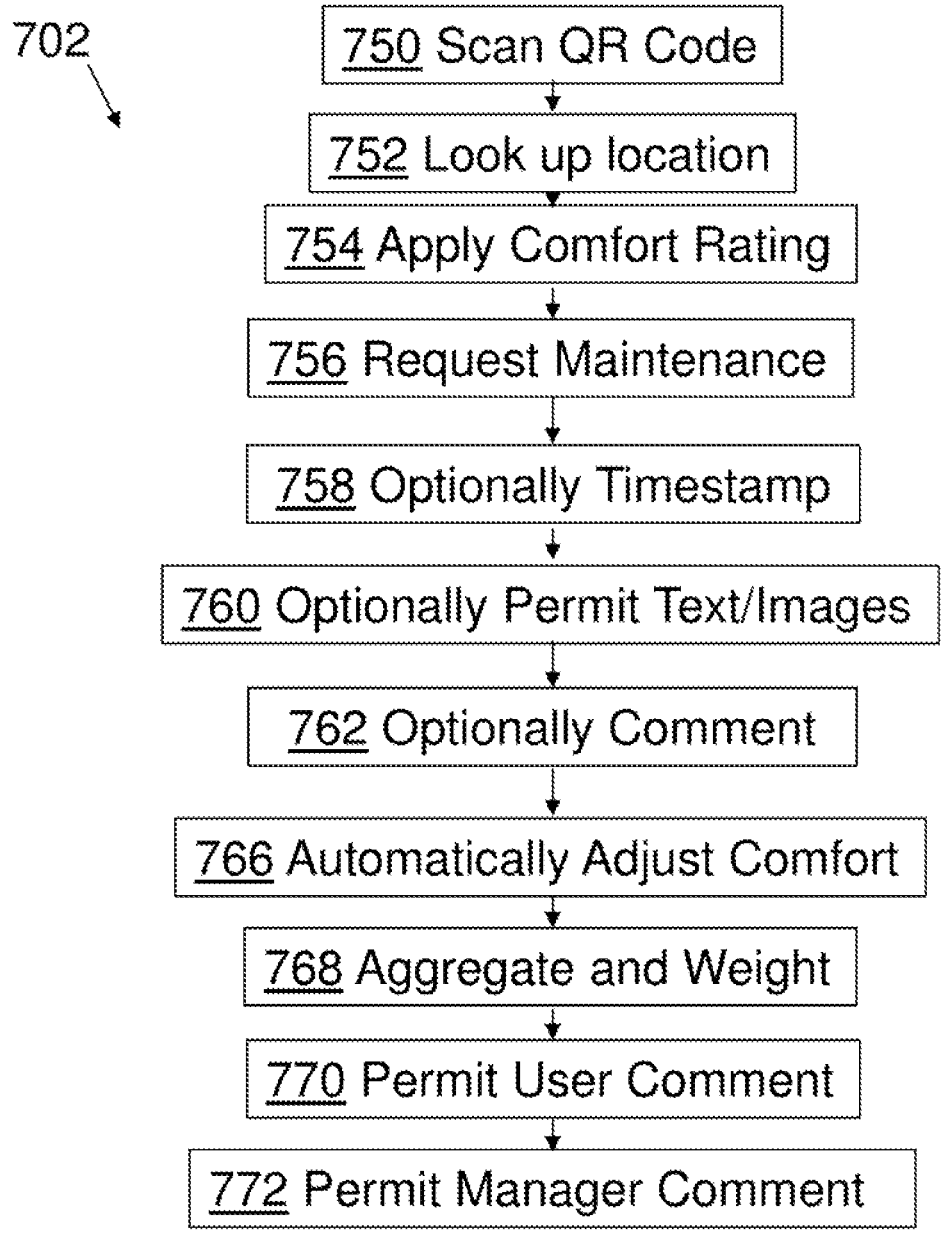
FIG. 7C is a flow chart of another embodiment for a method of the present invention.

Various optional additions to method 702 are shown in flowchart 704 of FIG. 7C. As shown, at 750, report access module 104 is actuated to permit a client computer to generate a building report by scanning a QR code disposed at a predetermined location within the building. At 752, report access module 104 is actuated to permit a client computer to generate a building report by looking up a particular location within the building. At 754, report access module 104 is actuated to permit a client computer to apply a thermal comfort rating to one or more of the thermal reports. At 756, report access module 104 is actuated to permit a client computer to apply a maintenance request to one or more maintenance reports. At 758, optional time-stamp module 126 is actuated to store a time stamp denoting the time of creation and/or storage at the server, of each building report. At 760, optional Comment/Customize module 114 is actuated to permit a user at a client computer to add custom text and/or images to a report. At 762, step 760 further includes permitting the user to comment on reports. At 766, Response/Notification module 120 is actuated to automatically adjust the environmental control system in accordance with the predetermined rules for the building. At 768, Response/Notification module 120 is configured to aggregate and assign weights to reports associated with a particular location, and to use the weights to generate a control signal to adjust one or more operational parameters of the environmental control system. At 770, Response/Notification module 120 is actuated to permit a user, via the one or more client computers, to add a comment to one or more reports. At 772, step 770 further includes permitting a manager, via the one or more client computers, to assign one or more reports to one or more particular users for response.

It should be recognized that in the embodiments shown and described hereinabove, heat maps, such as shown at 82 in FIG. 1B, may be automatically generated and displayed in the user device interface(s) once thermal reports are aggregated. Moreover, as reports come in notifications may be provided directly to the individuals who need them. For example a comfort report may be delivered directly to the smart phone device of the person who manages the building management system, but a report on the generator may go to the device of an appropriate Environmental Health and Safety professional.

Particular embodiments may also be configured to accept an initiation of a temperature change by any individual who works in a particular zone. This process may be generally the same for every kind of occupied office space except the individual office on a single room zone. In that case, the occupant could increase the set-point on his or her own (within normal set-point ranges).

In addition to the rules in the temperature adjustment example shown and described hereinabove, the temperature change mechanism may have any number of additional rules, such as those that limit the number of changes that can be initiated by per day or per hour. Moreover, the rules may be space (zone) specific. The rules are typically set by the employer, or building manager and may be adjusted easily as needed.

Once a temperature change is initiated all of the employees in the zone may be notified by any convenient method. An exemplary notification may state:

"An individual in your zone is uncomfortable and has requested a temperature change. Your feedback is important so please let us know your preference to increase, decrease or maintain the current temperature. To do so please open the CrowdComfort application and provide your choice. In order for us to account for your temperature preference we will need your participation within 5 minutes of receipt of this notice."

After the 5 minute period the votes may be tabulated by embodiments of the present invention.

It should also be recognized that data may be gathered an accumulated and a profile generated for each user submitting a comfort report. For individuals that are often uncomfortable, managers may begin to address their levels at an individual level as opposed to at the system/zone level. Moreover, users who are habitual outliers may be accorded less weight than other users. Still further, although QR Codes have been shown and described as a convenient geo-location device, other approaches for geo-location may include Wi-Fi, Bluetooth, I-Beacon, RFID or other location method to send the notification only to people within a particular zone.

It should also be recognized that although the various embodiments have been shown and described with respect to particular buildings, the embodiments need not be limited solely to interior applications. Rather, the embodiments may be applied to various property types, including buildings and campuses having both interior and exterior locations of interest, including rooftop decks and equipment, courtyards, patios, etc., for which it may be desirable to receive and aggregate comfort, maintenance, and/or inspection reports.

Figure 19:
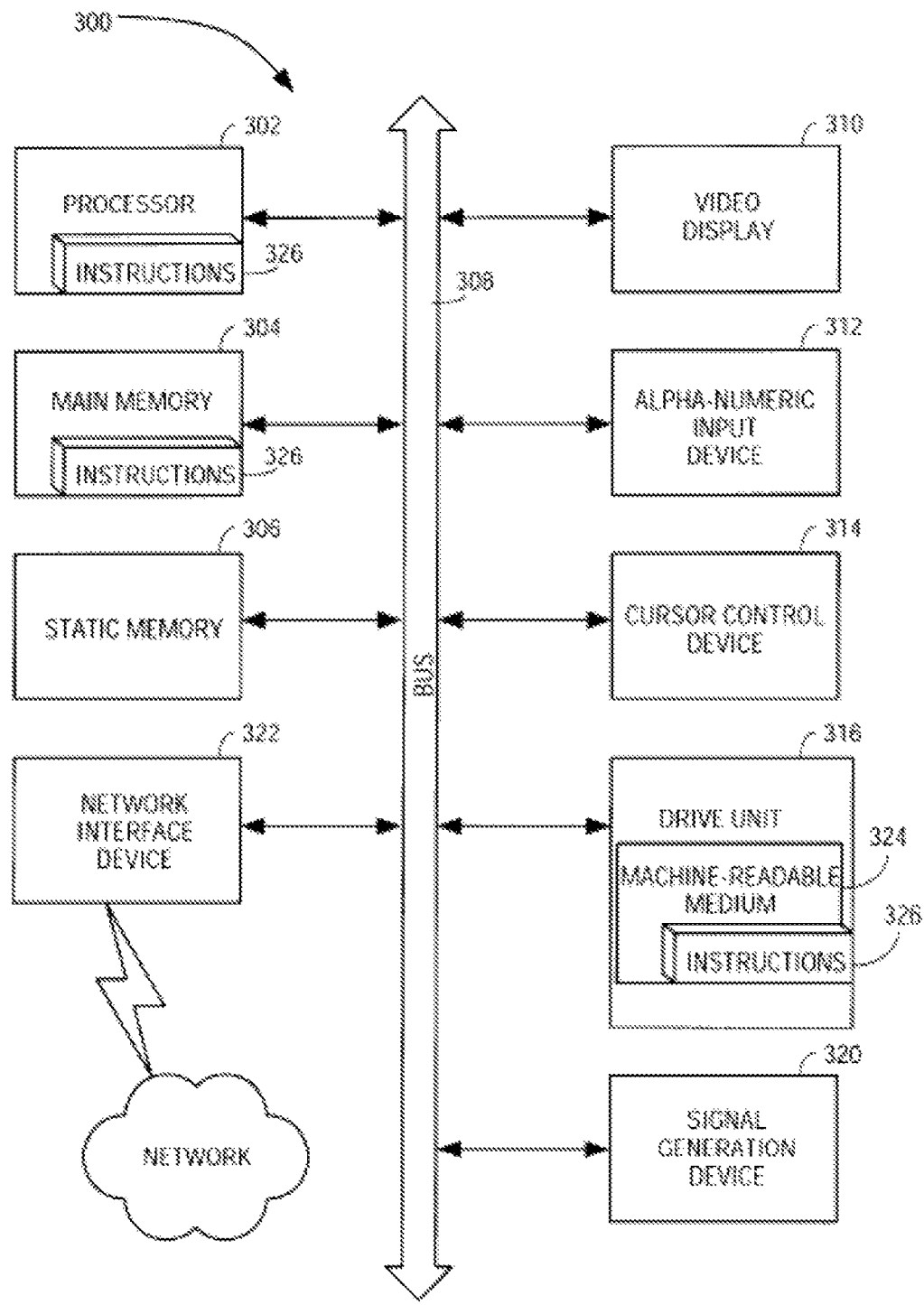
FIG. 19 is a block diagram of one embodiment of a computer system usable in various aspects of the present invention.

FIG. 19 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

Furthermore, embodiments of the present invention include a computer program code-based product, which includes a computer readable storage medium having program code stored therein which can be used to instruct a computer to perform any of the functions, methods and/or modules associated with the present invention. The non-transitory computer readable medium includes any of, but not limited to, the following: CD-ROM, DVD, magnetic tape, optical disc, hard drive, floppy disk, ferroelectric memory, flash memory, phase-change memory, ferromagnetic memory, optical storage, charge coupled devices, magnetic or optical cards, smart cards, EEPROM, EPROM, RAM, ROM, DRAM, SRAM, SDRAM, and/or any other appropriate static, dynamic, or volatile memory or data storage devices, but does not include a transitory signal per se.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

Figure 20:
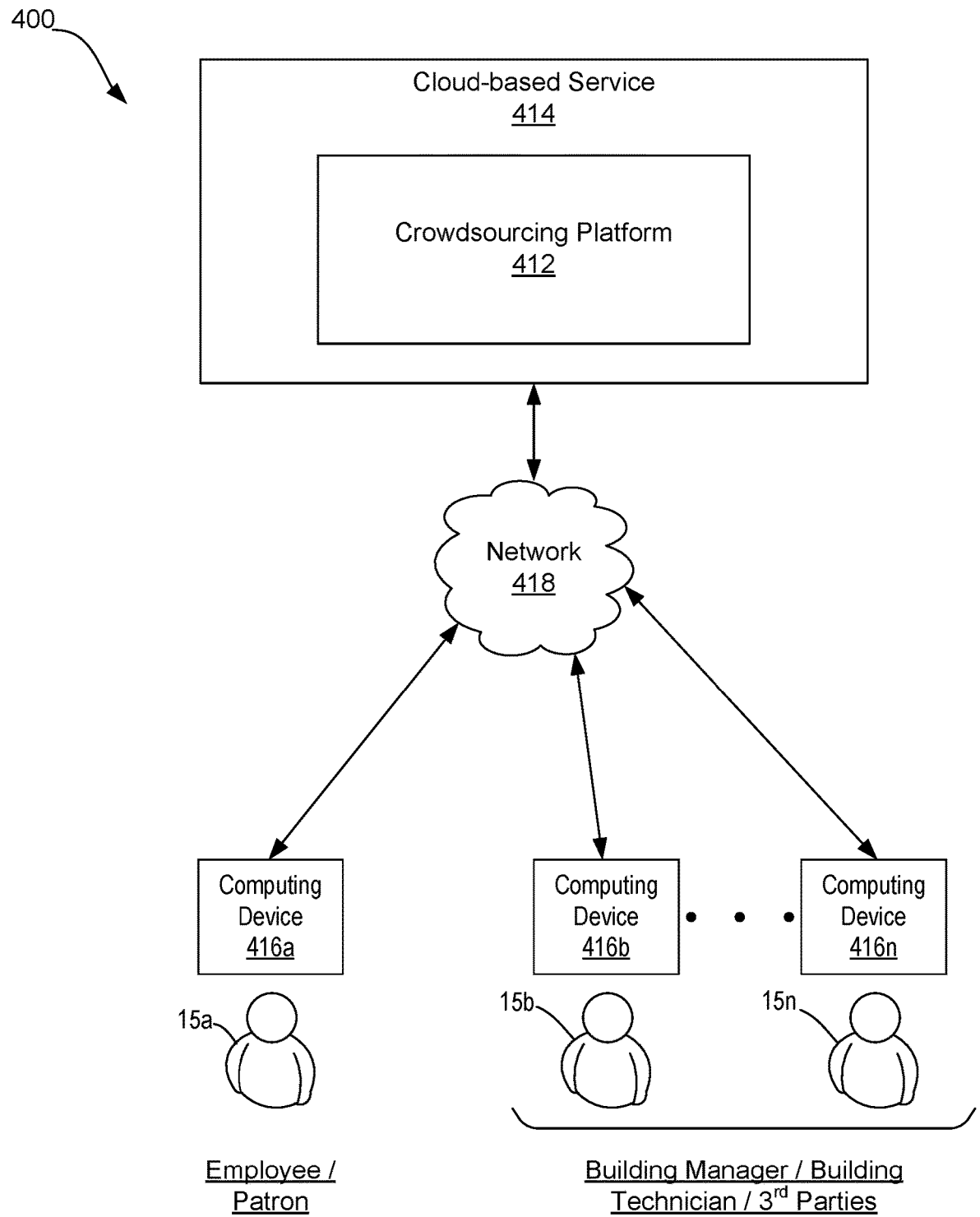
FIG. 20 is a block diagram illustrating one embodiment of an exemplary system for providing an intuitive and semi-automated means of collecting and managing crowdsourced data via a crowdsourcing platform.

FIG. 20 is a block diagram illustrating one embodiment of an exemplary system 410 for providing an intuitive and semi-automated means of collecting and managing crowd-sourced data via a crowdsourcing platform 412. As shown, system 10 includes a crowdsourcing platform 412 embodied on an internet-based computing system/service. For example, as shown, the crowdsourcing platform 412 may be embodied on a cloud-based service 14, for example. The crowdsourcing platform 412 is configured to communicate and share data with one or more users 415(a)-415(n) via computing devices 416(a)-416(n) over a network 418, for example.

In the present context, the users 415(1)-415(n) may include administrators, customers, or clients of a service provided to one or more remote users via the crowdsourcing platform 412. The users 415(1)-415(n) may also include particular persons to which the service is directed.

For example, the crowdsourcing platform 412 may receive user-driven data related to a particular environment in which users may be located, or otherwise reside, wherein such data may be useful to an owner or management service of the space or for conveying useful information to users within the space. In particular, at least some of the users may include occupants/patrons within a building (e.g., employees), while other users may include an entity 415(b)-415(n) (including members of that entity) having an interest in the users 415a, such as the employer, building management, building technician(s), and other third parties generally.

The crowdsourcing platform 412 is configured to capture and analyze feedback from one or more persons within a given space and provide numerous features and services based, at least in part, on the analysis. For example, in some embodiments, the crowdsourcing platform 412 is configured to collect crowdsourced data or information from one or more users/occupants 415a within a space of a building via a software application (e.g., smartphone or mobile application). In turn, the platform 412 is able to thereby collect multiple-user feedback with regard to any specific aspect of a given space, which may include feedback related to comfort issues such as HVAC issues (e.g., temperature of a particular room within a building is either too hot or too cold), building maintenance issues (e.g., lighting issues, cleanliness of facilities, etc.), as well as other aspects of a building or space that may be useful in management of such space.

The network 418 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the computing devices 416 and/or between the computing devices 416 and the cloud-based service 414, may be, in whole or in part, a wired connection.

The network 418 may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), the most recently published versions of IEEE 802.11 transmission protocol standards, other networks capable of carrying data, and combinations thereof. In some embodiments, network 418 is chosen from the internet, at least one wireless network, at least one cellular telephone network, and combinations thereof. As such, the network 418 may include any number of additional devices, such as additional computers, routers, and switches, to facilitate communications. In some embodiments, the network 18 may be or include a single network, and in other embodiments the network 418 may be or include a collection of networks.

The crowdsourcing platform 412 is configured to communicate and share data with the computing devices 416 associated with one or more users 415. Accordingly, the computing device 416 may be embodied as any type of device for communicating with the crowdsourcing platform 412 and cloud-based service 414, and/or other user devices over the network 418. For example, one or more of the user devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

In the embodiments described here, the device 416a associated with at least the employee/patron/occupant 415a is generally embodied as a smartphone or tablet and the devices 416b-416n associated with the other users (associated with building management, building technician, other 3rd parties) may as be embodiment as a smartphone or tablet, or any one of the other computing devices previously listed herein. Furthermore, in the embodiments described here, the computing device 416a is generally embodied as a smartphone having one or more sensors for capturing various data related to one or more of user movement, user location, signals outputted from or received by the computing device 416a, and the like, as well as receiving active input from a user to be communicated to the crowdsourcing platform 412.

It should be noted that, although the following description refers to the mobile device 416 as being a smartphone, the mobile device 16 may be embodied as a "smart" appliance or system. A "smart" appliance or system or may include, for example, any appliance or system having wireless (or wired) capability to communicate and exchange data with the crowdsourcing platform 412 in a manner described herein. For example, rather than receiving user-driven data from a user via their smartphone, the crowdsourcing platform 412 may receive data from other systems in a building or space, such as lighting system, for example, networked or otherwise connected to the crowdsourcing platform 412 so as to provide information related to occupancy (e.g., lights on versus lights off) in any given room of a space. Accordingly, in addition, or alternatively, to user-driven data received from smartphones, or other mobile devices, the crowdsourcing platform 412 may receive data from other connected systems, which can essentially assist in, not only the rendering of floor plans, but also the mapping of traffic patterns within a space, as will be described in greater detail herein.

It should further be noted that the various features and services provided by the crowdsourcing platform 412 are flexible and can be customized to fit any entity's culture and needs. For example, the health management services provided via the crowdsourcing platform 412 may be implemented via the cloud-based service, including, for example, a software as a service (SaaS) model, thereby providing an entity (i.e., building management, building technician, other third party, etc.) with on-demand insights using the crowdsourced data from the mobile devices of users.

As previously described, the crowdsourcing platform 412 is configured to capture and analyze feedback from one or more persons within a given space and provide numerous features and services based, at least in part, on the analysis.

Such features and services include, for example, application management services, which includes a means for certain users (users with authority) to create, modify, or otherwise control distribution of, mobile applications to the mobile devices 416. In particular, certain users 415 may access the crowdsourcing platform 412 for the purposes of altering, modifying, or otherwise controlling output of data from the crowdsourcing platform 412 to other users 415 who do not have direct access. For example, in the event the user 415 is a client, customer, administrator, or developer associated with the service provided via the crowdsourcing platform 412, such a user may have access to one or more tools for creating, modifying, or controlling a particular app running on mobile devices 416. Accordingly, the crowdsourcing platform 412 is configured to provide an interface with which such authorized users, such as a developer for example, may interact for the purposes of allowing control over the running app. Upon modifying the app, the authorized user may then choose to transmit modifications to the app to mobile devices 416 for subsequent updates of the app.

The crowdsourcing platform 412 is further configured to provide geolocation services based on the crowdsourcing, or polling, of users of the mobile devices so as to determine location and movement of the users within a specific environment. In the embodiments described herein, the environment is an indoor environment, such as an office space. However, it should be noted that the systems and methods of the present invention may be used in outdoor environments. Further, it should be noted that the terms "geolocation" and "positioning" may be used interchangeably herein, particularly when referring to "indoor geolocation" or "indoor positioning". In addition to determining the location and movement of users within a given space (i.e., a building or floor of a building, or the like), the crowdsourcing platform 412 is further configured to automatically map a floor plan, layout, or model of a location based on collected crowdsourced data collected as part of the geolocation service.

The crowdsourcing platform 412 is further configured to recognize and recalibrate data errors during the collection and aggregation of the crowdsourced data, thereby providing error correction and management, which may be particularly useful for analyzing rendered floor plans, models, or layouts in light of user input data continually collected so as to determine any potential errors in data input.

Additionally, as part of geolocation services, the crowdsourcing platform 412 is configured to leverage a Short Message Service (SMS) communication system for generating and transmitting command text messages to a user's smartphone or mobile device. The command text messages essentially elicit or otherwise train/educate the user's smartphone or mobile device to automatically transmit requested data back to the crowdsourcing platform 412 while the user is within a given environment and/or utilizing the service to report comfort and/or maintenance issues. The requested data may include, for example, the location or position of the user at the time of the reporting of any issue. Accordingly, the geolocation service, including the specific features of such a service described herein, allows for the a user's (e.g., employee/patron/occupant) location to be determined and tied to the user's feedback or request at the time such feedback or request is created, thereby improving the accuracy and effectiveness of an actionable response to address the user's feedback/request.

For example, upon receiving the crowdsourced data (i.e., user feedback/request regarding environmental parameters, maintenance issues, and the like along with location data), the crowdsourcing platform 412 is configured to produce an actionable response, which may include, for example, automatic control of the building's climate system (e.g., HVAC) and/or generation and transmittal of maintenance issues requiring attention, allowing building owners or facility managers to respond to occupant concerns in a much more rapid and cost effective manner. In particular, user comfort can be better managed (i.e., control the output from HVAC systems for given spaces based on the given demand) and maintenance issues can be addressed with a higher degree of precision.

As part of providing an actionable response, the crowdsourcing platform 412 is configured to first analyze the data so as to determine what actions, if any, may or should be taken (either automatically via a building management system or the like or suggested actions to be taken via a maintenance worker or building manager). In particular, the crowdsourcing platform 412 is configured to analyze crowdsourced data utilizing various analysis techniques, including, but not limited to, contextual data analytics and predictive analytics, to thereby improve accuracy in terms of environment mapping and locating of users, understanding user requests and feedback, and further utilizing such data to provide an enriched set of features and services in the fields of workplace and building management.

Figure 21:
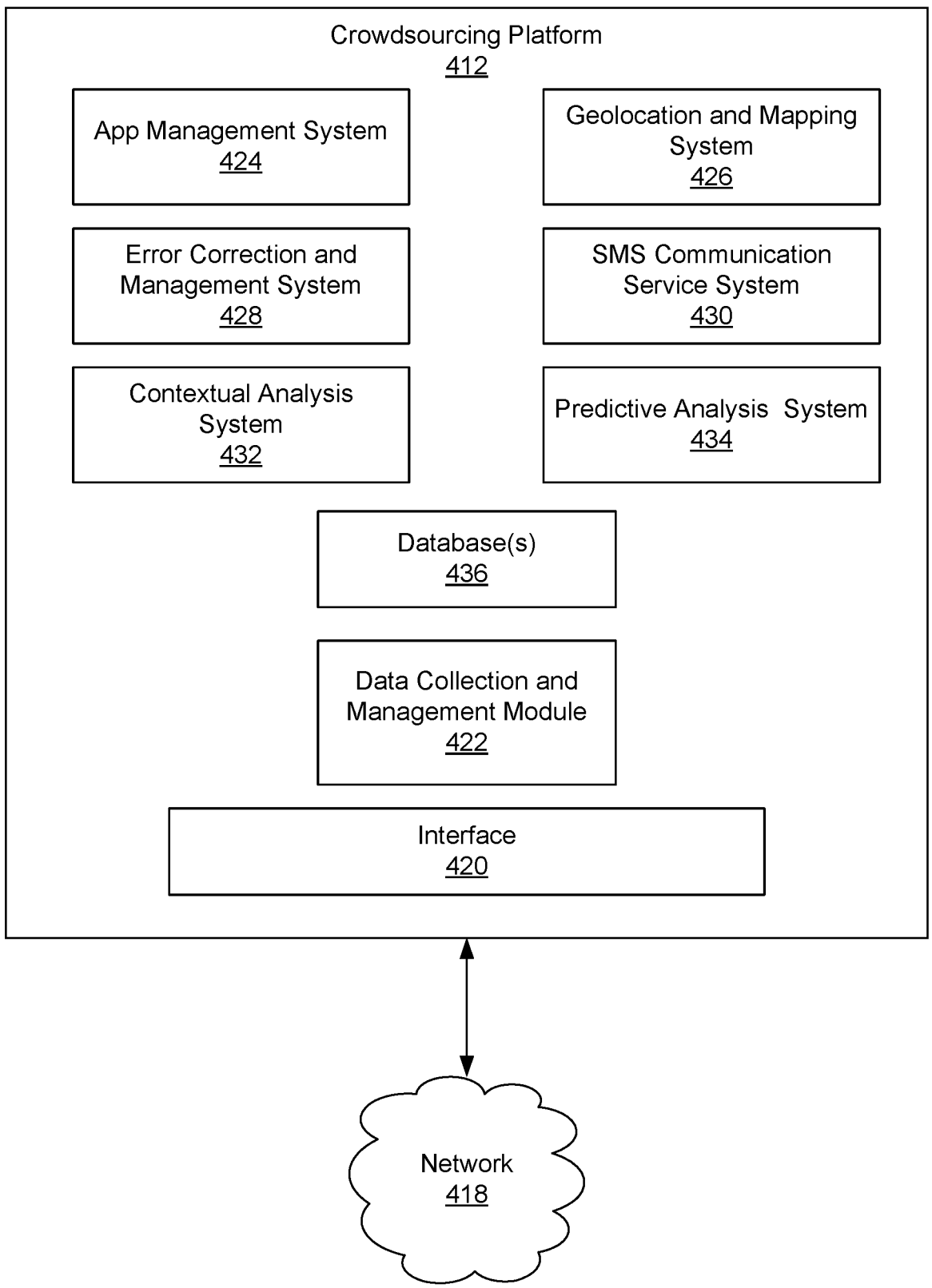
FIG. 21 is a block diagram illustrating the crowdsourcing platform of FIG. 20 in greater detail.

FIG. 21 is a block diagram illustrating the crowdsourcing platform 412 in greater detail. As shown, the crowdsourcing platform 412 may include an interface 420, a data collection and management module 422, an app management system 424, a geolocation and mapping system 426, an error correction and management system 428, an SMS communication service system 430, a contextual analysis system 432, a predictive analysis system 434, and one or more databases 436 for related data. For example, the data collection and management module 422 may be configured to communicate and exchange data with one or more of the app management system 424, geolocation and mapping system 426, error correction and management system 428, SMS communication service system 430, contextual analysis system 432, predictive analysis system 434, and one or more databases 436, each of which is described in greater detail herein.

Figure 22:
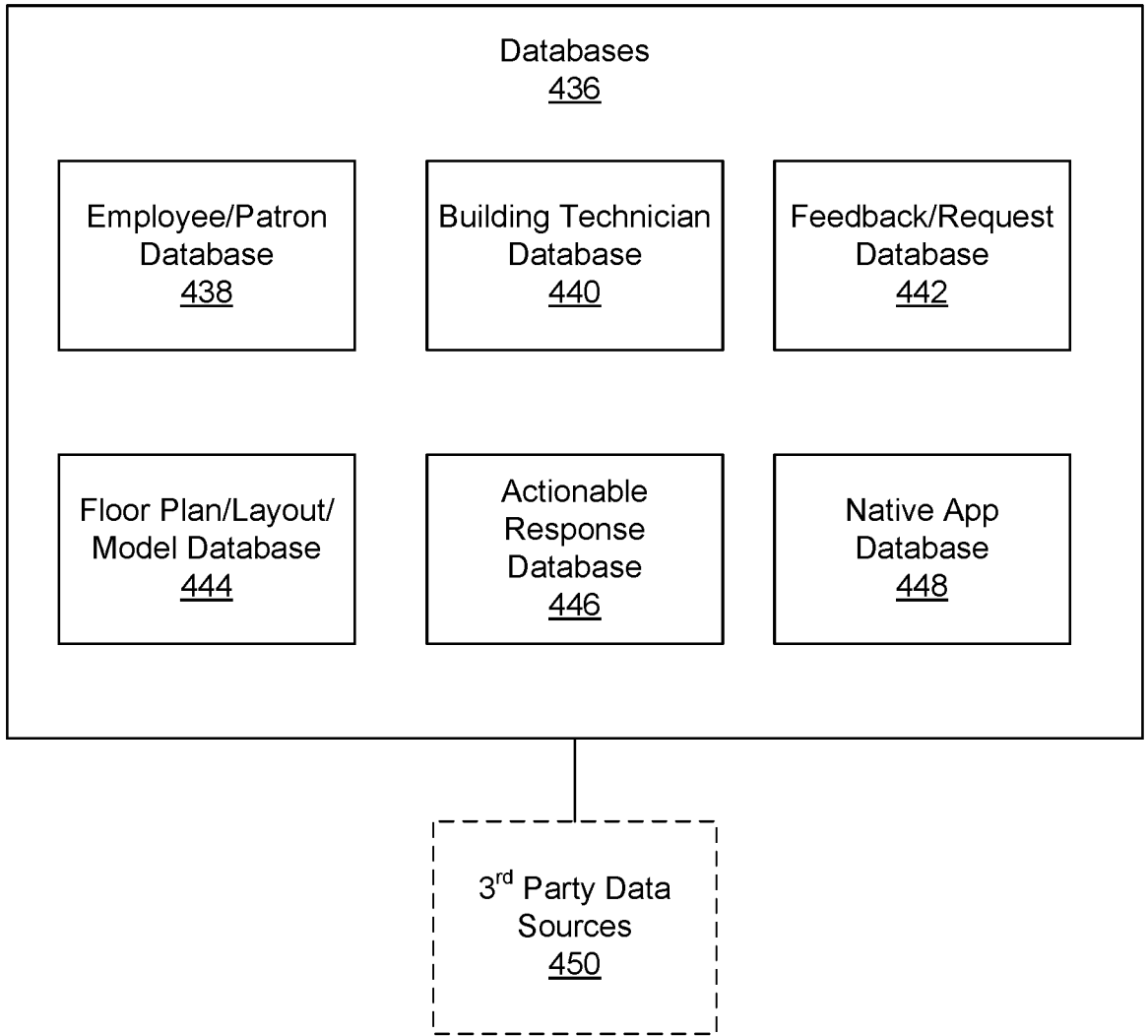
FIG. 22 is a block diagram illustrating the various databases in greater detail.

FIG. 22 is a block diagram illustrating the various databases in greater detail. In particular, the various databases for storage of data include, but are not limited to, an employee/patron database 438 for storing profiles associated with at least the users 15*a* occupying a given space and are able to provide feedback/requests, along with tracking of movement and location within the given space, a building technician database 440 for storing profiles associated with at least other users 15*b*-15*n* associated with the maintenance of the given space or building (i.e., janitors, maintenance staff, security, etc.), a feedback/request database 442 for storing feedback/requests from the employee/patron in the building, a floor plan/layout/model database 444 for storing floor plans/layouts/models of a given space, an actionable response database 446 for storing any actionable responses to address certain user feedback/requests (i.e., adjusting climate system based on user's feedback that a room is too cold or hot, dispatching a building technician to address a requested maintenance issue, etc.), and a native app database 448 for storing one or more native app profiles, as will be described in greater detail herein. In some embodiments, the crowdsourcing platform 412 may further receive data from third party sources 450, as will be described in greater detail herein. The data collection and management module 422 may be configured to communicate and exchange data with each of the databases 436.

The interface 420 may generally allow a user to gain access to one or more features of the services provided by the crowdsourcing platform 412 via a software application running on an associated computing device, or via a web-based portal. For example, upon accessing a mobile software application, the interface 420 may be presented to the user via their device 416, in which the user may navigate a dashboard or standard platform interface so as to interact with one or more features or services provided by the crowdsourcing platform and/or view data (stored in one or more of the databases). It should be noted, however, that, depending on the desired customization, certain data may have restricted access in place such that only those users that have been granted rights (e.g., role-based access) can access and view certain data that is considered confidential or sensitive.

Accordingly, a user, upon registering or logging in to the service provide by the crowdsourcing platform 412, via an interface 420, may only have access to certain features (i.e., viewing their profile, including basic identification details and preferences, as well as the ability to decide which features and/or services that the user agrees to subscribe to, such as whether the user opts in and agrees to allow the crowdsourcing platform to obtain user data (i.e., user movement and location) via a passive means and without requiring active user input.

A building owner or building management, for example, may be able to access data collected from persons within the building, including the employees/patrons/occupants as well as building technicians (i.e., janitors, maintenance staff, security, etc.), wherein such data may include reported comfort levels, maintenance issues, movement or location of one or more persons, etc.). Accordingly, such data may be useful in the maintenance of certain systems in the building (e.g., controlling HVAC, alerting proper maintenance worker of any maintenance issues) as we all other useful information, such as identifying which spaces are occupied versus those spaces which are not occupied, and the like. Furthermore, certain users may access the data collected from users within the environment being mapped, as well as the specific floor plans, models, or layouts rendered based on the user data. Other users, such as the employee/patron, may simply be able to vie their profile, for example, as well as the specific feedback/requests they provided and details regarding any actionable response to their specific feedback/requests.

Figure 23:
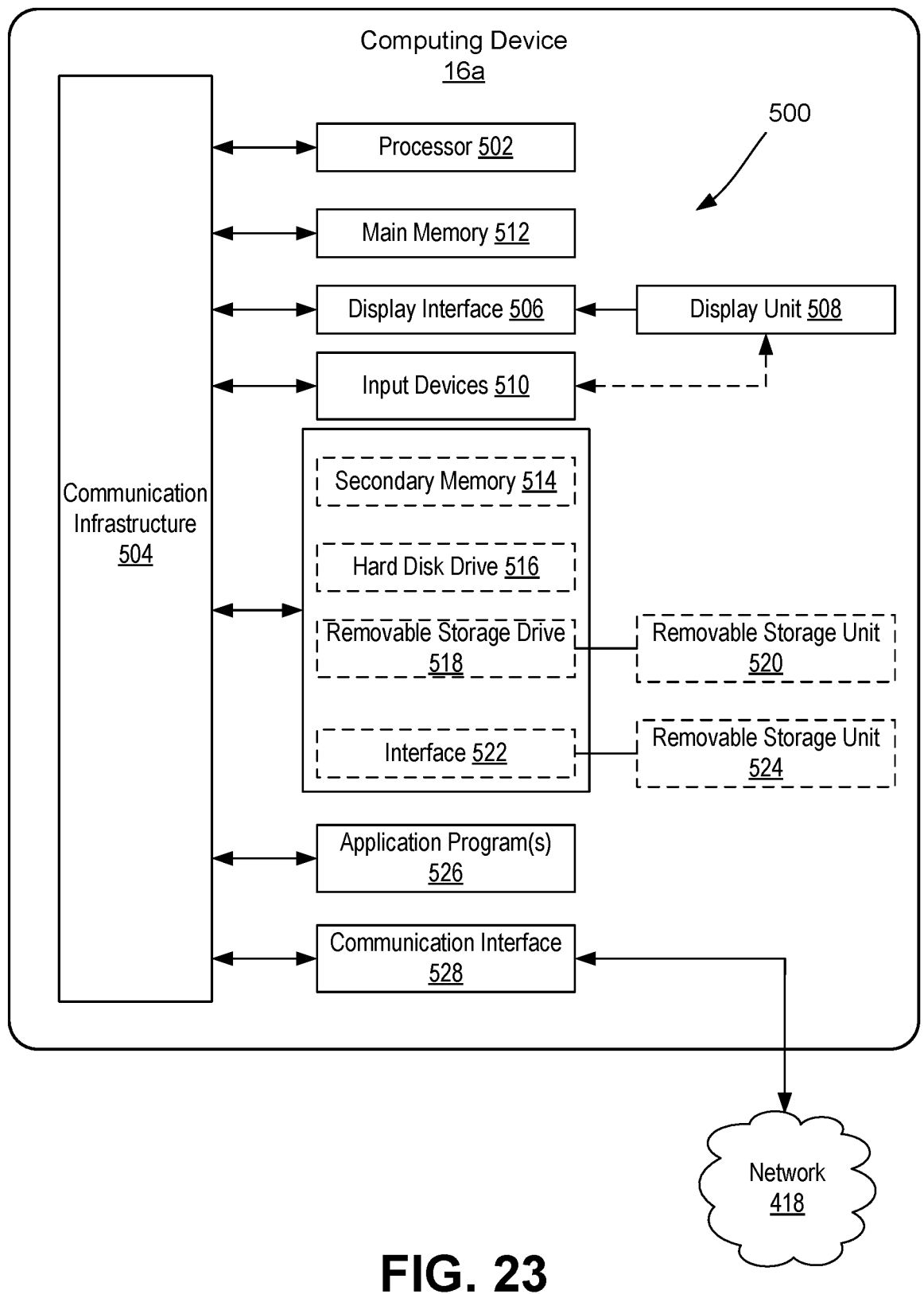
FIG. 23 is a block diagram illustrating at least one embodiment of a computing device (i.e., mobile device) for communicating with the crowdsourcing platform, wherein the computing device allows for a user to interact with the services provided via the crowdsourcing platform.

FIG. 23 is a block diagram illustrating at least one embodiment of a computing device (i.e., mobile device) for communicating with the crowdsourcing platform 412, wherein the computing device 416*a* provides an interface upon which a user to interact with features and services provided via the crowdsourcing platform 412.

The mobile device 416a generally includes a computing system 500. As shown, the computing system 500 includes one or more processors, such as processor 502. Processor 502 is operably connected to communication infrastructure 504 (e.g., a communications bus, cross-over bar, or network). The processor 502 may be embodied as any type of processor capable of performing the functions described herein. For example, the processor may be embodied as a single or multi-core processor(s), digital signal processor, microcontroller, or other processor or processing/controlling circuit.

The computing system 500 further includes a display interface 506 that forwards graphics, text, sounds, and other data from communication infrastructure 504 (or from a frame buffer not shown) for display on display unit 508. The computing system further includes input devices 510. The input devices 510 may include one or more devices for interacting with the mobile device 416a, such as a keypad, microphone, camera, as well as other input components, including motion sensors, and the like. In one embodiment, the display unit 508 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 416a, such as accessing and interacting with applications executed on the device 416a, including an app for providing direct user input with the geolocation service offered by a crowdsourcing platform.

The computing system 500 further includes main memory 512, such as random access memory (RAM), and may also include secondary memory 514. The main memory 512 and secondary memory 514 may be embodied as any type of device or devices configured for short-term or long-term storage of data such as, for example, memory devices and circuits, memory cards, hard disk drives, solid-state drives, or other data storage devices. Similarly, the memory 512, 514 may be embodied as any type of volatile or non-volatile memory or data storage capable of performing the functions described herein.

In the illustrative embodiment, the mobile device 416a may maintain one or more application programs, databases, media and/or other information in the main and/or secondary memory 512, 514. The secondary memory 514 may include, for example, a hard disk drive 516 and/or removable storage drive 518, representing a floppy disk drive, a magnetic tape drive, an optical disk drive, etc. Removable storage drive 518 reads from and/or writes to removable storage unit 520 in any known manner. The removable storage unit 520 may represents a floppy disk, magnetic tape, optical disk, etc. which is read by and written to by removable storage drive 518. As will be appreciated, removable storage unit 520 includes a computer usable storage medium having stored therein computer software and/or data.

In alternative embodiments, the secondary memory 514 may include other similar devices for allowing computer programs or other instructions to be loaded into the computing system 500. Such devices may include, for example, a removable storage unit 524 and interface 522. Examples of such may include a program cartridge and cartridge interface (such as that found in video game devices), a removable memory chip (such as an erasable programmable read only memory (EPROM), or programmable read only memory (PROM)) and associated socket, and other removable storage units 524 and interfaces 522, which allow software and data to be transferred from removable storage unit 524 to the computing system 500.

The computing system 500 further includes one or more application programs 126 directly stored thereon. The application program(s) 526 may include any number of different software application programs, each configured to execute a specific task.

The computing system 500 further includes a communications interface 528. The communications interface 528 may be embodied as any communication circuit, device, or collection thereof, capable of enabling communications between the mobile device 416a external devices (other mobile devices 416, and the cloud-based service 414, and any external computing system/server). The communications interface 528 may be configured to use any one or more communication technology and associated protocols, as described above, to effect such communication. For example, the communications interface 528 may be configured to communicate and exchange data with the crowdsourcing platform 12, an external computing system/server and/or one other mobile device 416 via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards, and a combination thereof. Examples of communications interface 528 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 512 and/or secondary memory 514 or a local database on the mobile device 416a. Computer programs may also be received via communications interface 528. Such computer programs, when executed, enable the computing system 500 to perform the features of the present invention, as discussed herein. In particular, the computer programs, including application programs 526, when executed, enable processor 502 to perform the features of the present invention. Accordingly, such computer programs represent controllers of computer system 500.

In one embodiment where the invention is implemented using software, the software may be stored in a computer program product and loaded into the computing system 500 using removable storage drive 518, hard drive 516 or communications interface 528. The control logic (software), when executed by processor 502, causes processor 502 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 24:
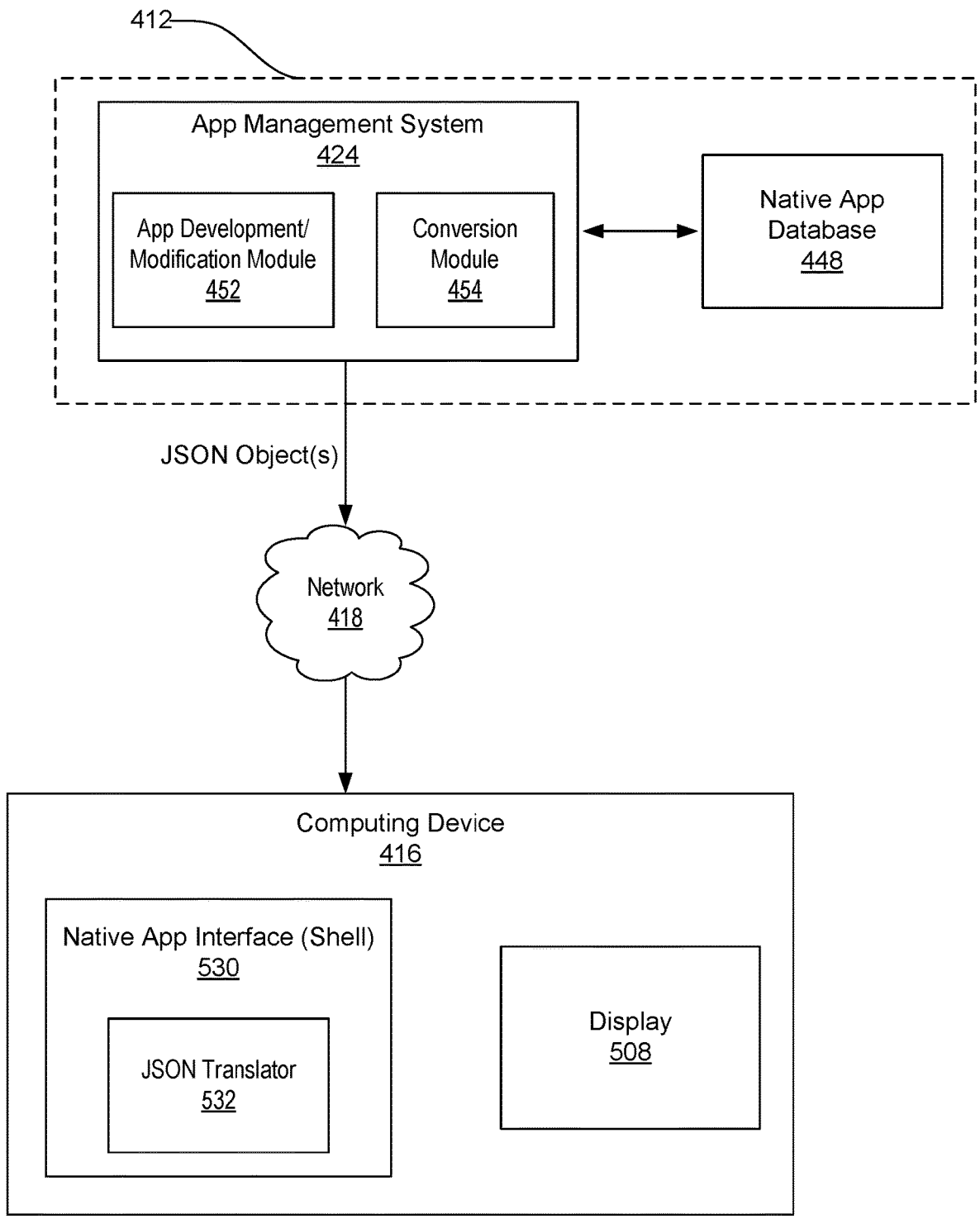
FIG. 24 is a block diagram illustrating the app management system provided by the crowdsourcing platform in greater detail and further illustrating streaming of UI changes to a mobile device consistent with the present disclosure.

FIG. 24 is a block diagram illustrating the app management system 424 provided by the crowdsourcing platform in greater detail and further illustrating streaming of UI changes to a mobile device 416 consistent with the present disclosure.

As previously described, the crowdsourcing platform 412 is configured to generally provide a means for certain users (users with authority, such as building management) to create, modify, or otherwise control distribution of, mobile applications to the mobile devices 416. Accordingly, certain users 415 may access the crowdsourcing platform 412 for the purposes of altering, modifying, or otherwise controlling output of data from the crowdsourcing platform 412 to other users 415 who do not have direct access. For example, in the event the user 415 is a client, customer, administrator, or developer associated with the features and services provided via the crowdsourcing platform 412, such a user may have access to one or more tools for creating, modifying, or controlling a particular app running on mobile devices 416. Accordingly, the crowdsourcing platform 412 is configured to provide an interface with which such authorized users, such as a developer for example, may interact for the purposes of allowing control over the running app. Upon modifying the app, the authorized user may then choose to transmit modifications to the app to mobile devices 16 for subsequent updates of the app.

As described in greater detail herein, the mobile devices 416 may be running an abstracted native app thereon, wherein the app allows a user 415 to interact and share data with the crowdsourcing platform 412. The abstracted native app generally includes an app shell, native basic UI elements, and a JSON Translator embedded within the app configured to dynamically and, in real time (when connected to the cloud-based service), translate objects received from the crowdsourcing platform 412 (e.g., modifications from authorized user) into native UI elements. Accordingly, the JSON Translator acts as a translation layer allowing the dynamic interpretation of data (e.g., app updates) received from cloud-based service into native UI elements compatible with the native app running on the device. Thus, the data exchange format of the present invention allows streaming of UI changes, in contrast to requiring a developer to specifically write the language into a compatible format in each instance of an update.

As shown, the app management system 424 may include an app development/modification module 452 and a conversion module 454. For example, a user may wish to alter or update the visual format of a report or other visual rendering displayed to a user via the native app on their device. Accordingly, the user will access to one or more native app profiles stored in the native app database 448, in which the user may modify any one of the native app profiles and subsequently save a modified native app into a new profile within the database 448. Thus, at any point, a user may retrieve previous versions of a native app and/or create new versions of a native app so as to provide updates.

The app development/modification module 452 is configured to allow a user (e.g., authorized user) to create, modify, or otherwise control aspects of a software application that is either currently provided on one or more mobile devices 416 or will be distributed to one or more mobile devices 416. The app development/modification module 452 may generally provide a software development kit (SDK) or other tools for allowing a user to make any modifications to an app and further transmit such modifications to the mobile devices 416 so as to essentially update the native app running on the mobile device 416, as will be described in greater detail herein. The modifications may be made according to different programming languages, such as JavaScript, HTML, CSS. However, the conversion module 454 is configured to receive modifications from the app development/modification module 452 and further convert such modifications into JSON format by any known techniques. For example, the conversion module 454 may include custom, proprietary, known and/or after-developed data serializing code (or instruction sets) that are generally well-defined and operable to receive programming language of a first type and convert such programming language into a JSON format.

As further shown in FIG. 24, upon making modifications to an app and subsequent conversion of modification data into JSON objects, the app management system 424 is configured to transmit the JSON objects to a mobile device 416 for subsequent updating of a native app running on the device 416 based on the JSON objects. As previously described, one or more of the mobile devices 416 may be running an abstracted native app for allowing a user 415 to interact and share data with the crowdsourcing platform 412. As shown, the abstracted native app generally includes a native app interface 530, or app shell. The app shell may generally be understood to be the outermost layer of a program, where shell is another term for user interface. The mobile device 416 further includes a JSON Translator 532 embedded within the app. The JSON translator 532 is configured to dynamically and, in real time (when connected to the crowdsourcing platform 412), translate objects, namely the JSON objects into native UI elements. Accordingly, the JSON Translator 532 acts as a translation layer allowing the dynamic interpretation of data (e.g., app updates) received from crowdsourcing platform 412 into native UI elements compatible with the native app running on the device 416 and provided via the display unit 508.

Thus, the data exchange format of the present invention allows streaming of UI changes, in contrast to requiring a developer to specifically write the language into a compatible format in each instance of an update. Furthermore, the system allows for changes or modifications to be made to an app in native form on the fly without requiring a re-download or an update of the app. In addition, the present invention may have applicability to other systems that rely on communication between multiple devices running apps thereon. For example, the ability to create native mobile application in a manner provided by the present invention has tremendous application within Internet of Things (IoT) echo systems by allowing, not only the users to create content, but also IoT devices to create/modify content as well, which may inform the users in real time in their device's native UI of certain events and information from the IoT devices and improve their ability to interact and act on this content. Further, the present invention provides the ability to still operate based on this content even in an offline mode.

Figure 25A:
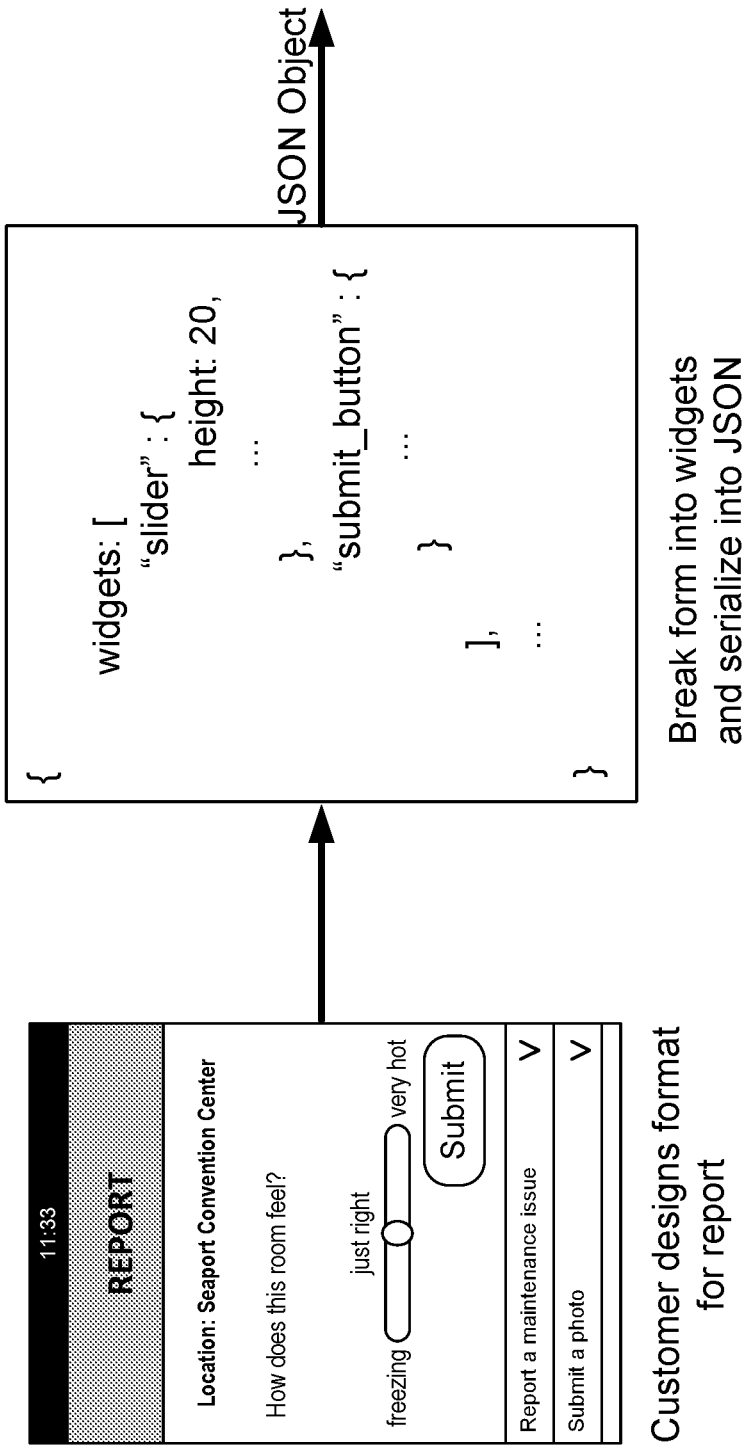
FIGS. 25A-25C illustrate the streaming of app modification data to the mobile device and subsequent dynamic interpretation and translation of app modification by the translation layer of the mobile device into native UI elements for display to a user.
Figure 25B:
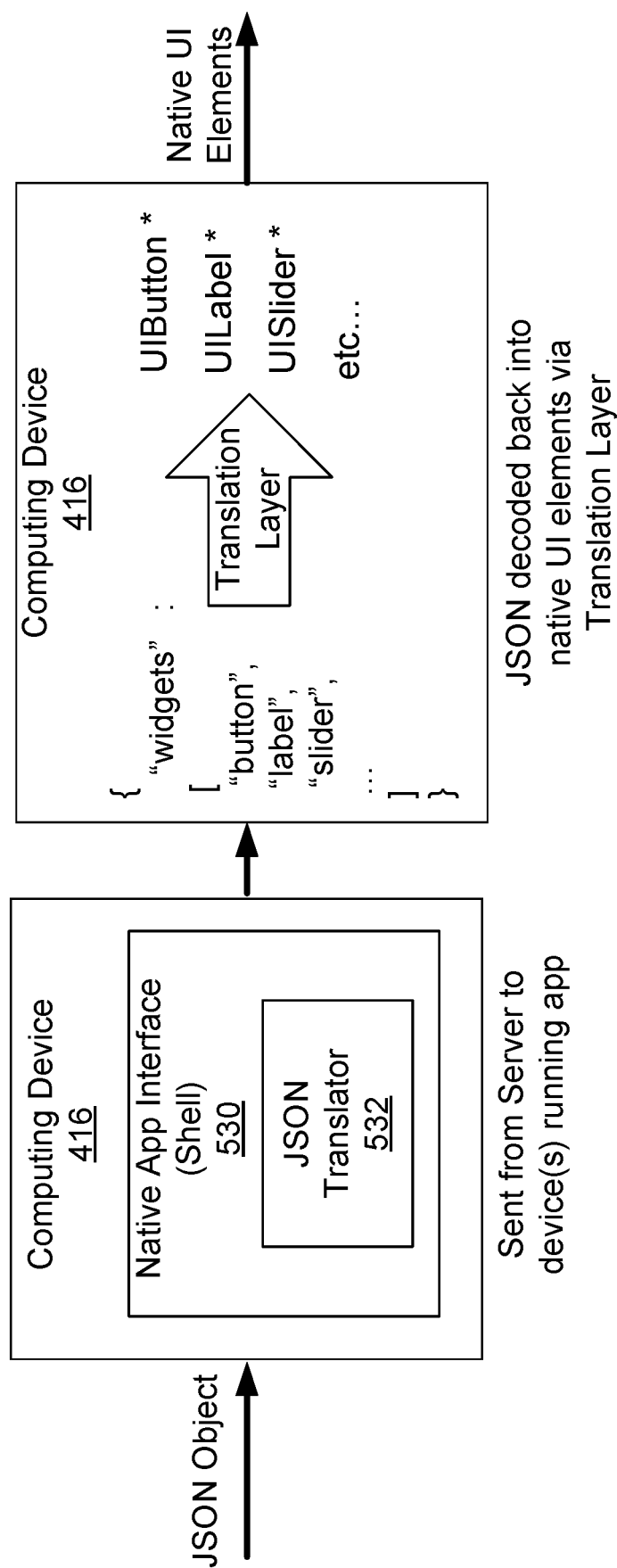
Figure 25C:
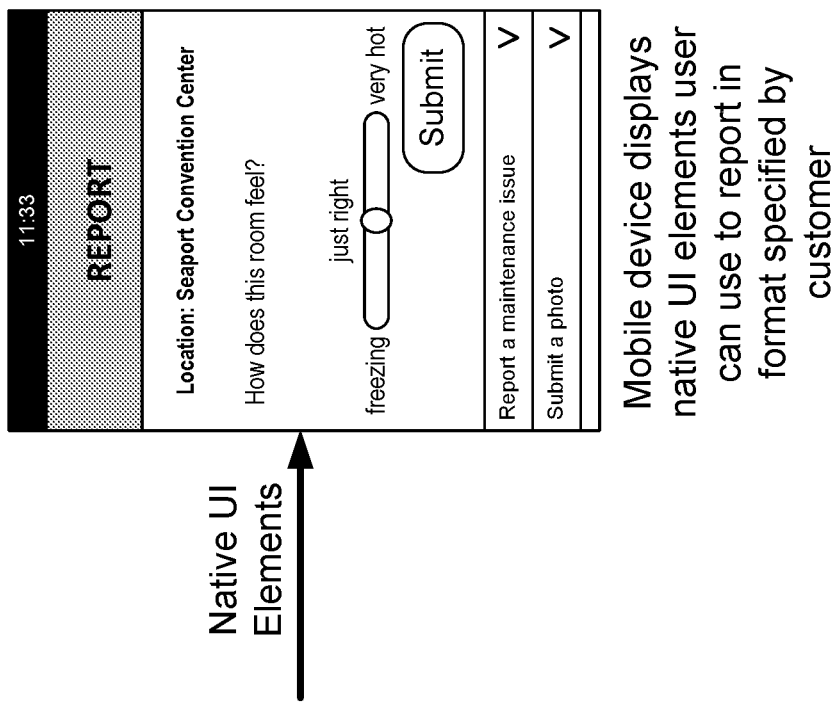

FIGS. 25A-25C illustrate the streaming of app modification data to the mobile device and subsequent dynamic interpretation and translation of app modification by the translation layer of the mobile device into native UI elements for display to a user. As shown in FIG. 25A, a customer (e.g., authorized user) may wish to modify the design (e.g., interface) of a report that will be displayed to a user via a native app running on the user's mobile device. Accordingly, the customer may access the app development/modification module 452 and utilize tools for making such modifications, where they may chance the format design for a report to be displayed to a user. The conversion module 454 is then configured to receive such modifications and convert them into JSON object(s). For example, the conversion module 454 may break the format down into widgets and then serialize into JSON objects. Referring to FIG. 25B, the JSON object(s) may then be transmitted to the mobile device 416 running the native app, at which point, the JSON object(s) are then decoded back into native UI elements via the translation layer (JSON Translator 532) and displayed on the display of the device 416 (FIG. 25C).

Figure 26:
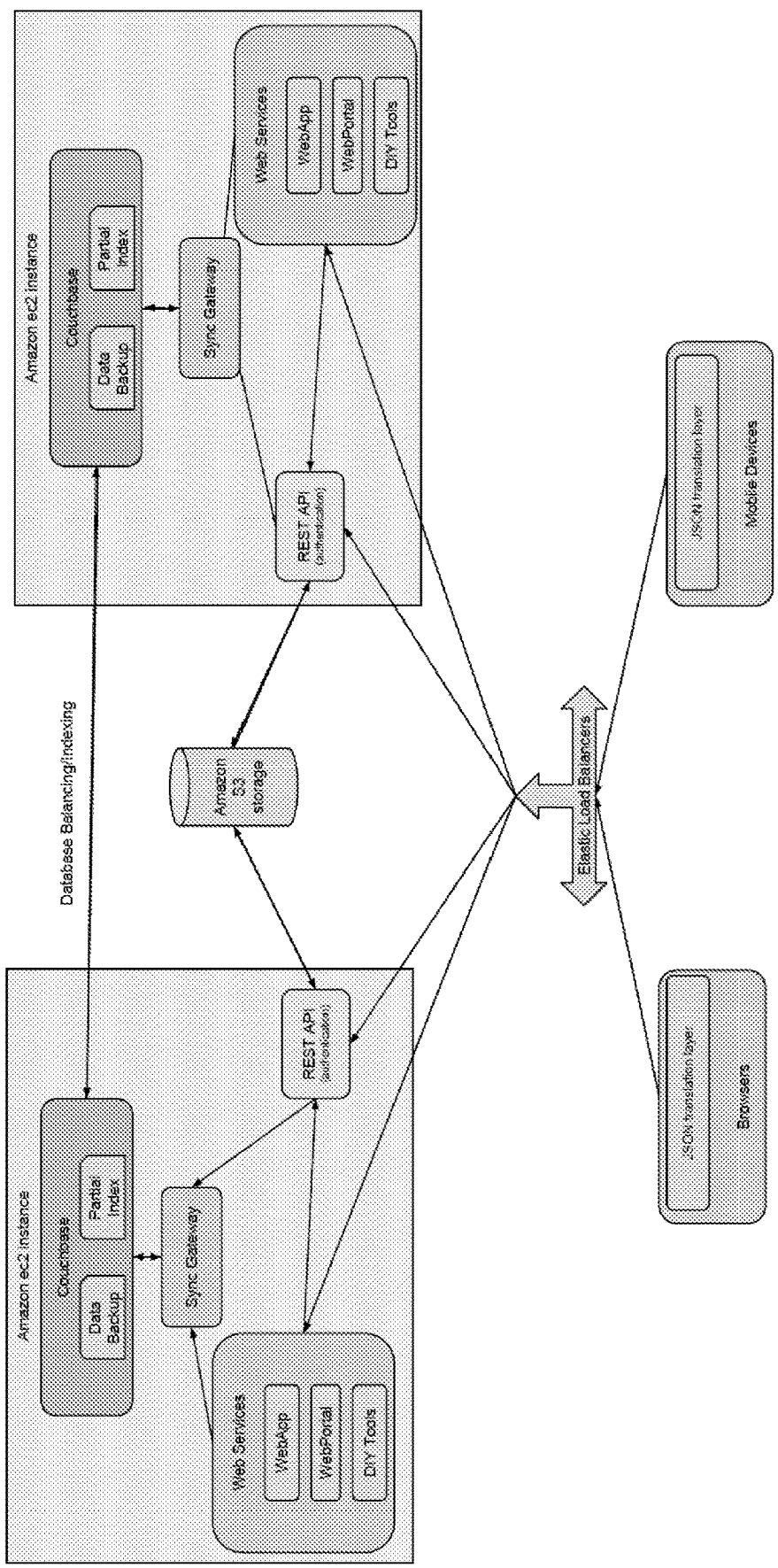
FIG. 26 is a block diagram illustrating one embodiment of system architecture consistent with the present disclosure.

FIG. 26 is a block diagram illustrating one embodiment of system architecture consistent with the present disclosure. The architecture illustrated in FIG. 26 may provide the same or similar functions as previously described herein, namely the JSON data exchange format for use with a native app running on a user's mobile device, wherein the exchange format is configured to improve user experience and interaction with the app.

Figure 27:
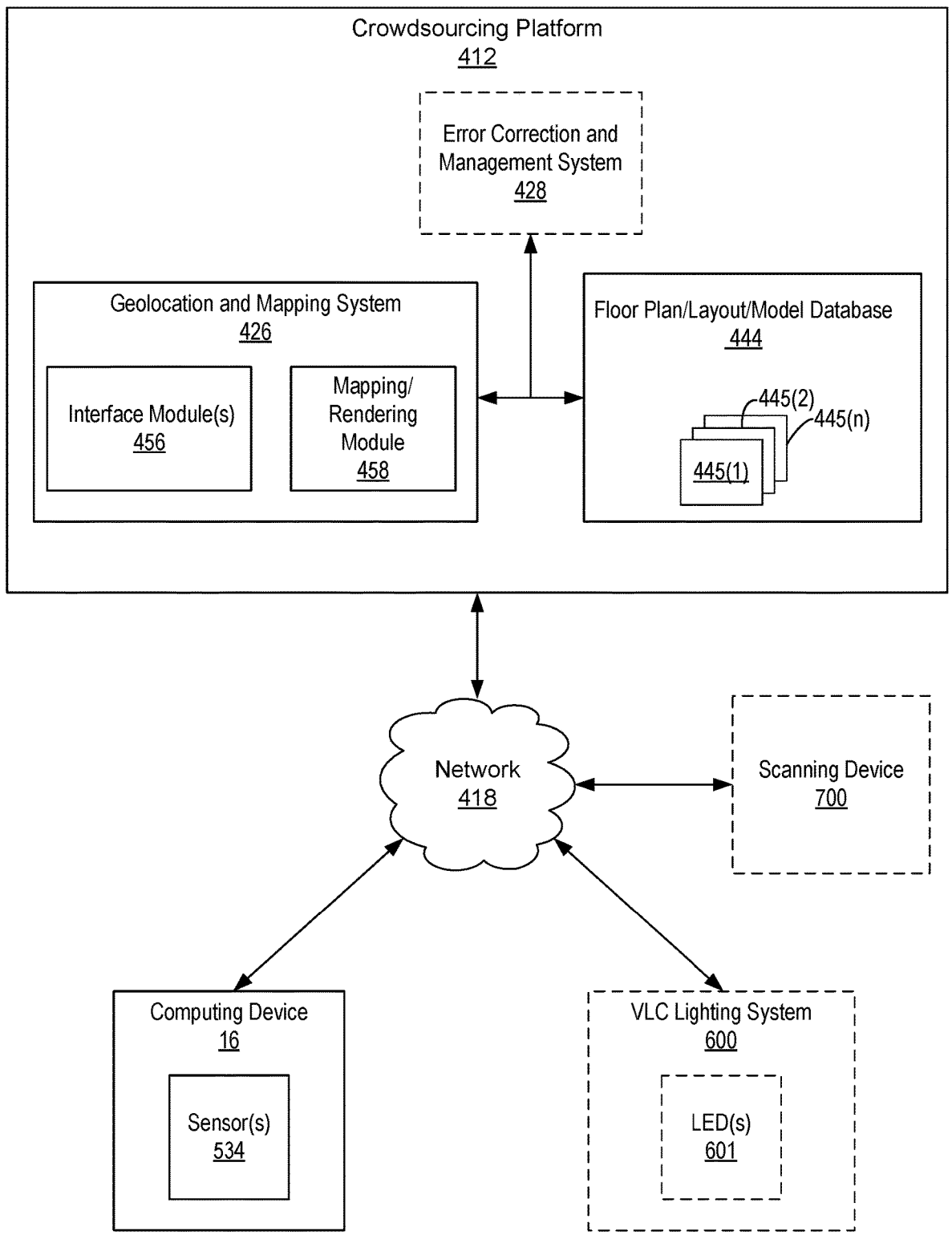
FIG. 27 is a block diagram illustrating the geolocation and mapping system error and correction and management system provided by the crowdsourcing platform in greater detail.

FIG. 27 is a block diagram illustrating the geolocation and mapping system 426 and error and correction and management system 428 provided by the crowdsourcing platform 412 in greater detail.

As shown, the geolocation and mapping system 426 may include one or more interface modules 456 and a mapping/rendering module 458. As will be described in greater detail herein, the geolocation and mapping system (by way of modules 456 and 458) is configured to receive the user data from the mobile device 416 related to user location and/or movement within an environment and further render a floor plan or layout based on the user data. Accordingly, the geolocation and mapping system 426 is configured to communicate with a floor plan/layout/model database 444 storing one or more floor plan/layout profiles 445(1)-445(n). In the event that an environment is being mapped for the first time, a new profile 445 is created. However, due to the nature of crowdsourcing, in which users may be continually polled at regular intervals, the geolocation and mapping system 426 may gain access to an existing profile 445 and update an existing floor plan or layout based on additional user data so as to further refine and improve accuracy of the generated floor plan or layout.

The one or more interface modules 456 are generally configured to receive sensor data captured by one or more sensors 534 of the mobile device 416. Upon analyzing the sensor data, the one or more interface modules 456 are configured to generate and transfer user position/movement data to the mapping/rendering module 458. The mapping/rendering module 458 is configured to process the user position/movement data and generate, or render, a floor plan or layout or model, as will be described in greater detail herein.

It should be noted that, in some embodiments, the crowdsourcing platform 412 may also utilize Visible Light Communication (VLC) to further bolster the geolocation services within a particular environment (e.g., office space), in addition to utilizing sensor data collected from a user's mobile device. In particular, a shown, the system may further include a VLC lighting system 600 networked, or otherwise connected to, the crowdsourcing platform 412 so as to communicate VLC data with the geolocation service of the crowdsourcing platform 412.

The VLC lighting system 600 may generally include a set of interconnected illumination sources (i.e., lighting, such as Light Emitting Diodes (LEDs) 601) positioned within a space or environment, such as office space within a building. In addition to providing illumination within a given space, the LEDs 601 are further configured to create a "smart" indoor environment, in that the LED light bulbs generally provide a foundation for networking using visible light as communication medium. Visible light communication (VLC) technology is a data communications medium which uses visible light between 400 and 800 THz. VLC is generally is based on the principle that, since it is possible to turn an LED on and off much faster than the human eye can resolve, lights can be used to transmit binary data in the form of light pulses without any detectable flickering. Accordingly, this functionality of LEDs allows LED lighting to be used for high-speed data transfer. The general background of VLC technology and the common components for allowing VLC with LEDs is described in "Visible Light Communication, Networking and Sensing: A Survey, Potential and Challenges", P. H. Pathak, X. Feng, P. Hu, P. Mohapatra, DOI 10.1109/COMST.2015.2476474, IEEE Communications Surveys & Tutorials, the content of which is incorporated by reference herein in its entirety.

Accordingly, the VLC lighting system 600 may include LED light bulbs 601 installed within a space and configured to, not only provide illumination with the space, but to further capture VLC data associated with one or more users within the space. The VLC lighting system 600 is further configured to communicate with and transmit such VLC data to the crowdsourcing platform 412. The VLC data may generally include user location and movement, not only for the purpose of rendering and refining floor plans, but to further provide the location of a user with respect to any issues they may report within an environment, thereby automatically tying a user's report to an exact location. With regard to comfort issues, such as HVAC (e.g., temperature of a particular room within a building), the VLC data may enable a more accurate users' heat profile to optimize the use of thermal comfort data for controlling HVAC output within a given space.

It should be noted that, in some embodiments, the system may further utilize additional data to augment the modeling of an environment, which, in turn, may further improve the geolocation services provided by the crowdsourcing platform 412. For example, the additional data may be collected by utilizing a handheld or integrated light detection and ranging (LIDAR) device 700 for scanning and mapping indoor environments and the system is configured to associate scan data with known features/landmarks based, at least in part, on prior and/or subsequent user location determinations, predetermined features such as two-dimensional (2-D) floor plans, specific locations of objects (QR code locations, locations of fixed objects identifiable with image-based analysis or computer vision, and the like). Additionally, or alternatively, the system may utilize other data collection mechanisms, including additional user polling to collect images of a given space (e.g., images captured via a user's smartphone or mobile device) and correlating such images with a 2-D floor plan or layout to further refine the floor plan or layout of a given space.

The error correction and management system 428 is configured to recognize and recalibrate data errors during the collection and aggregation of the crowd-sourced sensor data. In particular, the system 428 is configured to receive user input directly from a user of the mobile device 416 and analyze rendered floor plans or layouts or models in light of user input data so as to determine any potential errors in data input. The correction is based on the concept of, at certain points in time, recognizing any potential errors in data and re-calibrating collection or aggregation of crowdsourced data so as to effectively "reset" such data collection or further refine the rendering of any given floor plan or layout, thereby canceling out any errors that may have otherwise potentially cascaded into the data collection process.

Figure 28:
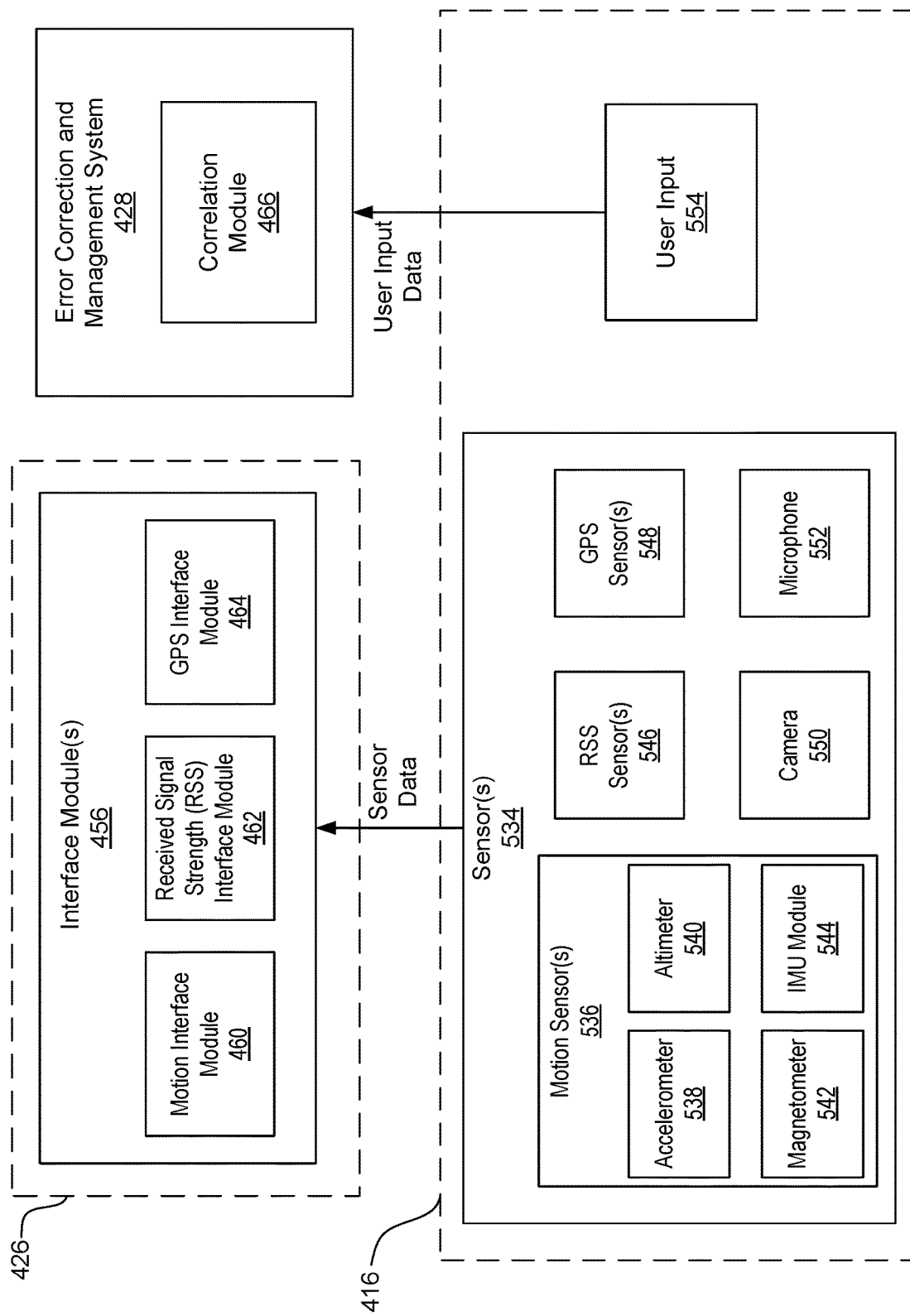
FIG. 28 is a block diagram illustrating collection of user data from one or more sensors of a mobile device and subsequent analysis of such data by interface modules of the geolocation and mapping system.

FIG. 28 is a block diagram illustrating collection of user data from one or more sensors 534 of a mobile device 416 and subsequent analysis of such data by interface modules 456 of the geolocation and mapping system 426. FIG. 28 further illustrates collection of user input data by the error correction and management system 428 directly from user input 554 of a mobile device 416.

As shown, the mobile device 416 may include a variety of different sensors configured to capture data related to motion or position of the mobile device 416 and/or signals either transmitted from or to the mobile device 416. The sensors 534 may further be configured to capture user input, such as touch input and the like. As shown, the sensors 534 may include one or more motion sensors 536, a received signal strength (RSS) sensor 546, and a GPS sensor 548. The sensors 534 may further include a camera 550 and a microphone 552 for capturing image and audio data, respectively, wherein such data can be used and included in the user feedback/request reports to thereby supplement and provide specific details that will be useful in determining the appropriate actionable response required, as well as useful in the geolocation services for further supplementing the location data with images of a real-world location, including specific landmarks or features of interest in the image data, for example.

It should be noted that FIG. 28 illustrates one embodiment of set of sensors included in a mobile device consistent with the present disclosure and by no means is meant to limit the kind and/or amount of sensors for use in a system and/or method consistent with the present disclosure. For example, a system and method consistent with the present disclosure may include more or less sensors than what is illustrated in FIG. 28.

The one or more motion sensors 536 may be embodied as any type of sensor configured to capture motion data and produce sensory signals from which the geolocation and mapping system 426 may determine the user position and/or movement with the mobile device 416. In particular, the motion sensor 536 may be configured to capture data corresponding to the movement of the user device 416 or lack thereof. The motion sensor 134 may include, for example, an accelerometer 538, an altimeter 540, one or more gyroscopes, or other motion or movement sensor to produce sensory signals corresponding to motion or movement of the device 416 and/or a magnetometer 542 to produce sensory signals from which direction of travel or orientation can be determined. The one or more motion sensors 536 may further include, or be coupled to, an inertial measurement unit (IMU) module 544 for example.

The motion sensors 536 may also be embodied as a combination of sensors, each of which is configured to capture a specific characteristic of the motion of the device 416, or a specific characteristic of user movement. A motion sensor embodied as a combination of sensors may use algorithms, such as, for example, fusion algorithms, to correct and compensate the data from individual sensors and provide more robust motion sensing and detection context than each individual sensor can provide alone.

The RSS sensor 546 is generally configured to capture signal strength of the mobile device 416, which may be used to determine the distance between stations, as signal strength is usually related to the distance via a path-loss model which predicts the received signal strength at any specific distance based on the transmit power, signal attenuation gradient (known as path-loss exponent), number of attenuators and their respective attenuation level, and the distance to the stations. The GPS sensor 548 is configured to capture location data (e.g. coordinates) of the mobile device 416. In some embodiments, a system clock may be used and configured to determine date and time of day of the user device 416, wherein such data may be transmitted to the geolocation and mapping system 426.

As shown, the geolocation and mapping system 426 includes interface modules 456 configured to process and analyze data captured from corresponding sensors 534 to determine user position or movement based on analysis of the captured data. In the illustrated embodiment, the geolocation and mapping system 426 includes a motion interface module 460 configured to receive and analyze data captured by the one or more motions sensors 536, a RSS interface module 462 configured to receive and analyze data captured by the RSS sensor 546, and a GPS interface module 464 configured to receive and analyze data captured by the GPS sensor 548.

The motion interface module 460 is configured to receive motion data captured by the one or more motion sensors 536. Upon receiving the motion data from the one or more motion sensors 536, the motion interface module 460 may be configured to identify movement of the device 416 such as, for example, the direction of movement, location of the device 416 within a particular plot, magnitude of movement of the device 416, which may indicate user location/movement when combined with analyzing of RSS data and GPS data by the RSS and GPS interface modules 462, 464. The motion interface module 460 may include custom, proprietary, known and/or after-developed motion detection code (or instruction sets) that are generally well-defined and operable to identify a motion event.

The error correction and management system 428 is configured to receive data based on direct user input 554. For example, via the geolocation service provided by the crowdsourcing platform 412, a user may be prompted on their device 416 (via interactive user interface) to confirm or otherwise provide their location or movement within a space and/or their vicinity to specific landmarks or objects. By collecting direct user input data, the system is configured to automatically detect any potential errors or discrepancies in the input of sensor data and further correct such errors and inaccuracies in the system. The error correction and management system 428 may include a correlation module 466 configured to receive the user input data and further correlate the user input data with the sensor data, position/movement data generated by the interface modules 456, and/or the rendered floor plans or layouts. The correlation module 466 may include custom, proprietary, known and/or after-developed statistical analysis code (or instruction sets), hardware, and/or firmware that are generally well-defined and operable to receive two or more sets of data and identify, at least to a certain extent, a level of correlation and thereby associate the sets of data with one another based on the level of correlation. Based on the correlation, the error correction and management system 428 may be configured to detect potential discrepancies between the user input data and the other sets of data. For example, in the event that a level of correlation between sets of data falls below a certain threshold, it may be determined that an error is present. Upon identifying an error, the system may rely on the user input data to correct such error so as to improve the degree of certainty of a user's position or movement within a space and improve the accuracy of the rendered floor plan or layout.

Figure 29:
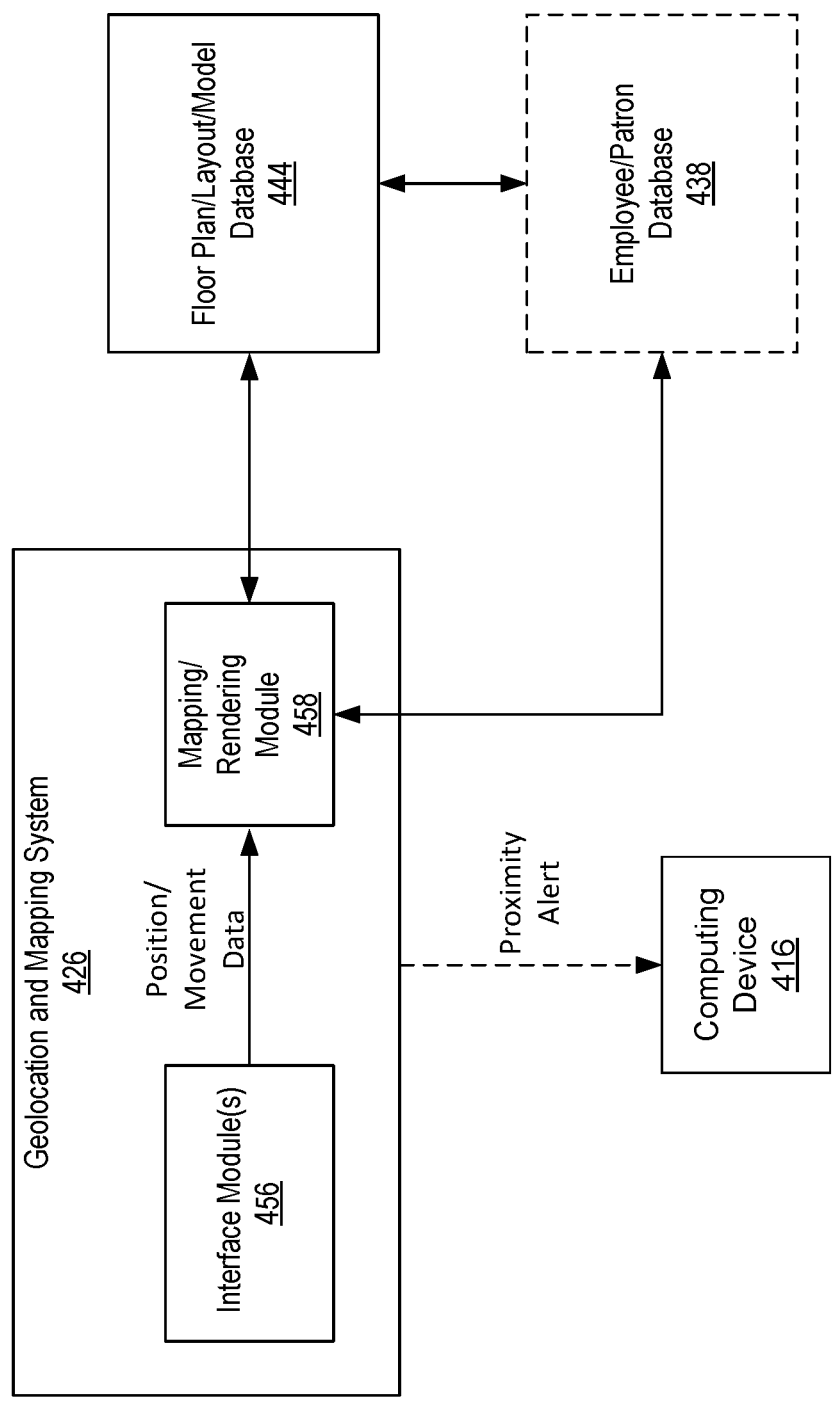
FIG. 29 is a block diagram illustrating communication between the geolocation and mapping system, the floor plan/layout library, and the mobile device.

FIG. 29 is a block diagram illustrating communication between the geolocation and mapping system 426, the floor plan/layout/model database 444, and the mobile device 416. Upon analyzing the sensor data, the one or more interface modules 456 are configured to generate and transfer user position/movement data to the mapping/rendering module 458 for subsequent rendering of a floor plan or layout to be saved in a profile of the floor plan/layout/model database 444. It should be noted that, in some embodiments, additional data may be provided to the mapping/rendering module 458, including, but not limited to one or more of the VLC data and the scanning device data. The mapping/rendering module 458 may include custom, proprietary, known and/or after-developed data and graphics code (or instruction sets, functions, etc.) that are generally well-defined and operable to receive the position/movement data from the interface modules 456 (and/or VLC data and/or scanning device data) and generate a visual model of a floor plan or layout of the space in which a user is located. The mapping/rendering module 458 may further be configured to identify patterns of user movement based on the position/movement data, and, based on further confirmation from direct user input, render a floor plan or layout.

Figure 30:
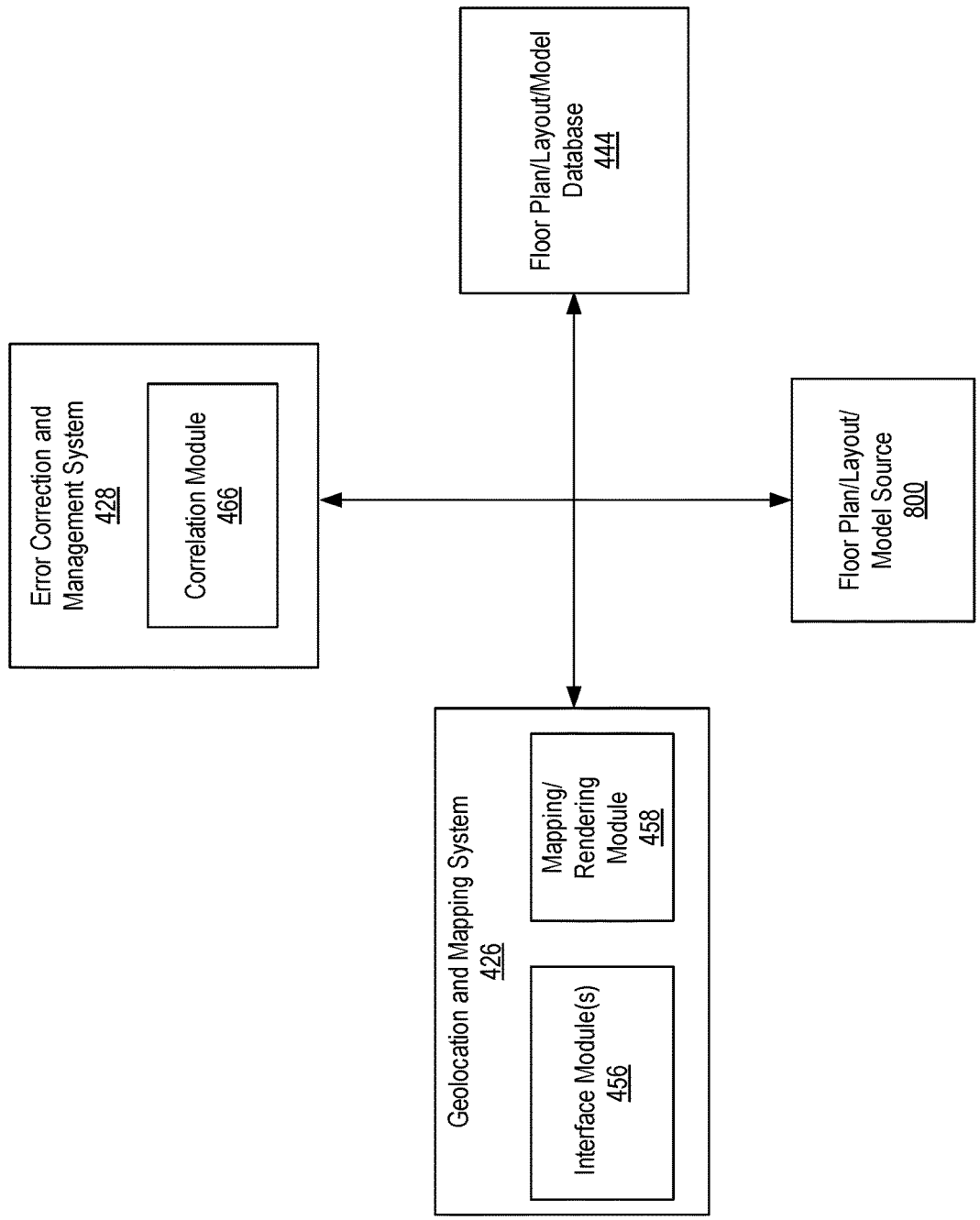
FIG. 30 is a block diagram illustrating communication between the geolocation and mapping system, the error correction and management system, the floor plan/layout library, and a floor plan/layout source.

FIG. 30 is a block diagram illustrating communication between the geolocation and mapping system 426, the error correction and management system 428, the floor plan/layout/model database 444, and a floor plan/layout source 800. As previously described, the error correction and management system 428 is configured to receive data based on direct user input 554 and use the user input data to detect any potential errors or discrepancies in the input of sensor data and further correct such errors and inaccuracies in the system. More specifically, the correlation module 466 configured to receive the user input data and further correlate the user input data with the sensor data, position/movement data generated by the interface modules 456, and/or the rendered floor plans or layouts. Based on the correlation, the error correction and management system 428 may be configured to detect potential discrepancies between the user input data and the other sets of data. For example, in the event that a level of correlation between sets of data falls below a certain threshold, it may be determined that an error is present. Upon identifying an error, the system may rely on the user input data to correct such error so as to improve the degree of certainty of a user's position or movement within a space and improve the accuracy of the rendered floor plan or layout.

The mapping/rendering module 458 is configured to continually update a floor plan or layout based on the user input data collected by polling of multiple users within the space so as to further refine and improve accuracy of the generated floor plan or layout. In addition to user input data, the system may further utilize known floor plans or layouts from a source 800 for comparing with a rendered floor plan or layout and revising the rendered layout to improve accuracy.

Additionally, or alternatively, the crowdsourcing platform 412 may be configured to communicate with a user via their mobile device and prompt the user to provide an indication as to their current location within a given space. The user input may then be used with the sensor data to confirm or improve rendering of a floor plan or layout.

In some embodiments, the crowdsourcing platform 412 is further configured to provide proximity sensing for determining the proximity of users relative to one another or relative to certain landmarks in a given location. This may be particularly useful in emergency situations. For example, in addition to receiving sensor data, the geolocation and mapping system 426 may be configured to receive user input tied to the sensor data, such that the system can assign a user's identity or an identity of the mobile device 416 to specific position/movement data so as to track a location of a user at any given moment. Thus, each user may include a profile stored within a specific database (i.e., employee/patron database 438, building technician database 440, etc.) wherein the profile may include specifics about a user (e.g., user characteristics, user settings for the service, etc.) as well as a current or last known position of the user within a given floor plan or layout.

The crowdsourcing platform 412 may utilize the location of a user for purposes of providing a communication alert to the user's mobile device 416, which may be particularly useful in certain situations, such as emergency situations. For example, the crowdsourcing platform 412 is configured to communicate specific alerts to users in the event that they are within the vicinity of an emergency. Similarly, the crowdsourcing platform 412 may be aware of certain landmarks or objects that may be of importance in an emergency (e.g., fire extinguisher, nearest exit, medical devices such as defibrillators, etc.). Accordingly, a user in the vicinity of an emergency situation may be alerted to the nearest emergency exit or directed to a fire extinguisher or defibrillator. Additionally, in the event of an emergency in which a user is requesting emergency assistance, knowledge of the user's location within a building is extremely beneficial in that emergency services can be requested and dispatched to that user's location. Furthermore, the ability of the platform 12 to monitor and provide real, or near-real, time tracking of a user's location and/or movement is particularly beneficial with regard to maintenance issues, in which a building maintenance technician's movement/location within a building can be useful in determining which technician is the closest to a location in which a maintenance request has been submitted, and thus the closest technician can be dispatched, as will be described in greater detail herein.

Figure 31:
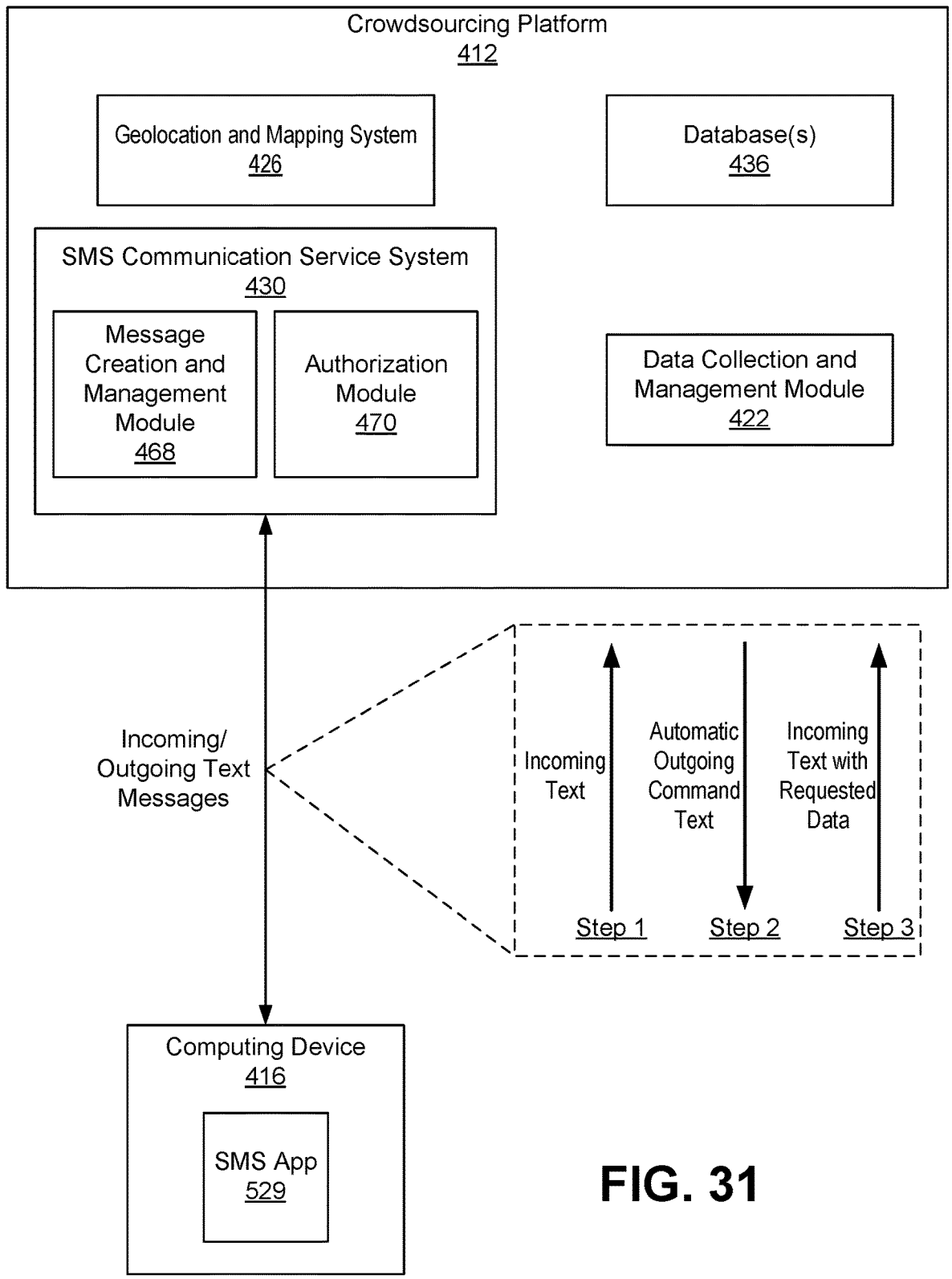
FIG. 31 is a block diagram illustrating the SMS communication service system provided by the crowdsourcing platform in greater detail and further illustrates collection of location/positioning data from a user's mobile device in response to a command text message.

FIG. 31 is a block diagram illustrating the SMS communication service system 430 provided by the crowdsourcing platform 412 in greater detail and the exchange of text messages between the SMS communication service system 430 and mobile device 416 for the automatic and passive collection of location/positioning data from the user's mobile device.

As shown, the SMS communication service system 430 includes a message creation/management module 468 configured to provide certain authorized users or clients with a means of creating or editing one or more outgoing command text messages. The SMS service system 430 further includes an authorization module 470 configured for managing profiles of one or more users or clients authorized to access the system 430 (e.g., for the purpose of creating or editing outgoing command text messages) and to further manage authority over the system 430 so as to effectively manage outgoing command text messages to ensure they are only being sent to subscribing users that have subscribed to the service and agreed to receive such messages.

The cornerstone of the SMS communication service system 430 is the ability to schedule one or more command text messages to be sent to a user's mobile device in response to an initial incoming text message from the user. For example, one or more users may generally be required to subscribe to a service provided by the crowdsourcing platform 412. By subscribing to the service, the users are agreeing to allow the platform to obtain certain data from their mobile device 416, which, in the present scenario, includes location/positioning data. Accordingly, in the event that the service to which a user subscribes relates to building comfort or maintenance, the user may be presented with an app on their device 416 with which they can interact to report comfort or maintenance issues within a building. For example, in the industry of building maintenance and services, the platform is configured to collect data from patrons or employees within a space, such as an office space, wherein such data may be related to comfort issues such as HVAC (e.g., temperature of a particular room within a building), building maintenance issues (e.g., lighting issues, cleanliness of facilities, etc.), as well as other aspects of a building or space that may be useful in management of such space.

Alternatively, in the event that the service to which a user subscribes relates to a food or product ordering service, the user may be presented within an app on their device 416 with which they can interact to order food-related items to be subsequently picked up by the user or delivered to the user. For example, in the food service industry, the platform is configured to collect data from consumers that may include GPS location/position data relative to a specific restaurant or eatery from which they are ordering food for pickup.

As part of the subscription process, the authorization module 470 may be configured to receive user input and compare the user input with data stored in a user database, for example, in order to determine whether the user has subscribed to the service (i.e., signed up to interact with the service and further agreeing to receive command text messages from the service and passively provide data to the service in return). For example, as part of the authentication and access architecture, the authorization module 470 is configured to screen a user attempting to use the service via an SMS app 529 on their phone by verifying the credentials of the user and determining whether they are a subscriber (e.g., registered with the system 430). The verification process may include a typical login scenario in which a user must log in to the service by providing credentials (e.g., username, password, etc.), wherein the authorization module 470 will compare the credentials with the subscriber profiles to determine if the user has a profile and has further agreed to the terms and conditions of the service (e.g., agreed to receive command text messages and allow data from their mobile device to be transmitted back to the service).

Thus, in the building comfort and maintenance scenario, a user may initially use their device 416 to report that a room is "too hot". Alternatively, in the food ordering service scenario, a user may initially use their device 416 to place an order with a subscribing restaurant or eatery. The device 416 may include an SMS app 529 configured to provide the user with the ability to generate and transmit an incoming text message to the platform 412 to be received by the SMS communication service system 430 (step 1). Upon receiving the incoming text message, the system 430 may be configured to automatically transmit a command text message to the user's mobile device 416 (step 2). The command text message is generally configured to ping the user's mobile device 416 for specific data, as configured by the message creation/management module 468. For example, the command text message may be configured to command the user's mobile device to generate and send a response text message back to the platform 412 (step 3). The response text message may include, for example, location/positioning data. Accordingly, upon receiving the location/positioning data, the geolocation and mapping system 426 may correlate and tie the location/positioning data with the user's initial text message (e.g., reporting text message of "too hot" or the online order) so as to accurately tie the user's comment to a specific location in which the user and mobile device is located at the time the initial reporting text message was sent, as previously described herein.

As previously noted, in some embodiments, the system may further utilize additional data to augment the modeling of an environment, which, in turn, may further improve the geolocation services provided by the platform 412. For example, the additional data may be collected by utilizing a handheld or integrated light detection and ranging (LIDAR) device for scanning and mapping indoor environments and the system is configured to associate scan data with known features/landmarks based, at least in part, on prior and/or subsequent user location determinations, predetermined features such as two-dimensional (2-D) floor plans, specific locations of objects (QR code locations, locations of fixed objects identifiable with image-based analysis or computer vision, and the like). Additionally, or alternatively, the platform 412 may utilize other data collection mechanisms, including additional user polling to collect images of a given space (e.g., images captured via a user's smartphone or mobile device) and correlating such images with a 2-D floor plan or layout to further refine the floor plan or layout of a given space.

Most notably, by providing improved modeling of the environment and improving the accuracy with which users are located and user requests are tied to specific locations within the environment, the platform 412 greatly improves the manner in which maintenance requests are handled, and further provides additional features beneficial to users.

For example, the platform is configured to provide real-time, or near real-time, tracking of technical, janitorial, and other building service team members, in addition to occupants within the building. The platform is configured to analyze a user request and, in turn, identify and route the appropriate team member to address maintenance and/or workplace requests, or any other issue requiring attention. The platform is configured to base such a determination by analyzing the request data and correlating such data with the team member data, which may include, among other things, determining a proximity of the team member relative to the location of the issue requiring attention, the technical capabilities of the technician and whether the technician is qualified or equipped to address the issue. The system is further configured to providing routing guidance to the team member, including providing the optimal path to the given location requiring attention (i.e., determine the quickest route to reach to intended destination). The system may further be configured to provide at least building management with an interactive interface in which team members (i.e., building maintenance technicians) are tracked and monitored, including providing team member locations within the building, given requests that a given team member is currently addressing, as well as future requests that the team member has been tasked with addressing. Other details may further be provided, including estimated time of completion for a given task and estimate time of responding to the next task in the queue of requests.

Figure 32A:
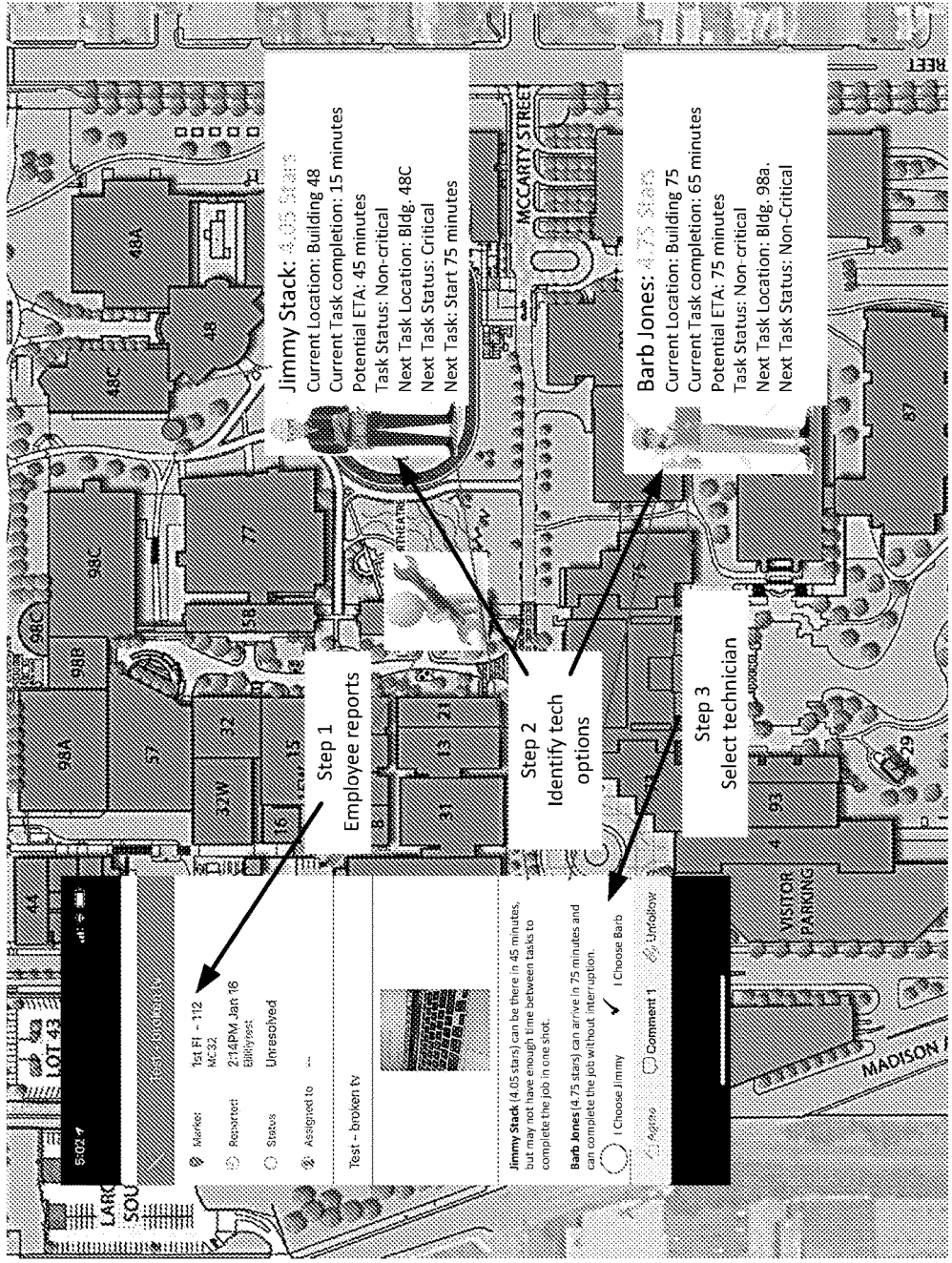
FIGS. 32A-32C illustrate real-time collection of crowdsourced data (i.e., user feedback with regard to any specific aspect of a given space, such as environmental parameters, including user comfort, as well as maintenance issues within the given space) and subsequent management of actionable responses to address any reported issues.
Figure 32B:
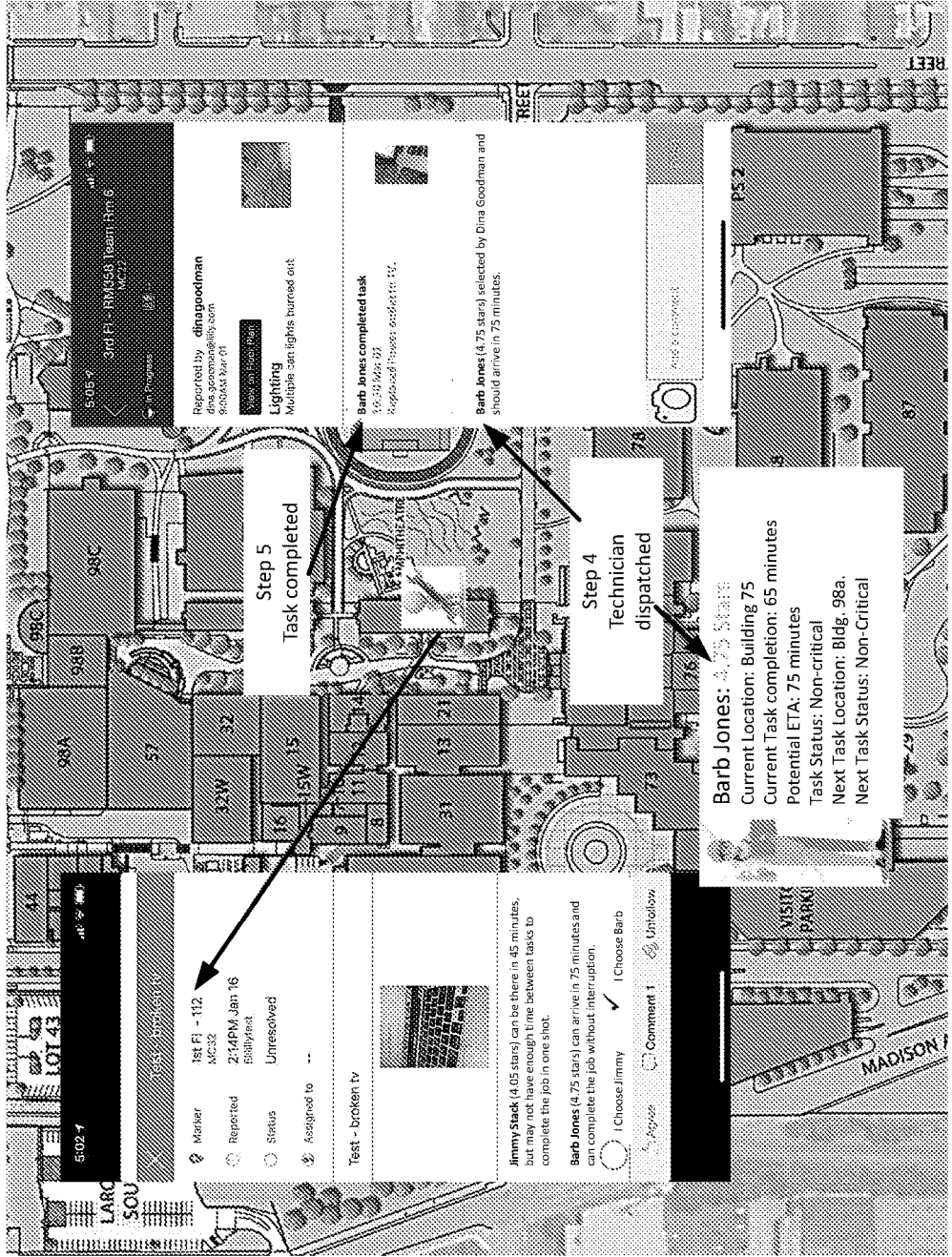
Figure 32C:
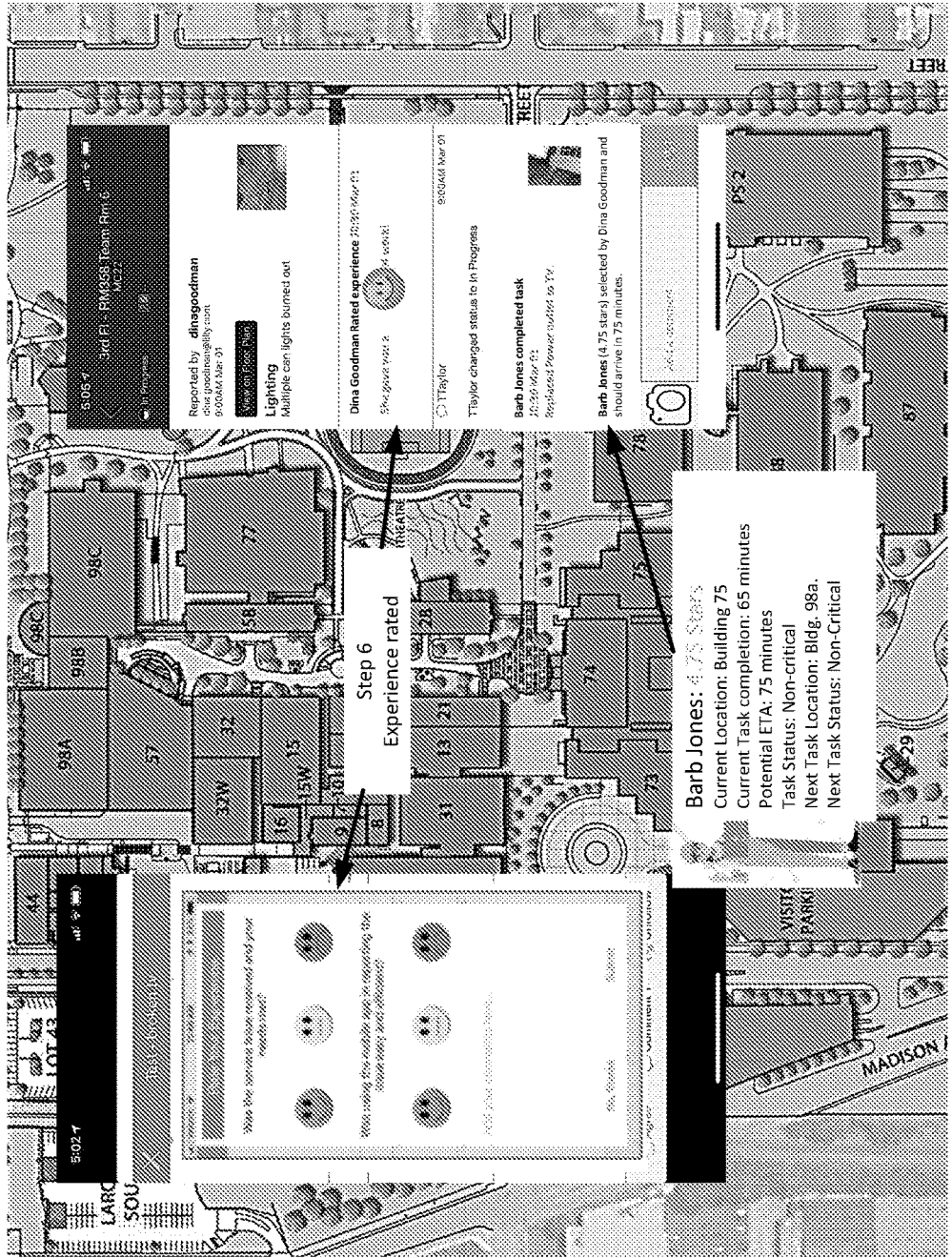

FIGS. 32A-32C are screenshots of an exemplary interface illustrating real-time collection of crowdsourced data (i.e., user feedback with regard to any specific aspect of a given space, such as environmental parameters, including user comfort, as well as maintenance issues within the given space) and subsequent management of actionable responses to address any reported issues. The platform 412 is configured to analyze a user's feedback or report for a maintenance request and determine at least a set of qualified technicians to address the maintenance request, with additional details of each technician to allow the user to select a technician of their choice.

FIGS. 32A, 32B, and 32C illustrate an exemplary interface showing an initial report from a user within a given environment. In the immediate scenario, the environment is a campus with a number of buildings. The report is a maintenance request in which a television has been reported as requiring maintenance (e.g., the user reports the television is "broken"). The report further provides additional details, such as the time of the reporting, the location of the maintenance request, as well as the status of the maintenance request (e.g., unresolved).

When a user makes a service request, for example, the platform 412 is configured to analyze the maintenance request data in relation to technician data and optimize and plan routes, make selections based on filtered criteria such as the categories of request/work, efficiency (distance and time), technician's ratings, technical capabilities, speed to arrival/completion, dispatch service technicians, accurate estimated times of arrivals to a maintenance request, and allow for the rating for experience for the work performed.

For example, upon receiving the report, the platform 412 is configured to identify a set of maintenance technicians on site and available and qualified to respond to the maintenance request. The platform 412 is able to determine whether such maintenance technicians are qualified to respond to the maintenance request based on a correlation of the technicians skill set (a known data set stored in their profile in the respective database) and the maintenance required. For example, if the maintenance request involves a plumbing issue or electrical issue, the platform 412 will screen out only those technicians with the appropriate skill set (i.e., plumbing or electrical skills). The platform 412 is further configured determine the location of technicians relative to the location of the maintenance request to thereby determine estimated times of arrival for a given technician, among other details. The user is then able to select which technician they would prefer to use.

Upon selecting the technician of their choice, the technician is alerted of the maintenance request and it is queued up in their lists of tasks to complete and thereby dispatched to the maintenance request. In return, the user is able to monitor their maintenance request and view the estimated time of arrival of the technician, as well as an alert as to whether the maintenance request has been completed. Upon completing the maintenance request, a technician can then receive a rating from the user.

In addition to improving the manner in which maintenance requests are handled, the accurate modeling of the environment also provides for other uses. For example, the platform is configured to provide directions to users to any given location within the building to a great degree of accuracy, which such directions can be displayed via the user's smartphone or mobile device, or a wearable device (i.e., via virtual reality (VR) or augmented reality (AR) display. The platform is further configured to provide proximity sensing for determining the proximity of users relative to one another or relative to certain landmarks or building features of interest. This may be particularly useful in emergency situations. For example, knowing where users are in an emergency situation, such as a fire, could lead to potentially saving lives, as the platform is configured to communicate specific alerts to users in the event that they are within the vicinity of an emergency and the platform may be aware of certain landmarks or objects that may be of importance in an emergency (e.g., fire extinguisher, nearest exit, medical devices such as defibrillators, etc.). Accordingly, a user in the vicinity of an emergency situation may be alerted and routed to the nearest emergency exit or directed to a fire extinguisher or defibrillator. Similarly, a user could generate and send an emergency-related request, in which the platform is configured to auto-route such request data to the appropriate emergency response team to then address the emergency.

As part of providing an actionable response, the platform is configured to first analyze the data so as to determine what actions, if any, may or should be taken (either automatically via a building management platform or the like or suggested actions to be taken via a maintenance worker or building manager). In particular, the platform is configured to analyze crowdsourced data utilizing various analysis techniques, including, but not limited to, contextual data analytics and predictive analytics, to thereby improve accuracy in terms of environment mapping and locating of users, understanding user requests and feedback, and further utilizing such data to provide an enriched set of features and services in the fields of workplace and building management.

For example, in some embodiments, the contextual analysis system 432 may be used to improve the understanding of user requests and user location associated with such requests. Such analysis may include, for example, Natural Language Processing (NLP) analysis and/or computer vision techniques.

For example, the use of contextual data analysis may improve geolocation services, specifically improving the accuracy with which a user is located. In particular, simply relying on GPS, IMU, RSS, and/or RF measurements to locate a user and/or tie a user request to a given location may be limiting, as such measurements may lack sufficient accuracy. Accordingly, the contextual analysis system 432 is configured to analyze a user's request, which may include text, one or more images, and/or audio using NLP and/or computer vision techniques. If, for example, an image of a known object or object type (as determined by computer vision), or mention of that object (as determined by NLP) is submitted in the user report by way of text, image data, and/or audio data, the system can use such data analysis to better locate the user and, in turn, provide a much more accurate and efficient actionable response.

The use of contextual data analytics can also more accurately classify the type of the report (e.g., the system can associate differently phrased requests as being similar and thereby provide summary reports, such as heat maps). Accordingly, such analysis can facilitate subsequent actions, such as prioritizing requests, identifying more accurate instructions for handling requests, and identifying trends in a timelier manner.

Furthermore, a user's request or feedback may be matched using image and/or NLP analysis for reporting purposes and/or backend functions. For example, a new image or object description associated with a request and provided by the user can be used to improve the model of the environment and such data can be stored for future use. For example, a user's text input related to a feature that is not currently indexed in a floor plan/layout/model can be used to supplement the location-based mapping or modeling.

The contextual analysis system 432 is further configured to utilize contextual data provided by the user, such as image or audio data, to better understand a user's mood or disposition when submitting a request or attempting to find a location. For example, such contextual data will permit the crowdsourcing platform to make more informed decisions with respect to automated reactions (e.g., responsive communications, urgency of assigning and routing or re-routing a limited number of maintenance technicians, etc.). In particular, properly understood user inputs can be more appropriately categorized for reporting (e.g., heat maps of user maintenance requests or feedback) and trend analysis (e.g., grouping seemingly unrelated requests together based on NLP processing of the content).

Furthermore, the use of the camera and/or microphone from a user's device to gather image data and audio data, respectively, provides numerous benefits from a contextual data analysis perspective. For example, in addition to capturing an image of a machine requiring maintenance, the user may also capture audio of the machine which may include a specific sound produced by the machine that may be indicative of a particular issue requiring a specific maintenance, thereby improving the determination of an actionable response, as the audio data can provide additional, objective details regarding the issue. Additionally, beamforming or tri-angulation of the source of the audio in a building may be performed by tapping into multiple user devices at the same time. In some embodiments, device sensors on the user's device may be automatically activated remotely (with permission from the user) so as to collect audio or video data from some or all user's devices in an area or building in the case of an emergency (e.g., an alarm going off or another incident) so as to capture relevant user and event data in real time or near-real time. Accordingly, such a manner of collecting data would prevent the need to have users actively report such data in such a stressful or emergency situation. The users could be assured that these features could help identify their position in the building, supply accurate routing or other instructions, and record the key data associated with their movements and the events.

Accordingly, the use of contextual data allows for the platform to make more informed decisions with respect to automated reactions (e.g., responsive communications, urgency of assigning and routing or re-routing a limited number of maintenance technicians, etc.).

As more refined crowdsourced data is collected, the platform may be configured to further subject such data to predictive analytics via the predictive analysis system 434. As generally understood, predictive analytics encompasses a variety of statistical techniques, including, for example, data mining, predictive modeling, and machine learning, that analyze current and historical data to make predictions about future or otherwise unknown events. In the present invention, the platform may utilize a form of AI or machine learning to determine a status of a building platform (e.g., component of HVAC system) and predict whether the platform is going to fail and/or requires preventative maintenance, thereby assisting building managers in understanding and prioritizing systems and building features in terms of repair, maintenance, and replacement. Furthermore, by utilizing predictive analytics, the platform is configured to determine patterns in the realm of human behavior and thereby proactively generate action items in anticipation of specific user requests. For example, the platform is configured to subject historical crowdsourced data to predictive analytics so as to predict comfort-related issues for given locations and, in turn, proactively address such issues prior to users reporting the issues. For example, the platform may predict that a given location is occupied at a certain time and day of the week and, based on historical crowdsourced data, that location consistently requires updating of the climate (i.e., either it is too hot or too cold). Accordingly, the platform is configured to effectively learn and proactively control the climate of that given location for that given time and day of the week in anticipation of user requests to adjust the climate. Furthermore, in some embodiments, additional data, such as weather-related data acquired from a third-party source, may be used in combination with historical crowdsourced data to determine that a specific space or zone of a building requires additional heating or cooling during such events.

Various known statistical pattern recognition methods can be used in conjunction with the present invention. Suitable statistical methods include, without limitation, logic regression, ordinal logistic regression, linear or quadratic discriminant analysis, clustering, principal component analysis, nearest neighbor classifier analysis, and Cox proportional hazards regression. Non-limiting examples of implementing particular assessment predictors in conjunction are provided herein to demonstrate the implementation of statistical methods in conjunction with the training set.

In some embodiments, the assessment predictor is based on a regression model, preferably a logistic regression model. In such embodiments, the coefficients for the regression model are computed using, for example, a maximum likelihood approach.

Some embodiments of the present invention provide generalizations of the logistic regression model that handle multicategory (polychotomous) responses. Such embodiments can be used to discriminate an organism into one or three or more prognosis groups. Such regression models use multicategory logit models that simultaneously refer to all pairs of categories, and describe the odds of response in one category instead of another. Once the model specifies logits for a certain (J-1) pairs of categories, the rest are redundant. See, for example, Agresti, An Introduction to Categorical Data Analysis, John Wiley & Sons, Inc., 1996, New York, Chapter 8, which is hereby incorporated by reference. Linear discriminant analysis (LDA) attempts to classify a subject into one of two categories based on certain object properties. In other words, LDA tests whether object attributes measured in an experiment predict categorization of the objects. LDA typically requires continuous independent variables and a dichotomous categorical dependent variable.

Quadratic discriminant analysis (QDA) takes the same input parameters and returns the same results as LDA. QDA uses quadratic equations, rather than linear equations, to produce results. LDA and QDA are interchangeable, and which to use is a matter of preference and/or availability of software to support the analysis. Logistic regression takes the same input parameters and returns the same results as LDA and QDA.

In some embodiments of the present invention, decision trees are used. Decision tree algorithms belong to the class of supervised learning algorithms. The aim of a decision tree is to induce a classifier (a tree) from real-world example data. This tree can be used to classify unseen examples which have not been used to derive the decision tree. A decision tree is derived from training data. An example contains values for the different attributes and what class the example belongs. In one embodiment, the training data is data representative of a plurality of users for whom a mental health status is known with respect to associated user behaviors.

The following algorithm describes a decision tree derivation:

Tree(Examples,Class,Attributes)
Create a root node
If all Examples have the same Class value, give the root this label
Else if Attributes is empty label the root according to the most common value
Else begin
Calculate the information gain for each attribute
Select the attribute A with highest information gain and make this the root attribute For each possible value, v, of this attribute
Add a new branch below the root, corresponding to A=v
Let Examples(v) be those examples with A=v
If Examples(v) is empty, make the new branch a leaf node labeled with the most common value among Examples
Else let the new branch be the tree created by
Tree(Examples(v),Class,Attributes—{A})
end A more detailed description of the calculation of information gain is shown in the following. If the possible classes vi of the examples have probabilities P(vi) then the information content I of the actual answer is given by:

$$I(P(v_1), \ldots, P(v_n)) = n\Sigma i = 1 - P(v_i) \log_2 P(v_i)$$

The I-value shows how much information we need in order to be able to describe the outcome of a classification for the specific dataset used. Supposing that the dataset contains p positive (e.g., one or more changes in the user's behavior indicative of a negative change in the mental health status of the user) and n negative (e.g., no changes in the user's behavior indicative of a negative change in the mental health status of the user) examples (e.g. individuals), the information contained in a correct answer is:

$$I(p/p+n, n/p+n) = -p/p+n \log_2 p/p+n - n/p+n \log_2 n/p+n$$

where $\log_2$ is the logarithm using base two. By testing single attributes the amount of information needed to make a correct classification can be reduced. The remainder for a specific attribute A (e.g. a trait) shows how much the information that is needed can be reduced.

$$\text{Remainder}(A) = v\Sigma i = 1 \ p_i + n_i/p+n \ I(p_i/p_i + n_i, n_i/p_i + n_i)$$

"v" is the number of unique attribute values for attribute A in a certain dataset, "i" is a certain attribute value, "$p_i$" is the number of examples for attribute A where the classification is positive (e.g., negative change in mental health status), "$n_i$" is the number of examples for attribute A where the classification is negative (e.g., no negative change in mental health status). The information gain of a specific attribute A is calculated as the difference between the information content for the classes and the remainder of attribute A:

$$\text{Gain}(A) = I(p/p+n, n/p+n) - \text{Remainder}(A)$$

The information gain is used to evaluate how important the different attributes are for the classification (how well they split up the examples), and the attribute with the highest information.

In general there are a number of different decision tree algorithms, many of which are described in Duda, Pattern Classification, Second Edition, 2001, John Wiley & Sons, Inc. Decision tree algorithms often require consideration of feature processing, impurity measure, stopping criterion, and pruning. Specific decision tree algorithms include, cut are not limited to classification and regression trees (CART), multivariate decision trees, ID3, and C4.5.

In some embodiments, clustering may be used. Clustering is described on pages 211-256 of Duda and Hart, Pattern Classification and Scene Analysis, 1973, John Wiley & Sons, Inc., New York. As described in Section 6.7 of Duda, the clustering problem is described as one of finding natural groupings in a dataset. To identify natural groupings, two issues are addressed. First, a way to measure similarity (or dissimilarity) between two samples is determined. This metric (similarity measure) is used to ensure that the samples in one cluster are more like one another than they are to samples in other clusters. Second, a mechanism for partitioning the data into clusters using the similarity measure is determined.

Similarity measures are discussed in Section 6.7 of Duda, where it is stated that one way to begin a clustering investigation is to define a distance function and to compute the matrix of distances between all pairs of samples in a dataset. If distance is a good measure of similarity, then the distance between samples in the same cluster will be significantly less than the distance between samples in different clusters. However, as stated on page 215 of Duda, clustering does not require the use of a distance metric. For example, a nonmetric similarity function s(x, x') can be used to compare two vectors x and x'. Conventionally, s(x, x') is a symmetric function whose value is large when x and x' are somehow "similar". An example of a nonmetric similarity function s(x, x') is provided on page 216 of Duda.

Once a method for measuring "similarity" or "dissimilarity" between points in a dataset has been selected, clustering requires a criterion function that measures the clustering quality of any partition of the data. Partitions of the data set that extremize the criterion function are used to cluster the data. See page 217 of Duda. Criterion functions are discussed in Section 6.8 of Duda.

More recently, Duda et al., Pattern Classification, 2nd edition, John Wiley & Sons, Inc. New York, has been published. Pages 537-563 describe clustering in detail. More information on clustering techniques can be found in Kaufman and Rousseeuw, 1990, Finding Groups in Data: An Introduction to Cluster Analysis, Wiley, New York, N.Y.; Everitt, 1993, Cluster analysis (3d ed.), Wiley, New York, N.Y.; and Backer, 1995, Computer-Assisted Reasoning in Cluster Analysis, Prentice Hall, Upper Saddle River, N.J. Particular exemplary clustering techniques that can be used in the present invention include, but are not limited to, hierarchical clustering (agglomerative clustering using nearest-neighbor algorithm, farthest-neighbor algorithm, the average linkage algorithm, the centroid algorithm, or the sum-of-squares algorithm), k-means clustering, fuzzy k-means clustering algorithm, and Jarvis-Patrick clustering.

Nearest neighbor classifiers are memory-based and require no model to be fit. Given a query point $x_0$, the k training points $x_{(r)}$, r, . . . , k closest in distance to $x_0$ are identified and then the point $x_0$ is classified using the k nearest neighbors. Ties can be broken at random. In some embodiments, Euclidean distance in feature space is used to determine distance as:

$$d_{(i)} = \|x_{(i)} - x_o\|.$$

Typically, when the nearest neighbor algorithm is used, the expression data used to compute the linear discriminant is standardized to have mean zero and variance 1. In the present invention, the members of the training population are randomly divided into a training set and a test set. For example, in one embodiment, two thirds of the members of the training population are placed in the training set and one third of the members of the training population are placed in the test set. Profiles represent the feature space into which members of the test set are plotted. Next, the ability of the training set to correctly characterize the members of the test set is computed. In some embodiments, nearest neighbor computation is performed several times for a given combination of fertility-associated phenotypic traits. In each iteration of the computation, the members of the training population are randomly assigned to the training set and the test set. Then, the quality of the combination of traits is taken as the average of each such iteration of the nearest neighbor computation.

The nearest neighbor rule can be refined to deal with issues of unequal class priors, differential misclassification costs, and feature selection. Many of these refinements involve some form of weighted voting for the neighbors. For more information on nearest neighbor analysis, see Duda, Pattern Classification, Second Edition, 2001, John Wiley & Sons, Inc; and Hastie, 2001, The Elements of Statistical Learning, Springer, N.Y.

The pattern classification and statistical techniques described above are merely examples of the types of models that can be used to construct a model for classification. It is to be understood that any statistical method can be used in accordance with the invention. Moreover, combinations of these described above also can be used.

Yet still, in some embodiments, additional services provided via the platform may be configured to leverage the predictive analytics, such as presenting advertisement addressing predicted events to targeted audiences. For example, a predicted weather event combined with crowdsources comfort data could be used to offer new HVAC or control systems to building managers or employers in advance of the events or after the events. In other words, the platform may be used to as a data service provider in such a scenario, such that the platform is configured to provide data or predictive analytics needed by an advertising service to provide the predictive, comfort related advertisements.

Furthermore, as previously described, the services offered by, and general use of, the platform of the present invention may accessed via a software application, it should be noted that use of the of the services of the platform of the present invention may be offered as a service, such as a part of a cloud-based service to supplement services offered by third parties. For example, the crowdsourced data may be available for use by third parties via direct API integration into existing third party services. Furthermore, a software development environment or kit may be offered for facilitating third party applications that access and use such data services. As an example, a third party calendar application may utilize the crowdsourced data to provide additional information to users of the calendar application, which may be particularly useful in the workplace in the context of meeting rooms or spaces (e.g., a room or space rating or specific an indication that a room or space is typically considered too cold or too hot, or has repeated issues with a device such as a projector or the like). Furthermore, the platform may generally act as a data aggregator, in which the crowdsourced data is supplemented with other third party data (e.g., calendar or ticket data) to thereby offer additional services. For example, a calendar or booking request for a room received from a third-party application may be subjected to an analysis by the platform using the crowdsourced data, which certain issues may be determined (e.g., the platform may present a user with information concerning particular rooms or spaces that the user is attempting to book, such as an indication as to whether any open maintenance requests are associated with the given room or space).

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Incorporation by Reference

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A method for providing geolocation-based building management in a crowdsourcing platform having a server system in communication with a plurality of mobile user devices running a mobile device application ("app"), the method comprising:
   receiving, by the server system of the crowdsourcing platform, from a first set of mobile user devices, user feedback data reports related to facilities issues involving one or more spaces of a building, wherein the facilities issues include at least one of cleanliness, comfort, or maintenance, and wherein each user feedback data report is associated with a time stamp;
   determining, by the server system, a type of facilities issue and a space of the one or more spaces associated with each user feedback data report, wherein the space of the one or more spaces is determined using a stored model of an interior of the building produced using crowdsourced data;
   aggregating, by the server system, user feedback data reports into time stamped geo-located aggregated reports, each aggregated report related to a given type of facilities issue associated with a given space of the building;
   determining, by the server system, for each aggregated report, an assigned user responsible for handling the given type of facilities issue for the given space of the building associated with the aggregated report based on a building technician database storing user profiles associated with maintenance of the given space or building; and
   providing, by the server system, an automatic notification to each assigned user via an in-app messaging service including information regarding the given type of facilities issue and the given space of the building.

2. The method of claim 1, wherein at least one of the user feedback data reports comprises custom text.

3. The method of claim 1, wherein at least one of the user feedback data reports comprises image data.

4. The method of claim 1, wherein at least one of the user feedback data reports comprises a comment on user feedback data report from another user.

5. The method of claim 4, wherein the comment comprises an agreement with the user feedback data report from the other user.

6. The method of claim 1, further comprising receiving, from at least one of the first set of user devices, GPS data and wherein determining the space of the one or more spaces is based at least in part on the GPS data.

7. The method of claim 1, wherein determining the space of the one or more spaces is based on a scanned location identifier associated with the user feedback data report.

8. The method of claim 1, wherein the in-app notification includes a map of the given space.

9. The method of claim 1, further comprising:
   generating a building report comprising one or more of expected time of arrival of the assigned user at one or more spaces of the building; status of maintenance work related to one or more spaces of the building; summary of maintenance work related to one or more spaces of the building; or a heat map.

10. The method of claim 1, further comprising sending an update to at least one user via the in-app messaging service.

11. A system for providing geolocation-based building management in a crowdsourcing platform, the system comprising:
    a server system configured to communicate with and exchange data with a plurality of mobile user devices running a mobile device application ("app"), the server system comprising at least one hardware processor coupled to at least one non-transitory, computer-readable memory containing instructions executable by the at least one processor to cause the server system to:
    receive, from a first set of mobile user devices, user feedback data reports related to facilities issues involving one or more spaces of a building, wherein the facilities issues include at least one of cleanliness, comfort, or maintenance, and wherein each user feedback data report is associated with a time stamp;
    determine a type of facilities issue and a space of the one or more spaces associated with each user feedback data report, wherein the space of the one or more spaces is determined using a stored model of an interior of the building produced using crowdsourced data;
    aggregate user feedback data reports into time stamped geo-located aggregated reports, each aggregated report related to a given type of facilities issue associated with a given space of the building;
    determine, for each aggregated report, an assigned user responsible for handling the given type of facilities issue for the given space of the building associated with the aggregated report based on a building technician database storing user profiles associated with maintenance of the given space or building; and
    provide an automatic notification to each assigned user via an in-app messaging service including information regarding the given type of facilities issue and the given space of the building.

12. The system of claim 11, wherein at least one of the user feedback data reports comprises custom text.

13. The system of claim 11, wherein at least one of the user feedback data reports comprises image data.

14. The system of claim 11, wherein at least one of the user feedback data reports comprises a comment on user feedback data report from another user.

15. The system of claim 14, wherein the comment comprises an agreement with the user feedback data report from the other user.

16. The system of claim 11, further comprising receiving, from at least one of the first set of user devices, GPS data and wherein determining the space of the one or more spaces is based at least in part on the GPS data.

17. The system of claim 11, wherein determining the space of the one or more spaces is based on a scanned location identifier associated with the user feedback data report.

18. The system of claim 11, wherein the in-app notification includes a map of the given space.

19. The system of claim 11, further comprising:
generating a building report comprising one or more of expected time of arrival of the assigned user at one or more spaces of the building; status of maintenance work related to one or more spaces of the building; summary of maintenance work related to one or more spaces of the building; or a heat map.

20. The system of claim 11, further comprising sending an update to at least one user via the in-app messaging service.

* * * * *